US009457657B2

(12) United States Patent
Ziech et al.

(10) Patent No.: US 9,457,657 B2
(45) Date of Patent: Oct. 4, 2016

(54) DRIVE AXLE SYSTEM HAVING A CLUTCHING DEVICE

(71) Applicant: Dana Heavy Vehicle Systems Group, LLC, Maumee, OH (US)

(72) Inventors: James F. Ziech, Kalamazoo, MI (US); Donald J. Remboski, Ann Arbor, MI (US); Steven J. Wesolowski, Waterville, OH (US); Timothy J. Morscheck, Portage, MI (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 14/790,278

(22) Filed: Jul. 2, 2015

(65) Prior Publication Data

US 2015/0375619 A1    Dec. 31, 2015

Related U.S. Application Data

(62) Division of application No. 13/135,989, filed on Jul. 20, 2011, now Pat. No. 9,102,232.

(51) Int. Cl.
*B60K 17/16* (2006.01)
*B60K 17/346* (2006.01)
*B60K 23/08* (2006.01)
(Continued)

(52) U.S. Cl.
CPC ............. *B60K 17/16* (2013.01); *B60K 17/165* (2013.01); *B60K 17/3462* (2013.01); *B60K 17/3467* (2013.01); *B60K 23/08* (2013.01); *F16H 48/05* (2013.01); *F16H 48/06* (2013.01); *F16H 48/08* (2013.01); *F16H 48/36* (2013.01); *B60Y 2300/429* (2013.01); *B60Y 2400/424* (2013.01); *B60Y 2400/80* (2013.01); *B60Y 2400/82* (2013.01); *F16H 2048/368* (2013.01)

(58) Field of Classification Search
CPC ............................. B60K 17/16; F16H 48/06
See application file for complete search history.

(56) References Cited

U.S. PATENT DOCUMENTS 2,166,099 A    7/1939  Quartullo
2,290,089 A    7/1942  Bock
(Continued)

FOREIGN PATENT DOCUMENTS

CN    201346995 Y    11/2009
EP    1527938 A2    5/2005
(Continued)

OTHER PUBLICATIONS

International Search Report for application No. PCT/US2011/001283, mailing dare Apr. 12, 2014.
(Continued)

*Primary Examiner* — Derek D Knight
(74) *Attorney, Agent, or Firm* — Marshall & Melhorn, LLC

(57) ABSTRACT

A drive axle system for a vehicle drive train having a clutching device is provided. The drive axle system includes a first shaft, a planetary inter-axle differential, a first axle assembly, a second axle assembly, a first clutching device, and a second clutching device. The first axle assembly is drivingly engaged with a portion of the planetary inter-axle differential. The first clutching device divides one of a pair of output axles into first and second portions. The second clutching device selectively engages a driving gear of the second axle assembly with a portion of the planetary inter-axle differential.

17 Claims, 13 Drawing Sheets

(51) Int. Cl.
 *F16H 48/05* (2012.01)
 *F16H 48/06* (2006.01)
 *F16H 48/36* (2012.01)
 *F16H 48/08* (2006.01)

(56) References Cited

U.S. PATENT DOCUMENTS

| | | | |
|---|---|---|---|
| 2,291,174 | A | 7/1942 | Stewart |
| 2,574,986 | A | 11/1951 | Schou |
| 2,936,036 | A | 5/1960 | Norelius |
| 3,146,842 | A | 9/1964 | Nelson et al. |
| 3,221,832 | A | 12/1965 | Holmstrom |
| 3,324,965 | A | 6/1967 | Koch et al. |
| 3,388,760 | A | 6/1968 | Christie |
| 3,577,804 | A | 5/1971 | Ohno |
| 3,657,935 | A | 4/1972 | O'Brien |
| 3,706,350 | A | 12/1972 | Bokovoy |
| 3,792,628 | A | 2/1974 | Stieg |
| 3,827,520 | A | 8/1974 | Mueller |
| 3,915,032 | A | 10/1975 | Ottemann |
| 3,916,728 | A | 11/1975 | Behar et al. |
| 3,976,154 | A | 8/1976 | Clark et al. |
| 4,046,210 | A | 9/1977 | Nelson |
| 4,050,534 | A | 9/1977 | Nelson et al. |
| 4,194,586 | A | 3/1980 | Hicks |
| 4,263,824 | A | 4/1981 | Mueller |
| 4,432,431 | A | 2/1984 | Russell |
| 4,462,271 | A | 7/1984 | Stieg |
| 4,560,018 | A | 12/1985 | Satzler |
| 4,677,873 | A | 7/1987 | Eastman et al. |
| 4,754,847 | A | 7/1988 | Glaze et al. |
| 4,887,487 | A | 12/1989 | Mayfield |
| 5,176,590 | A | 1/1993 | Haydock |
| 5,267,489 | A | 12/1993 | Ziech |
| 5,370,018 | A | 12/1994 | Kwasniewski |
| 5,435,790 | A | 7/1995 | Kota et al. |
| 5,641,044 | A | 6/1997 | Morscheck |
| 5,651,748 | A | 7/1997 | Adam et al. |
| 5,711,389 | A | 1/1998 | Schlosser |
| 5,860,889 | A | 1/1999 | Schlosser et al. |
| 5,950,750 | A | 9/1999 | Dong et al. |
| 6,085,853 | A | 7/2000 | Wernick |
| 6,154,700 | A | 11/2000 | Jones |
| 6,258,009 | B1 | 7/2001 | Thomas et al. |
| 6,327,935 | B1 | 12/2001 | Joslin et al. |
| 6,517,462 | B2 | 2/2003 | Borgan et al. |
| 6,530,861 | B1 | 3/2003 | Nakashima |
| 6,626,787 | B2 * | 9/2003 | Porter .................... B60K 17/35 180/247 |
| 6,659,249 | B2 | 12/2003 | Borgan et al. |
| 6,840,880 | B2 | 1/2005 | Glassner |
| 6,863,634 | B2 | 3/2005 | Holman et al. |
| 6,877,573 | B2 | 4/2005 | Hasegawa |
| 6,918,851 | B2 | 7/2005 | Ziech et al. |
| 6,926,634 | B2 | 8/2005 | Haka |
| 6,953,411 | B2 * | 10/2005 | Burns .................. B01D 29/055 192/103 F |
| 6,964,310 | B2 | 11/2005 | Hasegawa |
| 7,093,681 | B2 | 8/2006 | Strain |
| 7,096,990 | B2 | 8/2006 | Borgen et al. |
| 7,163,483 | B2 | 1/2007 | Haka |
| 7,195,579 | B2 | 3/2007 | Claussen et al. |
| 7,291,083 | B2 | 11/2007 | Almaguer |
| 7,306,536 | B2 | 12/2007 | Ziech |
| 7,399,251 | B2 | 7/2008 | Mueller et al. |
| 7,410,440 | B2 | 8/2008 | Garcia et al. |
| 7,491,145 | B2 | 2/2009 | Mizon et al. |
| 7,611,414 | B2 | 11/2009 | Mueller et al. |
| 7,686,728 | B2 | 3/2010 | Imbert |
| 2006/0272866 | A1 | 12/2006 | Ziech |
| 2008/0182700 | A1 | 7/2008 | Earhart |
| 2008/0210508 | A1 | 9/2008 | Heisey et al. |
| 2010/0206654 | A1 | 8/2010 | Cimatti et al. |
| 2010/0248888 | A1 | 9/2010 | Hamperl et al. |

FOREIGN PATENT DOCUMENTS

| | | |
|---|---|---|
| JP | S5876330 A | 5/1983 |
| JP | H082280 A | 1/1996 |
| JP | H08337125 A | 12/1996 |
| KR | 20030000505 A | 1/2003 |
| WO | 2008019779 A2 | 2/2008 |
| WO | 2008113484 A1 | 9/2008 |

OTHER PUBLICATIONS

International Preliminary Report on Patentability and Written Opinion for application No. PCT/US2011/001283, date of issuance Jan. 22, 2013.

* cited by examiner

DRIVE AXLE SYSTEM HAVING A CLUTCHING DEVICE

RELATED APPLICATIONS

This application is a divisional application of U.S. application Ser. No. 13/135,989 filed on Jul. 20, 2011, which is incorporated by reference in its entirety. The present application is being filed during the pendency of U.S. application Ser. No. 13/135,989.

FIELD OF THE INVENTION

The present invention relates to a vehicle drive train and a drive axle system for the vehicle drive train having a clutching device.

BACKGROUND OF THE INVENTION

Vehicles incorporating multiple drive axles benefit in many ways over vehicles having a single driven axle. Drive axle systems in such vehicles may be configured to distribute torque proportionately or disproportionately between the axles. Additionally, shift mechanisms may be provided to such vehicles to permit the disengagement of one of the driven axles, and to transition from single axle operation to multiple axle operation during normal vehicle operation, among other benefits. However, such versatility typically requires the incorporation of additional drive train components into the vehicle at added expense and weight. Such added weight results in a decreased fuel efficiency of the vehicle.

Clutching devices in such drive axle systems also need to be selected based on a gear reduction ratio present in a wheel differential. Axle ratios may be of a two-speed configuration to permit the vehicle to operate in a low speed and high torque manner or in a high speed and low torque manner. It is preferred to drive multiple axles when the low speed and high torque manner of operation is desired (to distribute the higher torque amongst a greater number of wheels) and it is advantageous to operate a single axle when the high speed and low torque manner of operation is desired (to decrease windage and frictional losses when torque distribution is of lower concern). However, incorporation of both the two-speed configuration, an axle disconnect function, and an inter-axle differential may be prohibitive with respect to cost and weight. Such added weight, windage losses, and frictional losses result in a decreased fuel efficiency of the vehicle.

When multiple axles of a drive axle system having the inter-axle differential are operated in the low speed and high torque manner of operation, torque output at each of the axles should optimally be equal to prevent slippage of the axle having a greater torque. The inter-axle differential having a planetary style differential, by design, unequally divides torque. As a result, the inter-axle differential having the planetary style differential, when used with multiple drive axles having similar axle ratios, can slip as a result of unequal torque distribution when the vehicle having the inter-axle differential is operated on a low friction surface.

It would be advantageous to develop a drive axle system that is lightweight, reduces windage and frictional losses, can be operated in a low speed and high torque manner of operation and a high speed and low torque manner of operation without excessively increasing a cost of the drive axle system.

SUMMARY OF THE INVENTION

Presently provided by the invention, a drive axle system that is lightweight, reduces windage and frictional losses, can be operated in a low speed and high torque manner of operation and a high speed and low torque manner of operation without excessively increasing a cost of the drive axle system, has surprisingly been discovered.

In one embodiment, the present invention is directed to a drive axle system comprising a first shaft, a planetary inter-axle differential, a first axle assembly, a second axle assembly, a first clutching device, and a second clutching device. The first shaft comprises at least one shaft section. The planetary inter-axle differential comprises a sun gear, a carrier, and a ring gear. The carrier is drivingly engaged with the first shaft. The first axle assembly comprises a first wheel differential, a first driving gear, and a first pair of output axles. The first driving gear is coupled to the first wheel differential and drivingly engaged with the ring gear of the planetary inter-axle differential. The first pair of output axles is drivingly engaged with the first wheel differential. The second axle assembly comprises a second wheel differential, a second driving gear, a second pair of output axles, and a first clutching device. The second driving gear is coupled to the second wheel differential. The second pair of output axles are drivingly engaged with the second wheel differential. The first clutching device is disposed on and divides one of the second pair of output axles into first and second portions. The second clutching device has at least a first position and a second position. The second clutching device in the first position drivingly engages the second driving gear with the sun gear of the planetary inter-axle differential and the second clutching device in the second position drivingly engages one of the sun gear and the ring gear of the planetary inter-axle differential with the carrier of the planetary inter-axle differential.

Various aspects of this invention will become apparent to those skilled in the art from the following detailed description of the preferred embodiment, when read in light of the accompanying drawings.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
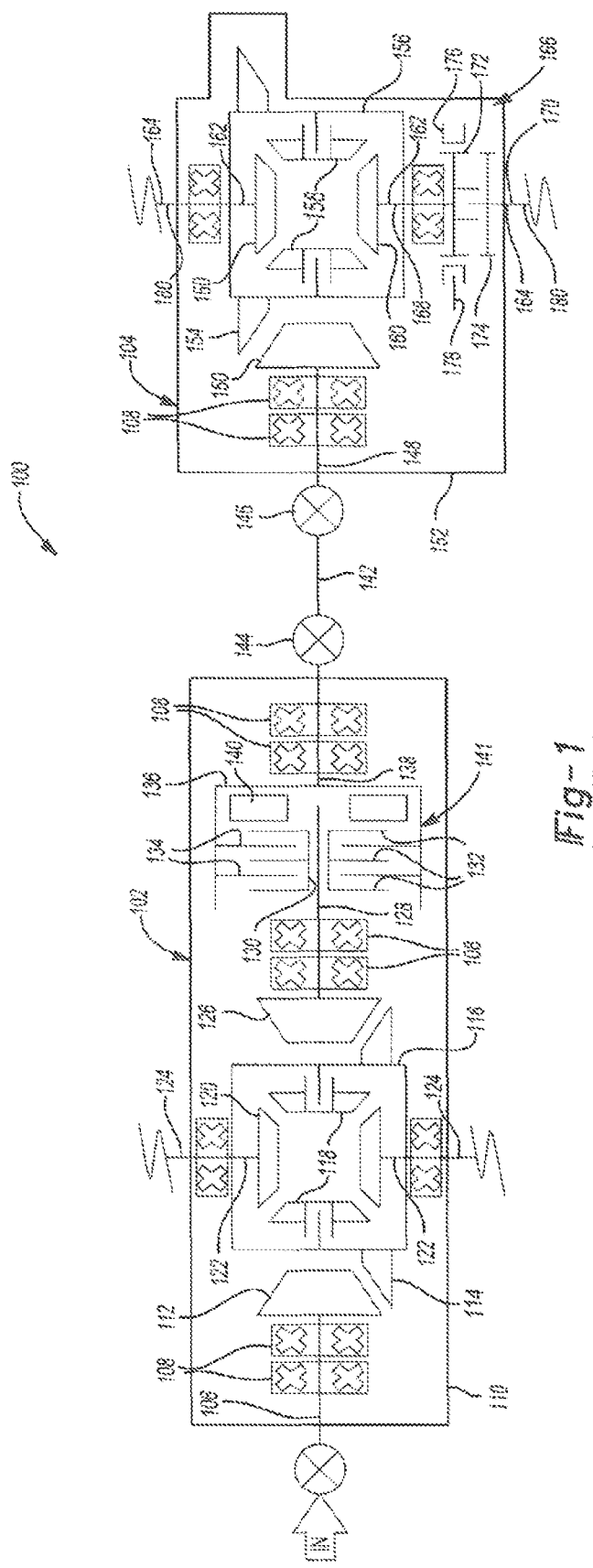
FIG. 1 is a schematic view of a drive axle system according to an embodiment of the present invention.

Turning now to FIG. 1, a drive axle system 100 is shown consisting of a first axle assembly 102 and a second axle assembly 104. An input source of rotational energy is provided to turn a first pinion shaft 106 of the first axle assembly 102. One or more bearings 108 may be located in contact with the first pinion shaft 106 to enable it to rotate within a first axle assembly housing 110. The first pinion shaft 106 has a first pinion gear 112 mounted thereto. The first pinion gear 112 has a toothed portion. The toothed portion is engaged with the forward side of a toothed portion of a first axle driving gear 114, also located within the first axle assembly housing 110. The first pinion gear 112 may be such as a hypoid pinion gear. The first pinion shaft 106 is drivingly engaged with the first axle driving gear 114 of the first axle assembly 102 through a single gear mesh.

The first axle driving gear 114 is mounted on, or connected, to a first wheel differential case 116. At least two pinion gears 118 and at least two side gears 120 are located within the first wheel differential case 116. As known by those skilled in the art, the pinion gears 118 and the side gears 120 are connected to one another. The side gears 120 are also connected to axle half shafts 122. The axle half shafts 122 extend from the first wheel differential case 116 and the first axle assembly housing 110 to a wheel end 124. The wheel ends 124 supports wheels and tires (not shown).

A second pinion gear 126 with a toothed portion is engaged with a rearward side of the toothed portion of the first axle driving gear 114. The second pinion gear 126 is mounted to a second pinion shaft 128. The second pinion shaft 128 is mounted on the at least one bearing 108 to facilitate rotation of the second pinion shaft 128 within the first axle assembly housing 110. The second pinion gear 126 may be a hypoid pinion gear.

The second pinion shaft 128 comprises a plurality of splines formed on the shaft opposite the second pinion gear 126. A splined sleeve 130 may be engaged with the splines on the second pinion shaft 128. A first plurality of axially moveable discs 132 may be located on an outer surface of the splined sleeve 130.

A second plurality of axially movable discs 134 is located on an interior surface of a clutch bowl 136. The clutch bowl 136 is located radially outward in a concentric fashion from the splined sleeve 130.

The clutch bowl 136 is connected to a neck 138. One or more bearings 108 may be located between the neck 138 and the first axle assembly housing 110 to facilitate rotation of the neck 138, and thus the clutch bowl 136, within the first axle assembly housing 110.

The first plurality of axially moveable discs 132 and the second plurality of axially moveable discs 134 may be selectively compressed so as to couple the clutch bowl 136 and the second pinion shaft 128. The selective compression is applied by an actuator 140. The actuator 140 may be a pneumatic actuator, an electromechanical actuator or a hydraulic actuator. Any of the foregoing may be connected to a vehicle anti-lock braking system to facilitate further vehicle control via the driveline. The splined sleeve 130, the first plurality of axially moveable discs 132, the second plurality of axially moveable discs 134, and the clutch bowl 136 form an inter-axle clutch 141.

The neck 138 is connected to a first yoke (not shown). The first yoke is connected to a propeller shaft 142, such as through a first universal joint 144. The propeller shaft 142 is connected to a second universal joint 146 located on the second axle assembly 104.

The second universal joint 146 is connected to a third pinion shaft 148. A third pinion gear 150 is connected to the third pinion shaft 148. The third pinion shaft 148, and thus the third pinion gear 150, is mounted for rotation within a second wheel differential housing 152. The third pinion gear 150 may be such as a spiral bevel, or it may be a hypoid.

The third pinion gear 150 has a toothed portion that is engaged with a toothed portion of a second axle driving gear 154. The second axle driving gear 154 is mounted on, or connected, to a second wheel differential case 156. At least two pinion gears 158 and at least two side gears 160 are located within the second wheel differential case 156. As known by those skilled in the art, the pinion gears 158 and the side gears 160 are connected to one another. The side gears are also connected to axle half shafts 162. The axle half shafts 162 extend from the second wheel differential case 156, and the second wheel differential housing 152, to a wheel end 164. The wheel end 164 supports wheels and tires (not shown).

The second axle driving gear 154 may have a smaller diameter than the first axle driving gear 114. By way of example only, the first axle driving gear 114 may have a diameter of approximately 18 inches, while the second axle driving gear 154 may have a diameter of approximately 16.5 inches. The purpose of a difference between the diameter of the first axle driving gear 114 and the diameter of the second axle driving gear 154 is described below.

A shaft clutch 166 is mounted to one of the axle half shafts 162 and divides the axle half shaft 162 into a first portion 168 and a second portion 170. The shaft clutch 166 may be a splined dog type clutch. The shaft clutch 166 comprises a first toothed portion 172 formed on the first portion 168 and a second toothed portion 174 formed on the second portion 170. The first toothed portion 172 and the second toothed portion 174 may be directed formed on the first portion 168 and the second portion 170 or they may be formed on a sleeve located about the first portion 168 and the second portion 170. The first toothed portion 172 and the second toothed portion 174 respectively rotate with the first portion 168 and the second portion 170 of one of the axle half shafts 162.

The shaft clutch 166 further comprises a locking collar 176 disposed about one of the axle half shafts 162 and drivingly engaged with at least one of the first toothed portion 172 and the second toothed portion 174. The locking collar 176 is axially moveable along the first toothed portion 172 and the second toothed portion 174 and includes a plurality of teeth formed on an inner surface thereof. The locking collar 176 has a first position and a second position. As shown in FIG. 1, the locking collar 176 is in the first position and is drivingly engaged with the first toothed portion 172. In the second position, the locking collar 176 is drivingly engaged with the first toothed portion 172 and the second toothed portion 174, causing the first portion 168 to be drivingly engaged with the second portion 170.

The locking collar 176 may be selectively moved along the first toothed portion 172 and the second toothed portion 174 so as to couple the first portion 168 and the second portion 170. The locking collar 176 may be moved by an actuator 178 such as a pneumatic actuator, an electromechanical actuator, or a hydraulic actuator. The actuator 178 may be connected to the anti-lock braking system of the vehicle, as described below.

The axle half shafts 162 are connected to wheel ends 180. Each wheel end 180 supports wheels and tires (not shown).

The shaft clutch 166 permits the second portion 170 to be selectively disengaged from the side gear 160, the second axle driving gear 154, the propeller shaft 142, and thus the first axle assembly 102. As a result, the second axle driving gear 154 and the propeller shaft 142 can idle during vehicle operation.

The first axle assembly 102 may be utilized for the majority of the vehicle duty cycle requirements. The second axle assembly 104 may be selectively engaged when additional tractive effort is required. By selectively disengaging and idling the second axle assembly 104 using the inter-axle clutch 141, an efficiency over a full time driven first and second axle assembly is achieved by minimizing axle windage and parasitic drag losses.

The second axle assembly 104 may be selectively and automatically engaged by an automated system that comprises wheel speed sensors and a control algorithm that eliminates the need for driver control. In such a situation, the second axle assembly 104 can be automatically engaged at vehicle start up to proportion the drive torque between the first and second axle assemblies 102, 104. This has the effect of lowering the maximum torque on either the first and second axle assemblies 102, 104. Further, when a friction plate-type clutch is utilized in the inter-axle clutch 141 to engage the second axle assembly 104, as shown in FIG. 1, the clutch torque capacity can be used to limit the torque to the second axle assembly 104, thus permitting it to be downsized compared to the first axle assembly 102. The present invention also has the advantage of eliminating an inter-axle differential since the second axle assembly 104 is only used under low traction conditions or start up conditions. Also, the inter-axle clutch 141 may be allowed to slip when the drive axle system 100 negotiates a corner.

Figure 2:
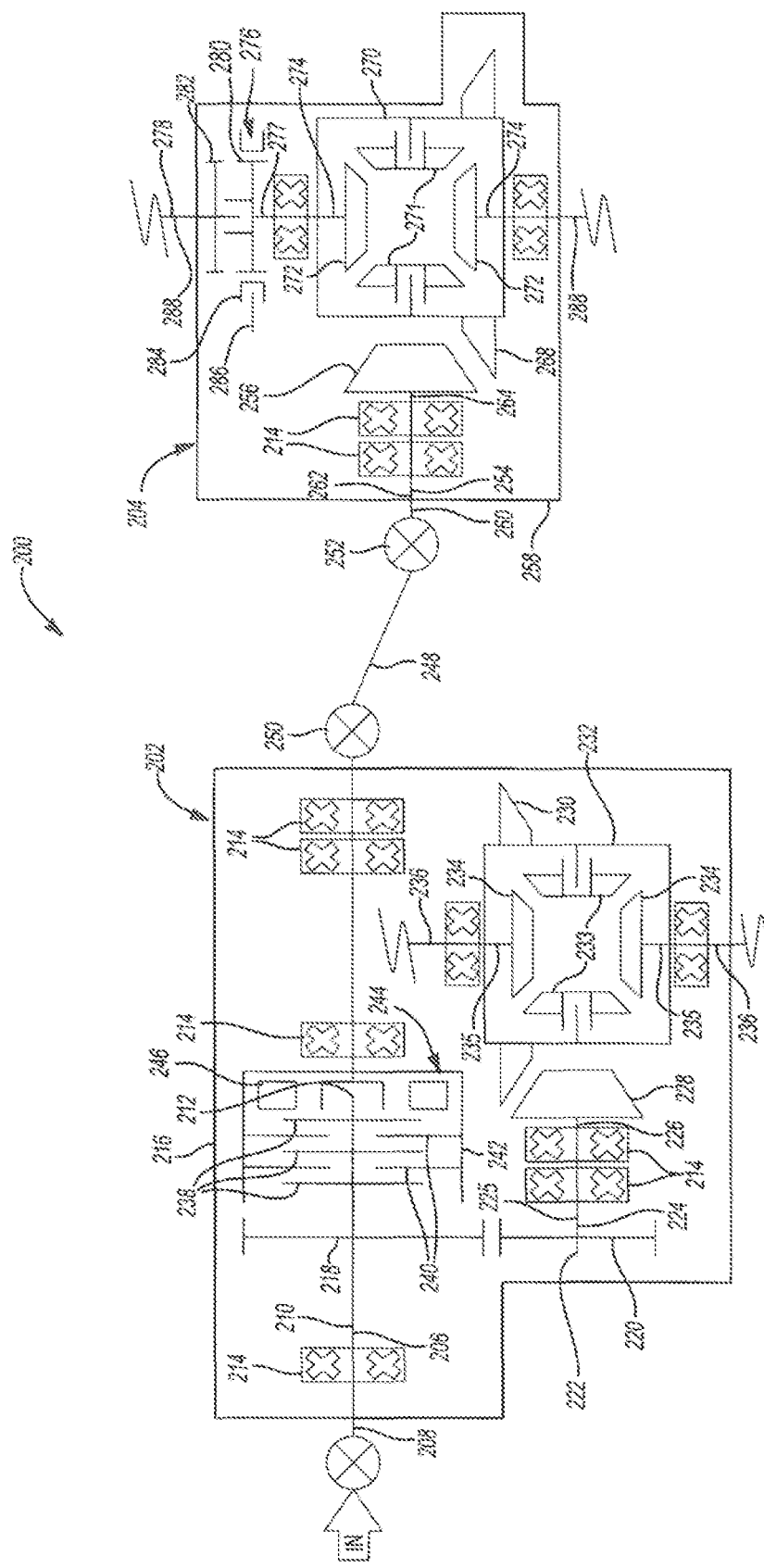
FIG. 2 is a schematic view of a drive axle system according to another embodiment of the present invention.

Another embodiment of the invention is depicted in FIG. 2. A drive axle system 200 comprises a first axle assembly 202 and a second axle assembly 204. The first axle assembly 202 includes a first axle input shaft 206 with a first end portion 208, a middle portion 210 and a second end portion 212. The first end portion 208 is connected to a source of rotational power, such as a transmission or engine. One or more bearings 214 and their associated races may be located about the first end portion 208 to facilitate rotation of the first axle input shaft 206 within a first axle assembly housing 216.

A first drop gear 218 is connected to the middle portion 210 of the first axle input shaft 206. The first drop gear 218 may be separately formed and splined to the middle portion 210 or it may be unitary with the middle portion 210, as shown in FIG. 2. The first drop gear 218 is meshed with a second gear 220.

The second gear 220 may be separately formed and splined to a first end portion 222 of a first axle pinion shaft 224, or the second gear 220 may be unitary with the first end portion 222 of the first axle pinion shaft 224. The first axle pinion shaft 224 may also comprise a middle portion 225 and a second end portion 226. The middle portion 225 may be supported by one or more bearings 214 and their associated races to permit the first axle pinion shaft 224 to rotate within the first axle assembly housing 216.

The second end portion 226 of the first axle pinion shaft 224 has a first pinion gear 228 mounted in a unitary fashion therewith. The first pinion gear 228 is meshed in a hypoid fashion with a first axle driving gear 230 to provide rotation to the first axle driving gear 230.

The first axle driving gear 230 may be such as, by way of example only, an 18 inch ring gear, but gears of other sizes are also permissible.

The first axle driving gear 230 is mounted on, or connected, to a first wheel differential case 232. At least two pinion gears 233 and at least two side gears 234 are located within the first wheel differential case 232. As known by those skilled in the art, the pinion gears 233 and the side gears 234 are connected to one another. The side gears 234 are also connected to axle half shafts 235. The axle half shafts 235 extend from the first wheel differential case 232 to a wheel end 236. The wheel end 236 supports wheels and tires (not shown).

The second end portion 212 of the first axle input shaft 206 has a first plurality of axially movable discs 238 connected thereto. Each of the discs 238 may be connected directly to the second end portion 212, as shown in FIG. 2, or they may be located on a sleeve (not shown) located about the second end portion 212.

The first plurality of axially moveable discs 238 is interleaved with a second plurality of axially moveable discs 240. The second plurality of axially moveable discs 240 is located on an interior surface of a clutch bowl 242. The clutch bowl 242 is located radially outward in a concentric fashion from the first plurality of axially moveable discs 238. The second plurality of axially moveable discs 240 is selectively axially movable on the interior surface of the clutch bowl 242. The second end portion 212 or a sleeve, the first plurality of axially moveable discs 238, the second plurality of axially moveable discs 240, and the clutch bowl 242 form an inter-axle clutch 244.

The first plurality of axially moveable discs 238 and the second plurality of axially moveable discs 240 may be selectively compressed so as to couple the clutch bowl 242 and the first axle input shaft 206. The selective compression is applied by an actuator 246. The actuator 246 may be a pneumatic actuator, an electromechanical actuator or a hydraulic actuator. Any of the foregoing may be connected to a vehicle anti-lock braking system to facilitate further vehicle control via the driveline.

The clutch bowl 242 is connected to a yoke (not shown). The yoke is connected to a propeller shaft 248, such as through a first universal joint 250. The propeller shaft 248 is connected to a second universal joint 252 located on the second axle assembly 204.

The second universal joint 252 is connected to a third pinion shaft 254. A third pinion gear 256 is connected to the third pinion shaft 254. The third pinion shaft 254, and thus the third pinion gear 256, is mounted for rotation within a second wheel differential housing 258. The third pinion gear 256 may be such as a spiral bevel, or it may be a hypoid.

The third pinion shaft 254 is connected to a yoke (not shown) at a first end portion 260. The yoke is connected to the propeller shaft 248, such as through the second universal joint 252. The propeller shaft 248 is connected to a second universal joint 252 located on the second axle assembly 204.

The third pinion shaft 254 also has a middle portion 262 and a second end portion 264. The middle portion 262 may be supported by one or more bearings 214 to facilitate the rotation of the third pinion shaft 254 within the second wheel differential housing 258. The second end portion 264 of the third pinion shaft 254 comprises the third pinion gear 256. The third pinion gear 256 is drivingly engaged with a second axle driving gear 268. The third pinion gear 256 may be engaged with the second axle driving gear 268 in a hypoid type arrangement, but other embodiments are permissible as well. The third pinion shaft 254 is drivingly engaged with the second axle driving gear 268 of the second axle assembly 204 through a single gear mesh.

As is known in the art and as used herein with respect to each of the embodiments disclosed, the single gear mesh includes driving a second component with a first component, wherein the first component rotating about an axis of the first component drives the second component. Further, it is understood that driving the second component through a locked or substantially non-rotating component is not the single gear mesh. As a first non-limiting example, it is understood that a pinion shaft engaged with a ring gear, wherein a force is applied to the ring gear by the pinion shaft being rotatably driven is the single gear mesh. As a second non-limiting example, it is understood that driving a second component with a first component using a shift collar is not the single gear mesh. As a third non-limiting example, it is understood that driving a second component with the first component through a locked differential is not the single gear mesh.

The second axle driving gear 268 is mounted on, or connected, to a second wheel differential case 270. At least two pinion gears 271 and at least two side gears 272 are located within the second wheel differential case 270. As known by those skilled in the art, the pinion gears 271 and the side gears 272 are connected to one another. The side gears 272 are also connected to axle half shafts 274.

The second axle driving gear 268 may have the same or a smaller diameter than the first axle driving gear 230. By way of example only, the first axle driving gear 230 may have a diameter of approximately 18 inches, while the second axle driving gear 268 may have a diameter of approximately 14 inches.

A shaft clutch 276 is mounted to one of the axle half shafts 274 and divides the axle half shaft 274 into a first portion 277 and a second portion 278. The shaft clutch 276 may be a splined dog type clutch. The shaft clutch 276 comprises a first toothed portion 280 formed on the first portion 277 and a second toothed portion 282 formed on the second portion 278. The first toothed portion 280 and the second toothed portion 282 may be directed formed on the first portion 277 and the second portion 278 or they may be formed on a sleeve located about the first portion 277 and the second portion 278. The first toothed portion 280 and the second toothed portion 282 respectively rotate with the first portion 277 and the second portion 278 of one of the axle half shafts 274.

The shaft clutch 276 further comprises a locking collar 284 disposed about one of the axle half shafts 274 and drivingly engaged with at least one of the first toothed portion 280 and the second toothed portion 282. The locking collar 284 is axially moveable along the first toothed portion 280 and the second toothed portion 282 and includes a plurality of teeth formed on an inner surface thereof. The locking collar 284 has a first position and a second position. As shown in FIG. 2, the locking collar 284 is in the first position and is drivingly engaged with the first toothed portion 280. In the second position, the locking collar 284 is drivingly engaged with the first toothed portion 280 and the second toothed portion 282, causing the first portion 277 to be drivingly engaged with the second portion 278.

The locking collar 284 may be selectively moved along the first toothed portion 280 and the second toothed portion 282 so as to couple the first portion 277 and the second portion 278. The locking collar 284 may be moved by an actuator 286 such as a pneumatic actuator, an electromechanical actuator, or a hydraulic actuator. The actuator 286 may be connected to the anti-lock braking system of the vehicle, as described below.

The axle half shafts 274 are connected to wheel ends 288. Each wheel end 288 supports wheels and tires (not shown).

The shaft clutch 276 permits the second portion 278 to be selectively disengaged from the side gear 272, the second axle driving gear 268, the propeller shaft 248, and thus the first axle assembly 202. As a result, the second axle driving gear 268 and the propeller shaft 248 can idle during vehicle operation.

The first axle assembly 202 may be utilized for the majority of the vehicle duty cycle requirements. The second axle assembly 204 may be selectively engaged when additional tractive effort is required. By selectively disengaging and idling the second axle assembly 204 using the inter-axle clutch 244, an efficiency over a full time driven first and second axle assembly is achieved by minimizing axle windage and parasitic drag losses.

The second axle assembly 204 may be selectively and automatically engaged by an automated system that comprises wheel speed sensors and a control algorithm that eliminates the need for driver control. In such a situation, the second axle assembly 204 can be automatically engaged at vehicle start up to proportion the drive torque between the first and second axle assemblies 202, 204. This has the effect of lowering the maximum torque on either the first and second axle assemblies 202, 204. Further, when a friction plate-type clutch is utilized in the inter-axle clutch 244 to engage the second axle assembly 204, as shown in FIG. 2, the clutch torque capacity can be used to limit the torque to the second axle assembly 204, thus permitting it to be downsized compared to the first axle assembly 202. The present invention also has the advantage of eliminating an inter-axle differential since the second axle assembly 204 is only used under low traction conditions or start up conditions. Also, the inter-axle clutch 244 may be allowed to slip when the drive axle system 200 negotiates a corner.

Figure 3:
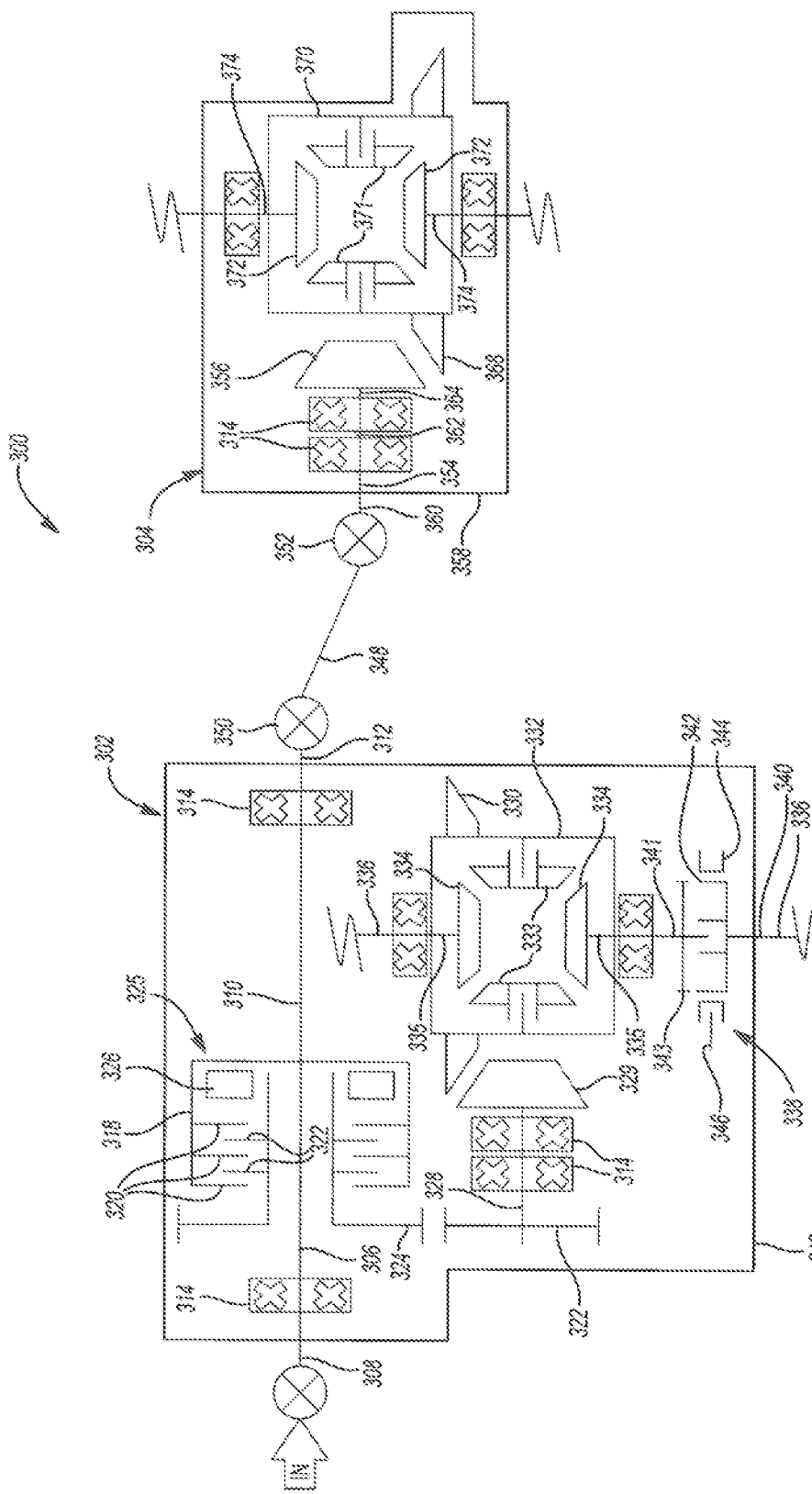
FIG. 3 is a schematic view of a drive axle system according to another embodiment of the present invention.

Another embodiment of the invention is depicted in FIG. 3. A drive axle system 300 comprises a first axle assembly 302 and a second axle assembly 304. The first axle assembly 302 includes a first axle shaft 306 with a first end portion 308, a middle portion 310 and a second end portion 312. The first end portion 308 is connected to a source of rotational power, such as a transmission or engine. One or more bearings 314 and their associated races may be located about the first end portion 308 to facilitate rotation of the first axle shaft 306 within a first axle assembly housing 316.

A clutch bowl 318 is mounted for rotation with the first axle shaft 306, such as through splines. The clutch bowl 318 is located radially outward from, and concentric with, the first axle shaft 306. A first plurality of axially moveable discs 320 extends radially inward from an inner surface of the clutch bowl 318. The first plurality of axially moveable discs 320 are interleaved with a second plurality of axially moveable discs 322 mounted on one end of a drop gear 324. Both pluralities of axially moveable discs 320, 322 are moveable in the axial direction along their respective mounting structures. The second end portion 312 or a sleeve, the clutch bowl 318, the first plurality of axially moveable discs 320, and the second plurality of axially moveable discs 322 form an inter-axle clutch 325.

The first plurality of axially moveable discs 320 and the second plurality of axially moveable discs 322 may be selectively compressed so as to couple the clutch bowl 318 and the first axle shaft 306. The selective compression is applied by an actuator 326. The actuator 326 may be a pneumatic actuator, an electromechanical actuator or a hydraulic actuator. Any of the foregoing may be connected to a vehicle anti-lock braking system to facilitate further vehicle control via the driveline.

The drop gear 324 has a set of radially extending teeth. The teeth of the drop gear 324 engage with a plurality of teeth formed on a second gear 327 fixed to a pinion shaft 328. The pinion shaft 328 has a first pinion gear 329 fixed thereto which engages a first axle driving gear 330. The first pinion gear 329 may be engaged with the first axle driving gear 330 in a hypoid type arrangement, but other embodiments are permissible as well.

The first axle driving gear 330 is mounted on, or connected, to a first wheel differential case 332. At least two pinion gears 333 and at least two side gears 334 are located within the first wheel differential case 332. As known by those skilled in the art, the pinion gears 333 and the side gears 334 are connected to one another. The side gears 334 are also connected to axle half shafts 335.

A shaft clutch 338 is mounted to one of the axle half shafts 335 and divides the axle half shaft 335 into a first portion 340 and a second portion 341. The shaft clutch 338 may be a splined dog type clutch. The shaft clutch 338 comprises a first toothed portion 342 formed on the first portion 340 and a second toothed portion 343 formed on the second portion 341. The first toothed portion 342 and the second toothed portion 343 may be directed formed on the first portion 340 and the second portion 341 or they may be formed on a sleeve located about the first portion 340 and the second portion 341. The first toothed portion 342 and the second toothed portion 343 respectively rotate with the first portion 340 and the second portion 341 of one of the axle half shafts 335.

The shaft clutch 338 further comprises a locking collar 344 disposed about one of the axle half shafts 335 and drivingly engaged with at least one of the first toothed portion 342 and the second toothed portion 343. The locking collar 344 is axially moveable along the first toothed portion 342 and the second toothed portion 343 and includes a plurality of teeth formed on an inner surface thereof. The locking collar 344 has a first position and a second position. As shown in FIG. 3, the locking collar 344 is in the first position and is drivingly engaged with the first toothed portion 342. In the second position, the locking collar 344 is drivingly engaged with the first toothed portion 342 and the second toothed portion 343, causing the first portion 340 to be drivingly engaged with the second portion 341.

The locking collar 344 may be selectively moved along the first toothed portion 342 and the second toothed portion 343 so as to couple the first portion 340 and the second portion 341. The locking collar 344 may be moved by an actuator 346 such as a pneumatic actuator, an electromechanical actuator, or a hydraulic actuator. The actuator 346 may be connected to the anti-lock braking system of the vehicle, as described below.

The axle half shafts 335 are connected to wheel ends 336. Each wheel end 336 supports wheels and tires (not shown).

The shaft clutch 338 permits the second portion 341 to be selectively disengaged from the side gear 334, the first axle driving gear 330, the pinion shaft 328, the drop gear 324, and thus the first axle shaft 306. As a result, the first axle driving gear 330 and the pinion shaft 328 can idle during vehicle operation.

The second end portion 312 of the first axle shaft 306 is supported by one or more bearings 314 and their associated races for rotation within the first axle assembly housing 316. The second end portion 312 of the first axle shaft 306 is connected to a yoke (not shown). The yoke is connected to a propeller shaft 348, such as through a first universal joint 350. The propeller shaft 348 is connected to a second universal joint 352 located on the second axle assembly 304.

The second universal joint 352 is connected to a second pinion shaft 354. A second pinion gear 356 is connected to the second pinion shaft 354. The second pinion shaft 354, and thus the second pinion gear 356, is mounted for rotation within a second wheel differential housing 358. The second pinion gear 356 may be such as a spiral bevel, or it may be a hypoid.

The second pinion shaft 354 is connected to a yoke (not shown) at a first end portion 360. The yoke is connected to the propeller shaft 348, such as through the second universal joint 352. The propeller shaft 348 is connected to a second universal joint 352 located on the second axle assembly 304.

The second pinion shaft 354 also has a middle portion 362 and a second end portion 364. The middle portion 362 may be supported by one or more bearings 314 to facilitate the rotation of the second pinion shaft 354 within the second wheel differential housing 358. The second pinion gear 356 is drivingly engaged with a second axle driving gear 368. The second pinion gear 356 may be engaged with the second axle driving gear 368 in a hypoid type arrangement, but other embodiments are permissible as well. The second pinion shaft 354 is drivingly engaged with the second axle driving gear 368 of the second axle assembly 304 through a single gear mesh.

The second axle driving gear 368 is mounted on, or connected, to a second wheel differential case 370. At least two pinion gears 371 and at least two side gears 372 are located within the second wheel differential case 370. As known by those skilled in the art, the pinion gears 371 and the side gears 372 are connected to one another. The side gears 372 are also connected to axle half shafts 374.

The second axle driving gear 368 may have the same or a greater diameter than the first axle driving gear 330. By way of example only, the first axle driving gear 330 may have a diameter of approximately 14 inches, while the second axle driving gear 368 may have a diameter of approximately 18 inches.

The second axle assembly 304 may be utilized for the majority of the vehicle duty cycle requirements. The first axle assembly 302 may be selectively engaged when additional tractive effort is required. By selectively disengaging and idling the second axle assembly 304 using the inter-axle clutch 325, an efficiency over a full time driven first and second axle assembly is achieved by minimizing axle windage and parasitic drag losses.

The first axle assembly 302 may be selectively and automatically engaged by an automated system that comprises wheel speed sensors and a control algorithm that eliminates the need for driver control. In such a situation, the first axle assembly 302 can be automatically engaged at vehicle start up to proportion the drive torque between the first and second axle assemblies 302, 304. This has the effect of lowering the maximum torque on either the first and second axle assemblies 302, 304. Further, when a friction plate-type clutch is utilized in the inter-axle clutch 325 to engage the first axle assembly 302, as shown in FIG. 3, the clutch torque capacity can be used to limit the torque to the first axle assembly 302, thus permitting it to be downsized compared to the second axle assembly 304. The present invention also has the advantage of eliminating an inter-axle differential since the first axle assembly 302 is only used under low traction conditions or start up conditions. Also, the inter-axle clutch 325 may be allowed to slip when the drive axle system 300 negotiates a corner.

Figure 4:
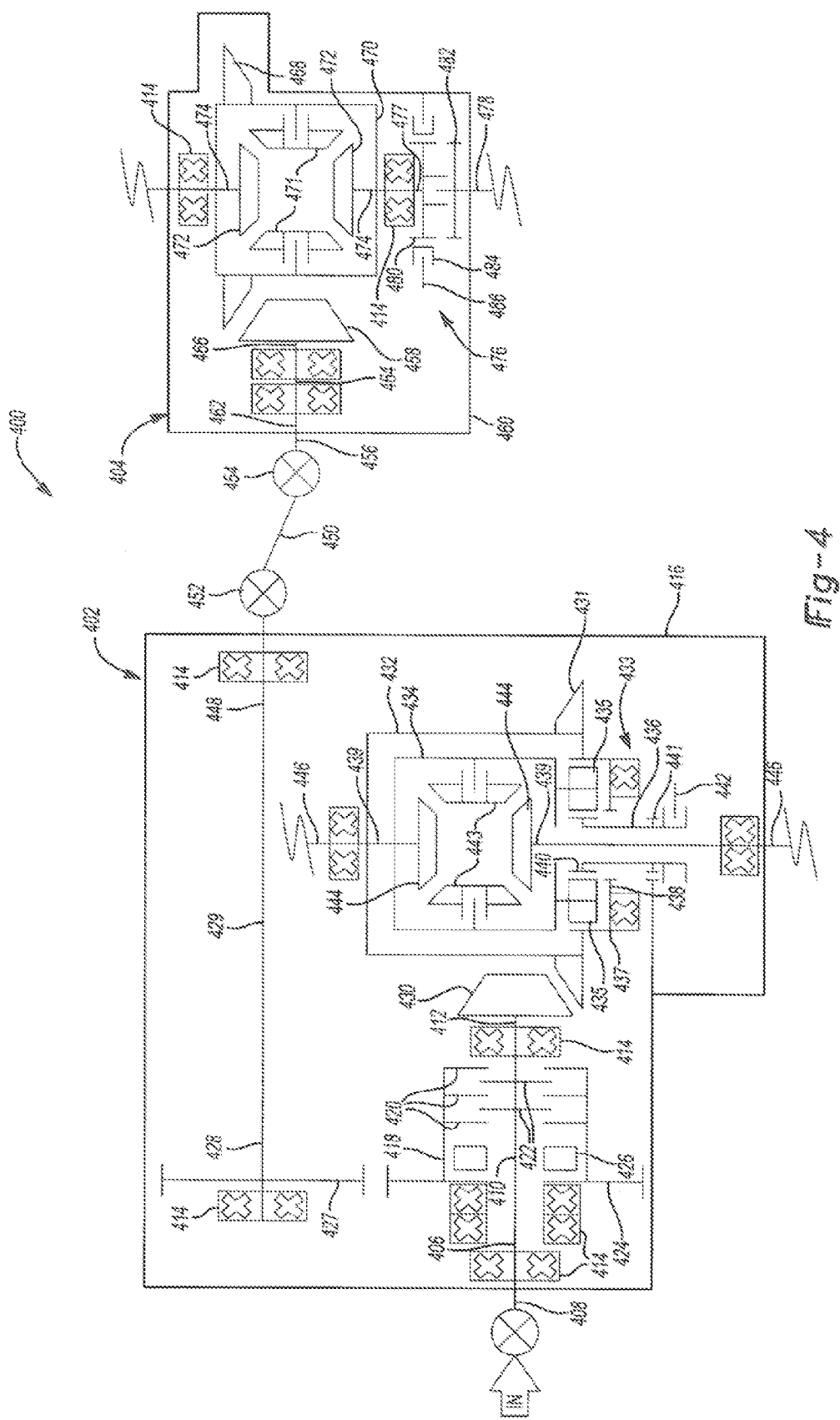
FIG. 4 is a schematic view of a drive axle system according to another embodiment of the present invention.

Another embodiment of the invention is depicted in FIG. 4. A drive axle system 400 comprises a first axle assembly 402 and a second axle assembly 404. The first axle assembly 402 includes a first axle input shaft 406 with a first end portion 408, a middle portion 410 and a second end portion 412. The first end portion 408 is connected to a source of rotational power, such as a transmission or engine. One or more bearings 414 and their associated races may be located about the first end portion 408 to facilitate rotation of the first axle input shaft 406 within a first axle assembly housing 416.

A clutch bowl 418 is mounted concentrically about and radially outward from the first axle input shaft 406. One or more bearings 414 and their associated races may be located about a portion of the clutch bowl 418 to facilitate rotation of the clutch bowl 418 within the first axle assembly housing 416. A first plurality of axially moveable discs 420 extends radially inward from an inner surface of the clutch bowl 418. The first plurality of axially moveable discs 420 are interleaved with a second plurality of axially moveable discs 422 mounted on the first axle input shaft 406. As shown in FIG. 4, the first plurality of axially moveable discs 420 comprises three discs and the second plurality of axially moveable discs 422 comprises two discs; however, it is understood the first plurality of axially moveable discs 420 and the second plurality of axially moveable discs 422 may comprise any number of discs. Both pluralities of axially moveable discs 420, 422 are moveable in the axial direction along their respective mounting structures. A plurality of teeth formed in an outer surface of the clutch bowl 418 or a gear fixed to the outer surface of the clutch bowl forms a drop gear 424. The clutch bowl 418, the first plurality of axially moveable discs 420, and the second plurality of axially moveable discs 422 form an inter-axle clutch 425.

The first plurality of axially moveable discs 420 and the second plurality of axially moveable discs 422 may be selectively compressed so as to couple the clutch bowl 418 and the first axle input shaft 406. The selective compression is applied by an actuator 426. The actuator 426 may be a pneumatic actuator, an electromechanical actuator or a hydraulic actuator. Any of the foregoing may be connected to a vehicle anti-lock braking system to facilitate further vehicle control via the driveline.

The drop gear 424 has a set of radially extending teeth. The teeth of the drop gear 424 engage with a plurality of teeth formed on a second gear 427 fixed to a first end 428 of an output shaft 429. One or more bearings 414 and their associated races may be located about a portion of the output shaft 429 to facilitate rotation of the clutch output shaft 429 within the first axle assembly housing 416.

The first axle input shaft 406 has a first pinion gear 430 fixed thereto which engages a first axle driving gear 431. The first pinion gear 430 may be engaged with the first axle driving gear 431 in a hypoid type arrangement, but other embodiments are permissible as well. The first axle input shaft 406 is drivingly engaged with the first axle driving gear 431 of the first axle assembly 402 through a single gear mesh.

The first axle driving gear 431 is mounted on, or connected, to an outer case portion 432 of an axle ratio selection device 433. The axle ratio selection device 433 includes an inner case portion 434, the outer case portion 432, a plurality of case pinions 435, and a ratio selector 436. As is known in the art, the axle ratio selection device 433 comprises a planetary gear set; however, it is understood that the axle ratio selection device 433 may be any other type of multi speed selection device. The outer case portion 432 has a toothed case end 437. The inner case portion 434 is rotatably and concentrically mounted within the outer case portion 432. The plurality of case pinions 435 are rotatably mounted to an end of the inner case portion 434 and engage a case ring gear 438 formed on an inner surface of the outer case portion 432.

The ratio selector 436 is a hollow member disposed about one of a pair of axle half shafts 439. One or more bearings (not shown) and their associated races may be located about a portion of the ratio selector 436 to facilitate rotation of the ratio selector 436 within the first axle assembly housing 416.

The ratio selector 436 has a first toothed end 440 and a second toothed end 441 and may be placed in a first position or a second position along the case pinion 435. In the first position, the first toothed end 440 of the ratio selector 436 engages the toothed case end 437 and the case pinions 435, "locking out" the planetary gear set of the axle ratio selection device 433. When the ratio selector 436 is placed in the first position, the case ring gear 438, the ratio selector 436, and the case pinions 435 (and thus the inner case portion 434), are driven at a same angular velocity.

In the second position, the first toothed end 440 of the ratio selector 436 engages the case pinions 435 and the second toothed end 441 of the ratio selector 436 engages a toothed portion of the first axle assembly housing 416, fixing the first toothed end 440 with respect to the first axle assembly housing 416. When the ratio selector 436 is placed in the second position, the case ring gear 438 drives the case pinions 435, and thus the inner case portion 434, about the first toothed end 440 at a reduced ratio when compared to the ratio selector 436 placed in the first position.

The ratio selector 436 may be moved by an actuator 442 such as a pneumatic actuator, an electromechanical actuator, or a hydraulic actuator. The actuator 442 may be connected to the anti-lock braking system of the vehicle, as described below.

At least two pinion gears 443 and at least two side gears 444 are located within the inner case portion 434. As known by those skilled in the art, the pinion gears 443 and the side gears 444 are connected to one another. The side gears 443 are also connected to the axle half shafts 439.

The axle half shafts 439 are connected to wheel ends 446. Each wheel end 446 supports wheels and tires (not shown).

A second end 448 of the output shaft 429 is supported by one or more bearings 414 and their associated races for rotation within the first axle assembly housing 416. The second end 448 of the output shaft 429 is connected to a yoke (not shown). The yoke is connected to a propeller shaft 450, such as through a first universal joint 452. The propeller shaft 450 is connected to a second universal joint 454 located on the second axle assembly 404.

The second universal joint 454 is connected to a second pinion shaft 456. A second pinion gear 458 is connected to the second pinion shaft 456. The second pinion shaft 456, and thus the second pinion gear 458, is mounted for rotation within a second wheel differential housing 460. The second pinion gear 458 may be such as a spiral bevel, or it may be a hypoid. The second pinion shaft 456 is connected to a yoke (not shown) at a first end portion 462. The yoke is connected to the propeller shaft 450, such as through the second universal joint 454. The propeller shaft 450 is connected to a second universal joint 454 located on the second axle assembly 404.

The second pinion shaft 456 also has a middle portion 464 and a second end portion 466. The middle portion 464 may be supported by one or more bearings 414 to facilitate the rotation of the second pinion shaft 456 within the second wheel differential housing 460. The second pinion gear 458 is drivingly engaged with a second axle driving gear 468. The second pinion gear 458 may be engaged with the second axle driving gear 468 in a hypoid type arrangement, but other embodiments are permissible as well.

The second axle driving gear 468 is mounted on, or connected, to a second wheel differential case 470. At least two pinion gears 471 and at least two side gears 472 are located within the second wheel differential case 470. As known by those skilled in the art, the pinion gears 471 and the side gears 472 are connected to one another. The side gears 472 are also connected to axle half shafts 474. The second axle driving gear 468 may have the same or a different diameter than the first axle driving gear 431.

A shaft clutch 476 is mounted to one of the axle half shafts 474 and divides the axle half shaft 474 into a first portion 477 and a second portion 478. The shaft clutch 476 may be a splined dog type clutch. The shaft clutch 476 comprises a first toothed portion 480 formed on the first portion 477 and a second toothed portion 482 formed on the second portion 478. The first toothed portion 480 and the second toothed portion 482 may be directed formed on the first portion 477 and the second portion 478 or they may be formed on a sleeve located about the first portion 477 and the second portion 478. The first toothed portion 480 and the second toothed portion 482 respectively rotate with the first portion 477 and the second portion 478 of one of the axle half shafts 474.

The shaft clutch 476 further comprises a locking collar 484 disposed about one of the axle half shafts 474 and drivingly engaged with at least one of the first toothed portion 480 and the second toothed portion 482. The locking collar 484 is axially moveable along the first toothed portion 480 and the second toothed portion 482 and includes a plurality of teeth formed on an inner surface thereof. The locking collar 484 has a first position and a second position. As shown in FIG. 4, the locking collar 484 is in the first position and is drivingly engaged with the first toothed portion 480. In the second position, the locking collar 484 is drivingly engaged with the first toothed portion 480 and the second toothed portion 482, causing the first portion 477 to be drivingly engaged with the second portion 478.

The locking collar 484 may be selectively moved along the first toothed portion 480 and the second toothed portion 482 so as to couple the first portion 477 and the second portion 478. The locking collar 484 may be moved by an actuator 486 such as a pneumatic actuator, an electromechanical actuator, or a hydraulic actuator. The actuator 486 may be connected to the anti-lock braking system of the vehicle, as described below.

The shaft clutch 476 permits the second portion 478 to be selectively disengaged from the side gear 472, the second axle driving gear 468, the second pinion shaft 456, the propeller shaft 450, and thus the output shaft 429. As a result, the second axle driving gear 468, the second pinion shaft 456, the propeller shaft 450, and the output shaft 429 can idle during vehicle operation.

The first axle assembly 402 may be utilized for the majority of the vehicle duty cycle requirements. The ratio selector 436 of the axle ratio selection device 433 in the first position results in a gear ratio of the first axle assembly 402 selected for a high speed and low torque manner of operation. The gear ratio of the first axle assembly 402 having the axle ratio selection device 433 in the first position preferably is employed during a single axle mode of operation, where the high speed and low torque manner of operation is desired. The ratio selector 436 of the axle ratio selection device 433 in the second position results in a gear ratio of the first axle assembly 402 selected for a low speed and high torque manner of operation. The gear ratio of the first axle assembly 402 having the axle ratio selection device 433 in the second position preferably corresponds to a gear ratio of the second axle assembly 404 and is employed during a multi-axle mode of operation, where the low speed and high torque manner of operation is desired.

The second axle assembly 404 may be selectively engaged when additional tractive effort is required. By selectively disengaging and idling the second axle assembly 404 using the inter-axle clutch 425, an efficiency over a full time driven first and second axle assembly 402, 404 is achieved by minimizing axle windage and parasitic drag losses.

The second axle assembly 404 may be selectively and automatically engaged by an automated system that comprises wheel speed sensors and a control algorithm that eliminates the need for driver control. In such a situation, the second axle assembly 404 can be automatically engaged at vehicle start up to proportion the drive torque between the first and second axle assemblies 402, 404. This has the effect of lowering the maximum torque on either the first and second axle assemblies 402, 404. Further, when a friction plate-type clutch is utilized in the inter-axle clutch 425 to engage the second axle assembly 404, as shown in FIG. 4, the clutch torque capacity can be used to limit the torque to the second axle assembly 404, thus permitting it to be downsized compared to the first axle assembly 402. The present invention also has the advantage of eliminating an inter-axle differential since the second axle assembly 404 is only used under low traction conditions or start up conditions. Also, the inter-axle clutch 425 may be allowed to slip when the drive axle system 400 negotiates a corner.

Figure 5:
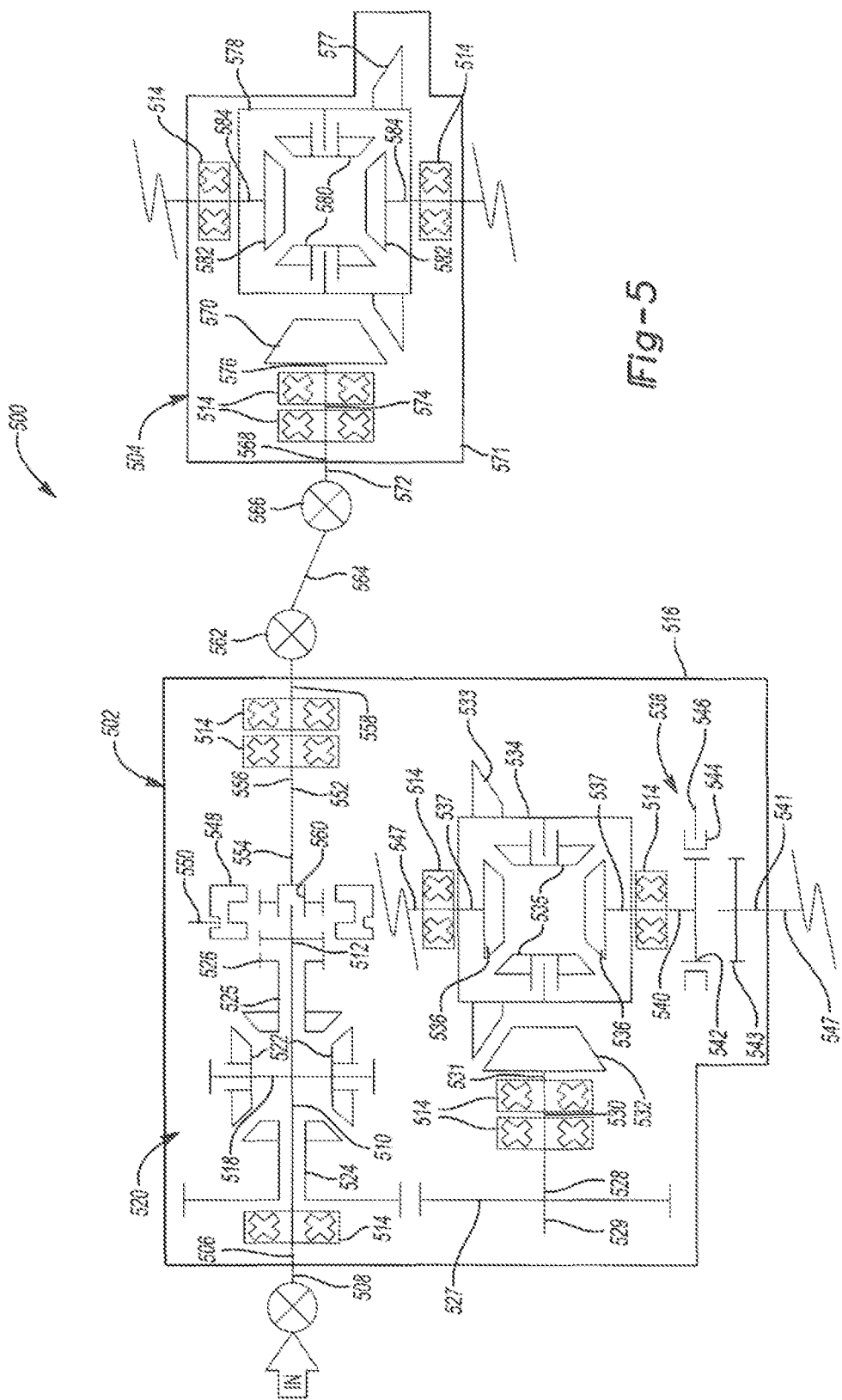
FIG. 5 is a schematic view of a drive axle system according to another embodiment of the present invention.

FIG. 5 depicts yet another embodiment of the present invention. FIG. 5 depicts a drive axle system 500 comprised of a first axle assembly 502 and a second axle assembly 504. The first axle assembly 502 includes a first axle input shaft 506 with a first end portion 508, a middle portion 510 and a second end portion 512. The first end portion 508 is connected to a source of rotational power, such as a transmission or an engine. One or more bearings 514 and their associated races may be located about the first end portion 508 to facilitate rotation of the first axle input shaft 506 within a first axle assembly housing 516.

The middle portion 510 may have a set of splines (not shown) located circumferentially about an outer surface of the first axle input shaft 506. A spider 518 having an inner diameter with a complimentary set of splines is located over the set of splines formed on the first axle input shaft 506. The spider 518 is thus rotatably connected with the first axle input shaft 506.

The spider 518 extends radially outward circumferentially from the first axle input shaft 506. The spider 518 is part of an inter-axle differential 520 which also comprises a plurality of pinion gears 522. Each of the pinion gears 522 may be a bevel type pinion gear. At least two pinion gears 522 are located on the spider 518, and more may be used. The spider 518 may extend through an aperture formed in each of the pinion gears 522.

The pinion gears 522 engage on one side with a first drop gear 524 and a second axle side gear 525 on an opposing side. The pinion gears 522 apply a rotational force to side gear teeth formed on the first drop gear 524 as well as side gear teeth formed on the second axle side gear 525.

The second axle side gear 525, in addition to the side gear teeth formed thereon, includes of a first set of clutch teeth 526 formed thereon.

The first drop gear 524 is concentric with the middle portion 510 of the first axle input shaft 506. In addition to the side gear teeth formed thereon, a set of drop gear teeth are located on the radially outward-most point of the first drop gear 524. The first drive gear teeth are meshed with another set of teeth of a second drop gear 527.

The second drop gear 527 is concentric with a first pinion shaft 528 located below the first axle input shaft 506. The second drop gear 527 may have a splined inner surface that engages with a splined outer surface of the first pinion shaft 528. The second drop gear 527 is located on a first end portion 529 of the first pinion shaft 528.

The first pinion shaft 528 also has a middle portion 530 and a second end portion 531. The middle portion 530 may be supported for rotation within the first axle assembly housing 516 by one or more bearings 514 and their associated races. The second end portion 531 includes a first pinion gear 532 disposed thereon.

The first pinion gear 532 is located in driving engagement with a first axle driving gear 533, such as in a hypoid orientation. Other orientations of the first axle driving gear 533 and the first pinion gear 532 are also permissible.

The first axle driving gear 533 is mounted on, or connected, to a first wheel differential case 534. At least two pinion gears 535 and at least two side gears 536 are located within the first wheel differential case 534. As known by those skilled in the art, the pinion gears 535 and the side gears 536 are connected to one another. The side gears 536 are also connected to axle half shafts 537.

A shaft clutch 538 is mounted to one of the axle half shafts 537 and divides the axle half shaft 537 into a first portion 540 and a second portion 541. The shaft clutch 538 may be a splined dog type clutch. The shaft clutch 538 comprises a first toothed portion 542 formed on the first portion 540 and a second toothed portion 543 formed on the second portion 541. The first toothed portion 542 and the second toothed portion 543 may be directed formed on the first portion 540 and the second portion 541 or they may be formed on a sleeve located about the first portion 540 and the second portion 541. The first toothed portion 542 and the second toothed portion 543 respectively rotate with the first portion 540 and the second portion 541 of one of the axle half shafts 537.

The shaft clutch 538 further comprises a locking collar 544 disposed about one of the axle half shafts 537 and drivingly engaged with at least one of the first toothed portion 542 and the second toothed portion 543. The locking collar 544 is axially moveable along the first toothed portion 542 and the second toothed portion 543 and includes a plurality of teeth formed on an inner surface thereof. The locking collar 544 has a first position and a second position. As shown in FIG. 5, the locking collar 544 is in the first position and is drivingly engaged with the first toothed portion 542. In the second position, the locking collar 544 is drivingly engaged with the first toothed portion 542 and the second toothed portion 543, causing the first portion 540 to be drivingly engaged with the second portion 541.

The locking collar 544 may be selectively moved along the first toothed portion 542 and the second toothed portion 543 so as to couple the first portion 540 and the second portion 541. The locking collar 544 may be moved by an actuator 546 such as a pneumatic actuator, an electromechanical actuator, or a hydraulic actuator. The actuator 546 may be connected to the anti-lock braking system of the vehicle, as described below.

The axle half shafts 537 are connected to wheel ends 547. Each wheel end 547 supports wheels and tires (not shown).

The shaft clutch 538 permits the second portion 541 to be selectively disengaged from the side gear 536, the first axle driving gear 533, the first pinion shaft 528, the second drop gear 527, and thus the first drop gear 524. As a result, the first axle driving gear 533 and the first pinion shaft 528 can idle during vehicle operation.

The first axle input shaft 506 is provided with a set of teeth formed on the second end portion 512 for engaging an output shaft clutch collar 548. Preferably, the teeth formed on the second end portion 512 are unitary with the first axle input shaft 506. However, it is permissible for the teeth to be located on a collar that is splined to the first axle input shaft 506. The teeth formed on the second end portion 512 are located axially adjacent a set of clutch teeth formed on the second axle side gear 525.

The output shaft clutch collar 548 is located radially outward from and concentric with at least a portion of the first axle input shaft 506. The output shaft clutch collar 548 may be connected to an actuator 550, such as a shift fork, for selectively moving the output shaft clutch collar 548 in an axial direction. The output shaft clutch collar 548 may have a circumferential groove located in an outer surface thereof. The shift fork may engage with all or a portion of the circumferential groove to move the output shaft clutch collar 548 in the axial direction.

The output shaft clutch collar 548 has an inner surface with a first set of teeth and a second set of teeth formed thereon. The first set of teeth may be located on a front portion of the inner surface of the output shaft clutch collar 548 while the second set of teeth are located on an rear side of the inner surface of the output shaft clutch collar 548.

The first set of teeth formed on the inner surface of the output shaft clutch collar 548 may selectively engage with either the set of teeth formed on the second end portion 512 of the first axle input shaft 506 or the set of clutch teeth formed on the second axle side gear 525. The second set of teeth formed on the inner surface of the output shaft clutch collar 548 is always engaged with a set of teeth on an outer surface of an output shaft 552. The set of teeth on the outer surface of the output shaft 552 have a predetermined axial length. The length of teeth formed on the output shaft 552 is sufficient to permit the second set of teeth formed on the output shaft clutch collar 548 to always be engaged therewith regardless of the axial position of the output shaft clutch collar 548.

The output shaft 552 comprises a first end portion 554, a middle portion 556, and a second end portion 558. The set of teeth on the outer surface of the output shaft 552 are formed on the first end portion 554. The first end portion 554 may also define an inner axial cavity 560 designed to receive at least a portion of the second end portion 512 of the first axle input shaft 506 therein.

The middle portion 556 of the output shaft 552 may be supported by one or more bearings 514 and their associated races. The bearings 514 facilitate rotation of the output shaft 552 within the first axle assembly housing 516.

The second end portion 558 comprises a yoke (not shown) for connecting with a first universal joint 566. The first universal joint 566 is connected to a propeller shaft 564. The propeller shaft 564 extends between the first axle assembly 502 and the second axle assembly 504.

A second universal joint 566 is connected to a second pinion shaft 568. A second pinion gear 570 is connected to the second pinion shaft 568. The second pinion shaft 568, and thus the second pinion gear 570, is mounted for rotation within a second wheel differential housing 571. The second pinion gear 570 may be such as a spiral bevel, or it may be a hypoid.

The second pinion shaft 568 is connected to a yoke (not shown) at a first end portion 572. The yoke is connected to the propeller shaft 564, such as through the second universal joint 566.

The second pinion shaft 568 also has a middle portion 574 and a second end portion 576. The middle portion 574 may be supported by one or more bearings 514 to facilitate the rotation of the second pinion shaft 568 within the second wheel differential housing 571. The second pinion gear 570 is drivingly engaged with a second axle driving gear 577. The second pinion gear 570 may be engaged with the second axle driving gear 577 in a hypoid type arrangement, but other embodiments are permissible as well. The second pinion shaft 568 is drivingly engaged with the second axle driving gear 577 of the second axle assembly 504 through a single gear mesh.

The second axle driving gear 577 is mounted on, or connected, to a second wheel differential case 578. At least two pinion gears 580 and at least two side gears 582 are located within the second wheel differential case 578. As known by those skilled in the art, the pinion gears 580 and the side gears 582 are connected to one another. The side gears 582 are also connected to axle half shafts 584.

The second axle driving gear 577 may have the same or a greater diameter than the first axle driving gear 533. By way of example only, the first axle driving gear 533 may have a diameter of approximately 14 inches, while the second axle driving gear 577 may have a diameter of approximately 18 inches.

The drive axle system 500 may be placed in a first mode of operation and a second mode of operation. In the first mode of operation, the first axle assembly 502 is disengaged and the second axle assembly 504 is engaged. In the second mode of operation, the first axle assembly 502 and the second axle assembly 504 is engaged and driven through the inter-axle differential 520.

To place the drive axle system 500 in the first mode of operation, the output shaft clutch collar 548 is placed in driving engagement with the first axle input shaft 506 and the output shaft 552. Further, the locking collar 544 of the shaft clutch 538 is placed in the first position. When the output shaft clutch collar 548 is placed in driving engagement with the first axle input shaft 506 and the output shaft 552, the spider 518 is driven, causing the second axle side gear 525 to rotate about the first axle input shaft 506 in a non-driving manner. Because the locking collar 544 of the shaft clutch 538 is placed in the first position, the first axle driving gear 533, the first pinion shaft 528, the second drop gear 527, and the first drop gear 524 are drivingly disengaged from the axle half shafts 537, allowing the first axle driving gear 533, the first pinion shaft 528, the second drop gear 527, and the first drop gear 524 to remain in a non-moving state when the drive axle system 500 is placed in the first mode of operation. The drive axle system 500 placed in the first mode of operation is employed where a single axle drive and a high speed and low torque manner of operation is desired.

To place the drive axle system 500 in the second mode of operation, the output shaft clutch collar 548 is placed in driving engagement with the first set of clutch teeth 526 formed on the second axle side gear 525 and the output shaft 552. Further, the locking collar 544 of the shaft clutch 538 is placed in the second position. When the output shaft clutch collar 548 is placed in driving engagement with the second axle side gear 525 and the output shaft 552, the spider 518 drivingly engages both the second axle side gear 525 and the first drop gear 524. Because the locking collar 544 of the shaft clutch 538 is placed in the second position, the first axle driving gear 533 drivingly engages the axle half shafts 537. The drive axle system 500 placed in the second mode of operation is employed where a multi-axle drive and a low speed and high torque manner of operation is desired.

The first axle assembly 502 may be selectively engaged when additional tractive effort is required. By selectively disengaging and idling the first axle assembly 502 using the output shaft clutch collar 548, an efficiency over a full time driven first and second axle assembly 502, 504 is achieved by minimizing axle windage and parasitic drag losses.

The first axle assembly 502 may be selectively and automatically engaged by an automated system that comprises wheel speed sensors and a control algorithm that eliminates the need for driver control. In such a situation, the first axle assembly 502 can be automatically engaged at vehicle start up or when the vehicle is in a substantially non-moving state to proportion the drive torque between the first and second axle assemblies 502, 504. This has the effect of lowering the maximum torque on either the first and second axle assemblies 502, 504.

Figure 6:
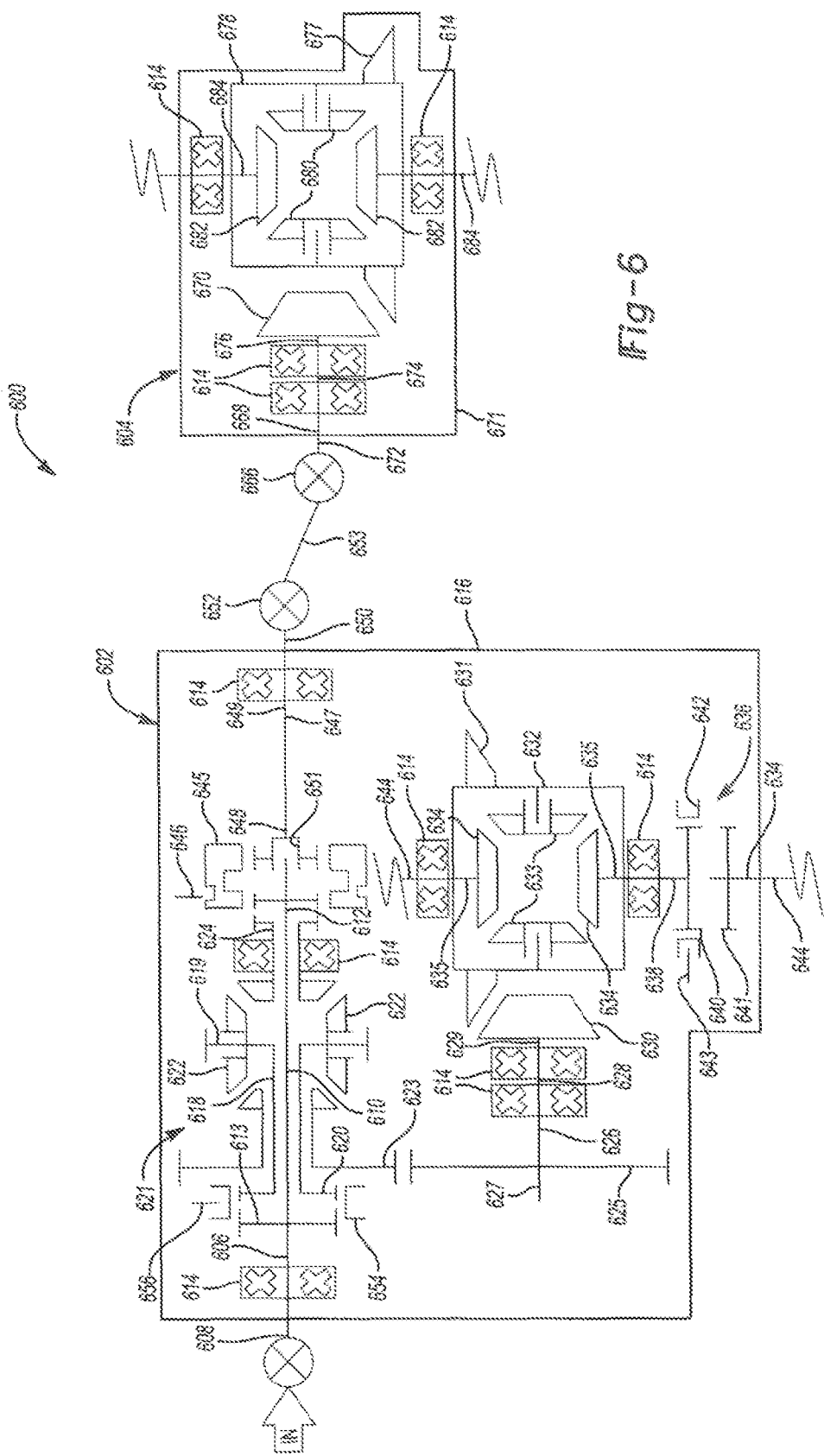
FIG. 6 is a schematic view of a drive axle system according to another embodiment of the present invention.

FIG. 6 depicts yet another embodiment of the present invention. FIG. 6 depicts a drive axle system 600 comprised of a first axle assembly 602 and a second axle assembly 604.

The first axle assembly 602 includes a first axle input shaft 606 with a first end portion 608, a middle portion 610 and a second end portion 612. The first end portion 608 is connected to a source of rotational power, such as a transmission or an engine. A first engagement portion 613 including a set of clutch teeth extends radially from the first axle input shaft 606 adjacent the first end portion 608. One or more bearings 614 and their associated races may be located about the first end portion 608 to facilitate rotation of the first axle input shaft 606 within a first axle assembly housing 616.

A spider shaft 618 is rotatably disposed about the first axle input shaft 606. One or more bearings (not shown) and their associated races may be located about the first axle input shaft 606 or the spider shaft 618 to facilitate rotation of the first axle input shaft 606 within the first axle assembly housing 616. The spider shaft 618 includes a pinion end 619 and a spider engagement end 620.

The pinion end 619 extends radially outward circumferentially from the first axle input shaft 606. The pinion end is part of an inter-axle differential 621 which also comprises a plurality of pinion gears 622. Each of the pinion gears 622 may be a bevel type pinion gear. At least two pinion gears 622 are located on the pinion end 619, and more may be used. The pinion end 619 may extend through an aperture formed in each of the pinion gears 622.

The spider engagement end 620 extends radially outward circumferentially from the first axle input shaft 606 opposite the pinion end 619 of the spider shaft 618. The spider engagement end 620 is positioned adjacent the first engagement portion 613 of the first axle input shaft 606. The spider engagement end 620 includes a set of clutch teeth formed thereon.

The pinion gears 622 engage on one side with a first drop gear 623 and a second axle side gear 624 on an opposing side. The pinion gears 622 apply a rotational force to side gear teeth formed on the first drop gear 623 as well as side gear teeth formed on the second axle side gear 624.

The second axle side gear 624, in addition to the side gear teeth formed thereon, includes of a set of clutch teeth formed thereon. One or more bearings (not shown) and their associated races may be located about the second axle side gear 624 to facilitate rotation of the second axle side gear 624 within the first axle assembly housing 616.

The first drop gear 623 is concentric with the first axle input shaft 506 and the spider shaft 618. In addition to the side gear teeth formed thereon, a set of drop gear teeth are located on the radially outward-most point of the first drop gear 623. The first drive gear teeth are meshed with another set of teeth of a second drop gear 625.

The second drop gear 625 is concentric with a first pinion shaft 626 located below the first axle input shaft 606. The second drop gear 625 may have a splined inner surface that engages with a splined outer surface of the first pinion shaft 626. The second drop gear 625 is located on a first end portion 627 of the first pinion shaft 626.

The first pinion shaft 626 also has a middle portion 628 and a second end portion 629. The middle portion 628 may be supported for rotation within the first axle assembly housing 616 by one or more bearings 614 and their associated races. The second end portion 629 includes a first pinion gear 630 disposed thereon.

The first pinion gear 630 is located in driving engagement with a first axle driving gear 631, such as in a hypoid orientation. Other orientations of the first axle driving gear 631 and the first pinion gear 630 are also permissible.

The first axle driving gear 631 is mounted on, or connected, to a first wheel differential case 632. At least two pinion gears 633 and at least two side gears 634 are located within the first wheel differential case 632. As known by those skilled in the art, the pinion gears 633 and the side gears 634 are connected to one another. The side gears 634 are also connected to axle half shafts 635.

A shaft clutch 636 is mounted to one of the axle half shafts 635 and divides the axle half shaft 635 into a first portion 638 and a second portion 639. The shaft clutch 636 may be a splined dog type clutch. The shaft clutch 636 comprises a first toothed portion 640 formed on the first portion 638 and a second toothed portion 641 formed on the second portion 639. The first toothed portion 640 and the second toothed portion 641 may be directed formed on the first portion 638 and the second portion 639 or they may be formed on a sleeve located about the first portion 638 and the second portion 639. The first toothed portion 640 and the second toothed portion 641 respectively rotate with the first portion 638 and the second portion 639 of one of the axle half shafts 635.

The shaft clutch 636 further comprises a locking collar 642 disposed about one of the axle half shafts 635 and drivingly engaged with at least one of the first toothed portion 640 and the second toothed portion 641. The locking collar 642 is axially moveable along the first toothed portion 640 and the second toothed portion 641 and includes a plurality of teeth formed on an inner surface thereof. The locking collar 642 has a first position and a second position. As shown in FIG. 6, the locking collar 642 is in the first position and is drivingly engaged with the first toothed portion 640. In the second position, the locking collar 642 is drivingly engaged with the first toothed portion 640 and the second toothed portion 641, causing the first portion 638 to be drivingly engaged with the second portion 639.

The locking collar 642 may be selectively moved along the first toothed portion 640 and the second toothed portion 641 so as to couple the first portion 638 and the second portion 639. The locking collar 642 may be moved by an actuator 643 such as a pneumatic actuator, an electromechanical actuator, or a hydraulic actuator. The actuator 643 may be connected to the anti-lock braking system of the vehicle, as described below.

The axle half shafts 635 are connected to wheel ends 644. Each wheel end 644 supports wheels and tires (not shown).

The shaft clutch 636 permits the second portion 639 to be selectively disengaged from the side gear 634, the first axle driving gear 631, the first pinion shaft 626, the second drop gear 625, and thus the first drop gear 623. As a result, the first axle driving gear 631 and the first pinion shaft 626 can idle during vehicle operation.

The first axle input shaft 606 is provided with a set of teeth formed on the second end portion 612 for engaging an output shaft clutch collar 645. Preferably, the teeth formed on the second end portion 612 are unitary with the first axle input shaft 606. However, it is permissible for the teeth to be located on a collar that is splined to the first axle input shaft 606. The teeth formed on the second end portion 612 are located axially adjacent a set of clutch teeth formed on the second axle side gear 624.

The output shaft clutch collar 645 is located radially outward from and concentric with at least a portion of the first axle input shaft 606. The output shaft clutch collar 645 may be connected to an actuator 646, such as a shift fork, for selectively moving the output shaft clutch collar 645 in an axial direction. The output shaft clutch collar 645 may have a circumferential groove located in an outer surface thereof. The shift fork may engage with all or a portion of the circumferential groove to move the output shaft clutch collar 645 in the axial direction.

The output shaft clutch collar 645 has an inner surface with a first set of teeth and a second set of teeth formed thereon. The first set of teeth may be located on a front portion of the inner surface of the output shaft clutch collar 645 while the second set of teeth are located on an rear side of the inner surface of the output shaft clutch collar 645.

The first set of teeth formed on the inner surface of the output shaft clutch collar 645 may selectively engage with either the set of teeth formed on the second end portion 612 of the first axle input shaft 606 or the set of clutch teeth formed on the second axle side gear 624. The second set of teeth formed on the inner surface of the output shaft clutch collar 645 is always engaged with a set of teeth on an outer surface of an output shaft 647. The set of teeth on the outer surface of the output shaft 647 have a predetermined axial length. The length of teeth formed on the output shaft 647 is sufficient to permit the second set of teeth formed on the output shaft clutch collar 645 to always be engaged therewith regardless of the axial position of the output shaft clutch collar 645.

The output shaft 647 comprises a first end portion 648, a middle portion 649, and a second end portion 650. The set of teeth on the outer surface of the output shaft 647 are formed on the first end portion 648. The first end portion 648 may also define an inner axial cavity 651 designed to receive at least a portion of the second end portion 612 of the first axle input shaft 606 therein.

The middle portion 649 of the output shaft 647 may be supported by one or more bearings 614 and their associated races. The bearings 614 facilitate rotation of the output shaft 647 within the first axle assembly housing 616.

The second end portion 650 comprises a yoke (not shown) for connecting with a first universal joint 652. The first universal joint 652 is connected to a propeller shaft 653. The propeller shaft 653 extends between the first axle assembly 602 and the second axle assembly 604.

The set of clutch teeth formed on the first engagement portion 613 of the first axle input shaft 606 engage a spider shaft clutch collar 654. Preferably, set of clutch teeth formed on the first engagement portion 613 are unitary with the first axle input shaft 606. However, it is permissible for the teeth to be located on a collar that is splined to the first axle input shaft 606. The set of clutch teeth formed on the first engagement portion 613 are located axially adjacent the set of clutch teeth formed on the spider engagement end 620 of the spider shaft 618.

The spider shaft clutch collar 654 is located radially outward from and concentric with at least a portion of the first axle input shaft 606. The spider shaft clutch collar 654 may be connected to an actuator 656, such as a shift fork, for selectively moving the spider shaft clutch collar 654 in an axial direction. The spider shaft clutch collar 654 may have a circumferential groove located in an outer surface thereof. The shift fork may engage with all or a portion of the circumferential groove to move the spider shaft clutch collar 654 in the axial direction.

The spider shaft clutch collar 654 has an inner surface with a set of teeth formed thereon. The set of teeth formed on the inner surface of the spider shaft clutch collar 654 is always engaged with the set of clutch teeth formed on the first engagement portion 613. The set of clutch teeth formed on the first engagement portion 613 have a predetermined axial length. The length of the set of clutch teeth formed on the first engagement portion 613 is sufficient to permit the set of teeth formed on the spider shaft clutch collar 654 to always be engaged therewith regardless of the axial position of the spider shaft clutch collar 654. The set of teeth formed on the inner surface of the spider shaft clutch collar 654 may selectively engage the set of clutch teeth formed on the spider engagement end 620 of the spider shaft 618 when the actuator 656 moves the spider shaft clutch collar 654 in an axial direction.

A second universal joint 666 is connected to a second pinion shaft 668. A second pinion gear 670 is connected to the second pinion shaft 668. The second pinion shaft 668, and thus the second pinion gear 670, is mounted for rotation within a second wheel differential housing 671. The second pinion gear 670 may be such as a spiral bevel, or it may be a hypoid.

The second pinion shaft 668 is connected to a yoke (not shown) at a first end portion 672. The yoke is connected to the propeller shaft 653, such as through the second universal joint 666.

The second pinion shaft 668 also has a middle portion 674 and a second end portion 676. The middle portion 674 may be supported by one or more bearings 614 to facilitate the rotation of the second pinion shaft 668 within the second wheel differential housing 671. The second pinion gear 670 is drivingly engaged with a second axle driving gear 677. The second pinion gear 670 may be engaged with the second axle driving gear 677 in a hypoid type arrangement, but other embodiments are permissible as well. The second pinion shaft 668 is drivingly engaged with the second axle driving gear 677 of the second axle assembly 604 through a single gear mesh.

The second axle driving gear 677 is mounted on, or connected, to a second wheel differential case 678. At least two pinion gears 680 and at least two side gears 682 are located within the second wheel differential case 678. As known by those skilled in the art, the pinion gears 680 and the side gears 682 are connected to one another. The side gears 682 are also connected to axle half shafts 684.

The second axle driving gear 677 may have the same or a greater diameter than the first axle driving gear 631. By way of example only, the first axle driving gear 631 may have a diameter of approximately 14 inches, while the second axle driving gear 677 may have a diameter of approximately 18 inches.

The drive axle system 600 may be placed in a first mode of operation and a second mode of operation. In the first mode of operation, the first axle assembly 602 is disengaged and the second axle assembly 604 is engaged. In the second mode of operation, the first axle assembly 602 and the second axle assembly 604 is engaged and driven through the inter-axle differential 621.

To place the drive axle system 600 in the first mode of operation, the output shaft clutch collar 645 is placed in driving engagement with the first axle input shaft 606 and the output shaft 647. Further, the locking collar 642 of the shaft clutch 636 is placed in the first position and the spider shaft clutch collar 654 is placed solely in engagement with the first engagement portion 613. When the spider shaft clutch collar 654 is placed solely in engagement with the first engagement portion 613, the spider shaft 618 is non-driven, causing the pinion gears 622 and the second axle side gear 624 to be placed in a non-driven state as well. Because the locking collar 642 of the shaft clutch 636 is placed in the first position, the first axle driving gear 631, the first pinion shaft 626, the second drop gear 625, and the first drop gear 623 are drivingly disengaged from the axle half shafts 635, allowing the first axle driving gear 631, the first pinion shaft 626, the second drop gear 625, and the first drop gear 623 to remain in a non-moving state when the drive axle system 600 is placed in the first mode of operation. The drive axle system 600 placed in the first mode of operation is employed where a single axle drive and a high speed and low torque manner of operation is desired.

To place the drive axle system 600 in the second mode of operation, the output shaft clutch collar 645 is placed in driving engagement with the side gear teeth formed on the second axle side gear 624 and the output shaft 647. Further, the locking collar 642 of the shaft clutch 636 is placed in the second position and the spider shaft clutch collar 654 is placed in engagement with the first engagement portion 613 and the spider engagement end 620 of the spider shaft 618. When the output shaft clutch collar 645 is placed in driving engagement with the second axle side gear 624 and the output shaft 647, and the spider shaft clutch collar 654 is placed in engagement with the first engagement portion 613 and the spider engagement end 620 of the spider shaft 618, the pinion gears 622 on the pinion end 619 drivingly engage the second axle side gear 624 and the first drop gear 623. Because the locking collar 642 of the shaft clutch 636 is placed in the second position, the first axle driving gear 631 drivingly engages the axle half shafts 635 and thus the wheel ends 637. The drive axle system 600 placed in the second mode of operation is employed where a multi-axle drive and a low speed and high torque manner of operation is desired.

The first axle assembly 602 may be selectively engaged when additional tractive effort is required. By selectively disengaging and idling the first axle assembly 602 using the output shaft clutch collar 645 and the spider shaft clutch collar 654, an efficiency over a full time driven first and second axle assembly 602, 604 is achieved by minimizing axle windage and parasitic drag losses.

The first axle assembly 602 may be selectively and automatically engaged by an automated system that comprises wheel speed sensors and a control algorithm that eliminates the need for driver control. In such a situation, the first axle assembly 602 can be automatically engaged at vehicle start up or when the vehicle is in a substantially non-moving state to proportion the drive torque between the first and second axle assemblies 602, 604. This has the effect of lowering the maximum torque on either the first and second axle assemblies 602, 604.

Figure 7:
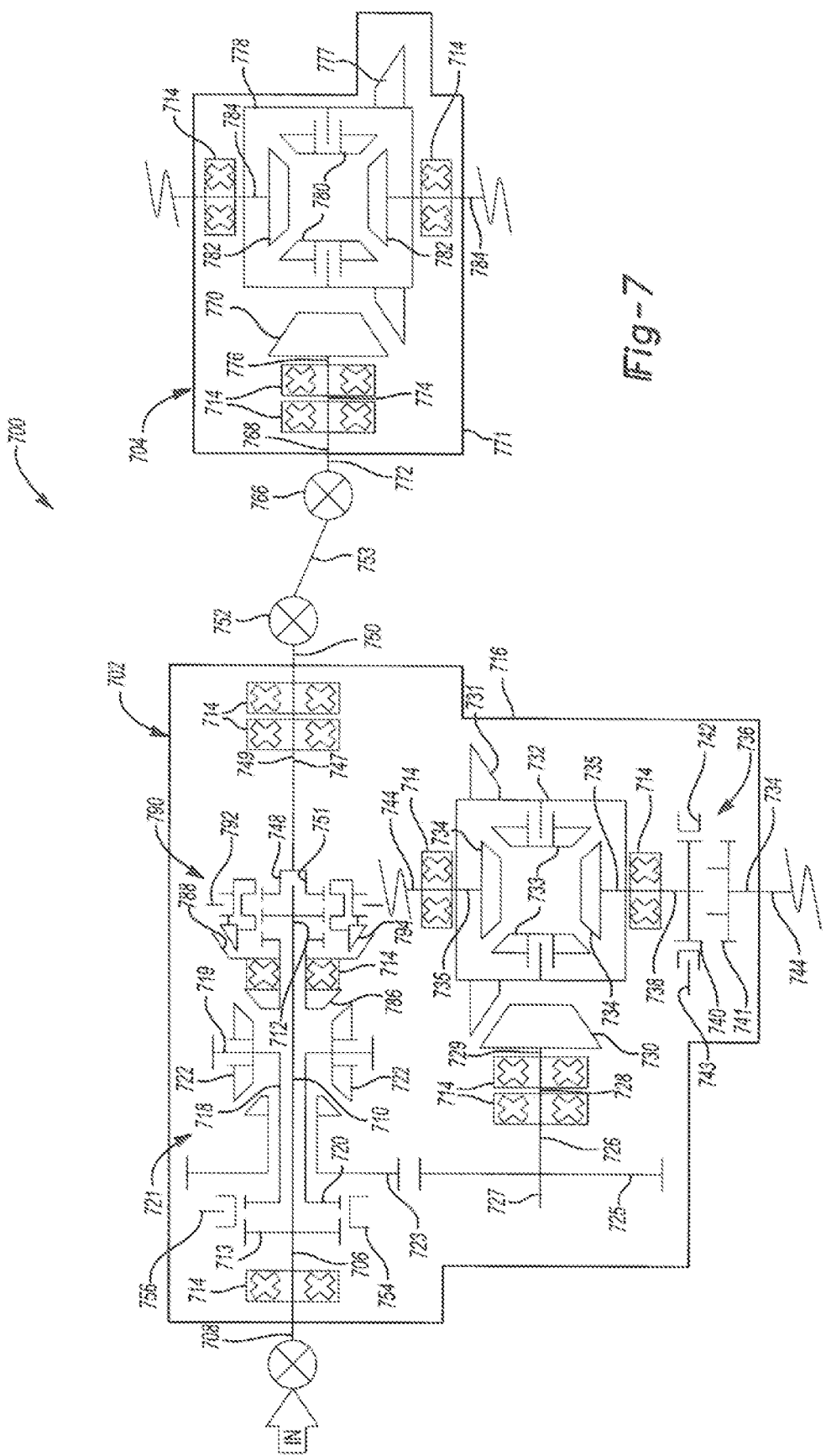
FIG. 7 is a schematic view of a drive axle system according to another embodiment of the present invention.

FIG. 7 depicts yet another embodiment of the present invention. The embodiment shown in FIG. 7 is similar to the embodiment shown in FIG. 6. Similar features of the embodiment shown in FIG. 7 are numbered similarly in series, with the exception of the features described below.

A second axle side gear 786, in addition to a plurality of side gear teeth formed thereon, includes a conical engagement surface 788 and a set of clutch teeth formed thereon. One or more bearings (not shown) and their associated races may be located about the second axle side gear 786 to facilitate rotation of the second axle side gear 786 within a first axle assembly housing 716.

An output shaft synchronizer 790 is located radially outward from and concentric with at least a portion of a first axle input shaft 706. The output shaft synchronizer 790 may be connected to an actuator 792, such as a shift fork, for selectively moving the output shaft synchronizer 790 in an axial direction. The output shaft synchronizer 790 may have a circumferential groove located in an outer surface thereof. The shift fork may engage with all or a portion of the circumferential groove to move the output shaft synchronizer 790 in the axial direction.

The output shaft synchronizer 790 has an inner surface with a first set of teeth and a second set of teeth formed thereon. The first set of teeth may be located on a front portion of the inner surface of the output shaft synchronizer 790 while the second set of teeth are located on an rear side of the inner surface of the output shaft synchronizer 790.

The first set of teeth formed on the inner surface of the output shaft synchronizer 790 may selectively engage with either the set of teeth formed on a second end portion 712 of the first axle input shaft 706 or the set of clutch teeth formed on the second axle side gear 786. The second set of teeth formed on the inner surface of the output shaft synchronizer 790 is always engaged with a set of teeth on an outer surface of an output shaft 747. The set of teeth on the outer surface of the output shaft 747 have a predetermined axial length. The length of teeth formed on the output shaft 747 is sufficient to permit the second set of teeth formed on the output shaft synchronizer 790 to always be engaged therewith regardless of the axial position of the output shaft synchronizer 790.

A synchronizer ring 794 is an annular body coupled to the output shaft synchronizer 790 adjacent the second end portion 712 of the first axle input shaft 706. The synchronizer ring 794 is shaped to correspond to the conical engagement surface 788. Alternately, the synchronizer ring 794 may have an engagement surface having any other shape. A biasing member (not shown) is disposed between the output shaft synchronizer 790 and the synchronizer ring 794 to urge the synchronizer ring 794 away from the output shaft synchronizer 790. When the output shaft synchronizer 790 is moved to engage the first set of teeth formed on the inner surface of the output shaft synchronizer 790 with the set of clutch teeth formed on the second axle side gear 786, the synchronizer ring 794 contacts the conical engagement surface 788 of the second axle side gear 786 in variable engagement prior to engaging the first set of teeth formed on the inner surface of the output shaft synchronizer 790 with the set of clutch teeth formed on the second axle side gear 786.

The drive axle system 700 may be placed in a first mode of operation and a second mode of operation. In the first mode of operation, the first axle assembly 702 is disengaged and the second axle assembly 704 is engaged. In the second mode of operation, the first axle assembly 702 and the second axle assembly 704 is engaged and driven through the inter-axle differential 721.

To place the drive axle system 700 in the first mode of operation, the output shaft synchronizer 790 is placed in driving engagement with the first axle input shaft 706 and the output shaft 747. Further, the locking collar 742 of the shaft clutch 736 is placed in the first position and the spider shaft clutch collar 754 is placed solely in engagement with the first engagement portion 713. When the spider shaft clutch collar 754 is placed solely in engagement with the first engagement portion 713, the spider shaft 718 is non-driven, causing the pinion gears 722 and the second axle side gear 786 to be placed in a non-driven state as well. Because the locking collar 742 of the shaft clutch 736 is placed in the first position, the first axle driving gear 731, the first pinion shaft 726, the second drop gear 725, and the first drop gear 723 are drivingly disengaged from the axle half shafts 735, allowing the first axle driving gear 731, the first pinion shaft 726, the second drop gear 725, and the first drop gear 723 to remain in a non-moving state when the drive axle system 700 is placed in the first mode of operation. The drive axle system 700 placed in the first mode of operation is employed where a single axle drive and a high speed and low torque manner of operation is desired.

The output shaft synchronizer 790 facilitates placing the drive axle system 700 in the second mode of operation without stopping a vehicle the drive axle system 700 is incorporated in. To place the drive axle system 700 in the second mode of operation, the output shaft synchronizer 790 is placed in driving engagement with the side gear teeth formed on the second axle side gear 786 and the output shaft 747. Further, the locking collar 742 of the shaft clutch 736 is placed in the second position and the spider shaft clutch collar 754 is placed in engagement with the first engagement portion 713 and the spider engagement end 720 of the spider shaft 718. When the output shaft synchronizer 790 is placed in driving engagement with the second axle side gear 786 and the output shaft 747, and the spider shaft clutch collar 754 is placed in engagement with the first engagement portion 713 and the spider engagement end 720 of the spider shaft 718, the pinion gears 722 on the pinion end 719 drivingly engage the second axle side gear 786 and the first drop gear 723. Because the locking collar 742 of the shaft clutch 736 is placed in the second position, the first axle driving gear 731 drivingly engages the axle half shafts 735 and thus the wheel ends 737. The drive axle system 700 placed in the second mode of operation is employed where a multi-axle drive and a low speed and high torque manner of operation is desired.

The first axle assembly 702 may be selectively engaged when additional tractive effort is required. By selectively disengaging and idling the first axle assembly 702 using the output shaft synchronizer 790 and the spider shaft clutch collar 754, an efficiency over a full time driven first and second axle assembly 702, 704 is achieved by minimizing axle windage and parasitic drag losses.

The first axle assembly 702 may be selectively and automatically engaged by an automated system that comprises wheel speed sensors and a control algorithm that eliminates the need for driver control. In such a situation, the first axle assembly 702 can be automatically engaged at vehicle start up or when the vehicle is in a substantially non-moving state to proportion the drive torque between the first and second axle assemblies 702, 704. This has the effect of lowering the maximum torque on either the first and second axle assemblies 702, 704.

Figure 8:
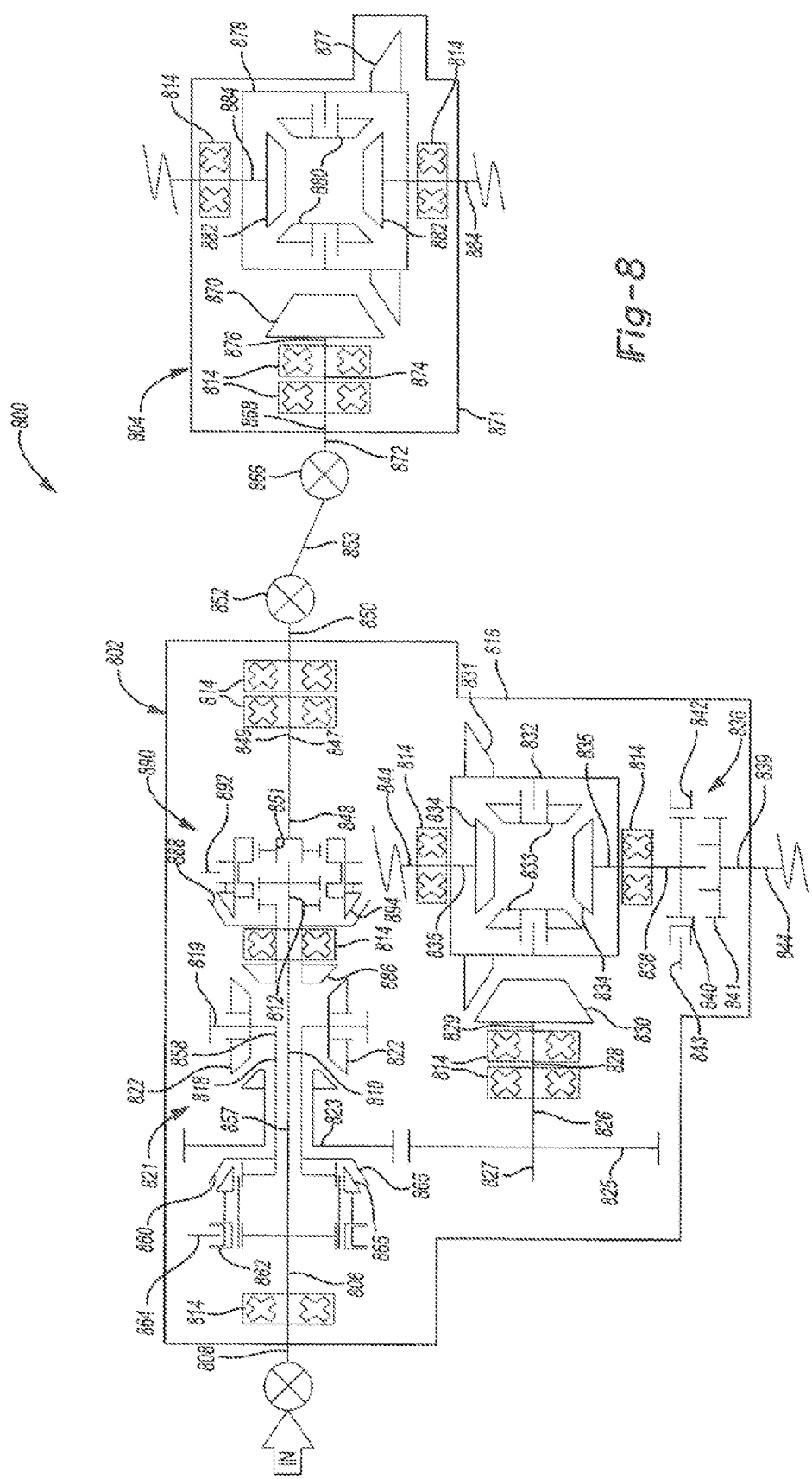
FIG. 8 is a schematic view of a drive axle system according to another embodiment of the present invention.

FIG. 8 depicts yet another embodiment of the present invention. The embodiment shown in FIG. 8 is similar to the embodiment shown in FIG. 6. Similar features of the embodiment shown in FIG. 8 are numbered similarly in series, with the exception of the features described below.

A spider shaft 857 is rotatably disposed about the first axle input shaft 806. One or more bearings (not shown) and their associated races may be located about the first axle input shaft 806 or the spider shaft 857 to facilitate rotation of the first axle input shaft 806 within the first axle assembly housing 816. The spider shaft 857 includes a pinion end 858 and a spider engagement end 859.

The pinion end 858 extends radially outward circumferentially from the first axle input shaft 806. The pinion end is part of an inter-axle differential 821 which also comprises a plurality of pinion gears 822. Each of the pinion gears 822 may be a bevel type pinion gear. At least two pinion gears 822 are located on the pinion end 858, and more may be used. The pinion end 858 may extend through an aperture formed in each of the pinion gears 822.

The spider engagement end 859 extends radially outward circumferentially from the first axle input shaft 806 opposite the pinion end 858 of the spider shaft 857. The spider engagement end 859 is positioned adjacent the first engagement portion 813 of the first axle input shaft 806. The spider engagement end 859 includes a conical engagement surface 860 and a set of clutch teeth formed thereon.

A spider shaft synchronizer 862 is located radially outward from and concentric with at least a portion of a first axle input shaft 806. The spider shaft synchronizer 862 may be connected to an actuator 864, such as a shift fork, for selectively moving the spider shaft synchronizer 862 in an axial direction. The spider shaft synchronizer 862 may have a circumferential groove located in an outer surface thereof. The shift fork may engage with all or a portion of the circumferential groove to move the spider shaft synchronizer 862 in the axial direction.

The spider shaft synchronizer 862 has an inner surface with a set of teeth formed thereon. The set of teeth formed on the inner surface of the spider shaft synchronizer 862 may selectively engage with the set of clutch teeth formed on the spider engagement end 859. The set of teeth formed on the inner surface of the spider shaft synchronizer 862 is always engaged with the set of clutch teeth formed on the first axle input shaft 806 adjacent the first end portion 813. The set of teeth formed on the first axle input shaft 806 have a predetermined axial length. The length of teeth formed on the first axle input shaft 806 is sufficient to permit the set of teeth formed on the inner surface of the spider shaft synchronizer 862 to always be engaged therewith regardless of the axial position of the spider shaft synchronizer 862.

A synchronizer ring 865 is an annular body coupled to the spider shaft synchronizer 862 adjacent the spider engagement end 859 of the spider shaft 857. The synchronizer ring 865 is shaped to correspond to the conical engagement surface 860. Alternately, the synchronizer ring 865 may have an engagement surface having any other shape. A biasing member (not shown) is disposed between the spider shaft synchronizer 862 and the synchronizer ring 865 to urge the synchronizer ring 865 away from the spider shaft synchronizer 862. When the spider shaft synchronizer 862 is moved to engage the first set of teeth formed on the inner surface of the spider shaft synchronizer 862 with the set of clutch teeth formed on the spider engagement end 859, the synchronizer ring 865 contacts the conical engagement surface 860 of the spider shaft 857 in variable engagement prior to engaging the first set of teeth formed on the inner surface of the spider shaft synchronizer 862 with the set of clutch teeth formed on the spider engagement end 859.

A second axle side gear 886, in addition to a plurality of side gear teeth formed thereon, includes of a conical engagement surface 888 and a set of clutch teeth formed thereon. One or more bearings (not shown) and their associated races may be located about the second axle side gear 886 to facilitate rotation of the second axle side gear 886 within a first axle assembly housing 816.

An output shaft synchronizer 890 is located radially outward from and concentric with at least a portion of a first axle input shaft 806. The output shaft synchronizer 890 may be connected to an actuator 892, such as a shift fork, for selectively moving the output shaft synchronizer 890 in an axial direction. The output shaft synchronizer 890 may have a circumferential groove located in an outer surface thereof. The shift fork may engage with all or a portion of the circumferential groove to move the output shaft synchronizer 890 in the axial direction.

The output shaft synchronizer 890 has an inner surface with a first set of teeth and a second set of teeth formed thereon. The first set of teeth may be located on a front portion of the inner surface of the output shaft synchronizer 890 while the second set of teeth are located on an rear side of the inner surface of the output shaft synchronizer 890.

The first set of teeth formed on the inner surface of the output shaft synchronizer 890 may selectively engage with either the set of teeth formed on a second end portion 812 of the first axle input shaft 806 or the set of clutch teeth formed on the second axle side gear 886. The second set of teeth formed on the inner surface of the output shaft synchronizer 890 is always engaged with a set of teeth on an outer surface of an output shaft 847. The set of teeth on the outer surface of the output shaft 847 have a predetermined axial length. The length of teeth formed on the output shaft 847 is sufficient to permit the second set of teeth formed on the output shaft synchronizer 890 to always be engaged therewith regardless of the axial position of the output shaft synchronizer 890.

A synchronizer ring 894 is an annular body coupled to the output shaft synchronizer 890 adjacent the second end portion 812 of the first axle input shaft 806. The synchronizer ring 894 is shaped to correspond to the conical engagement surface 888. Alternately, the synchronizer ring 894 may have an engagement surface having any other shape. A biasing member (not shown) is disposed between the output shaft synchronizer 890 and the synchronizer ring 894 to urge the synchronizer ring 894 away from the output shaft synchronizer 890. When the output shaft synchronizer 890 is moved to engage the first set of teeth formed on the inner surface of the output shaft synchronizer 890 with the set of clutch teeth formed on the second axle side gear 886, the synchronizer ring 894 contacts the conical engagement surface 888 of the second axle side gear 886 in variable engagement prior to engaging the first set of teeth formed on the inner surface of the output shaft synchronizer 890 with the set of clutch teeth formed on the second axle side gear 886.

The drive axle system 800 may be placed in a first mode of operation and a second mode of operation. In the first mode of operation, the first axle assembly 802 is disengaged and the second axle assembly 804 is engaged. In the second mode of operation, the first axle assembly 802 and the second axle assembly 804 is engaged and driven through the inter-axle differential 821.

To place the drive axle system 800 in the first mode of operation, the output shaft synchronizer 890 is placed in driving engagement with the first axle input shaft 806 and the output shaft 847 and the spider shaft synchronizer 862 is placed solely in driving engagement with the set of clutch teeth formed on the spider engagement end 859. Further, the locking collar 842 of the shaft clutch 836 is placed in the first position. When the spider shaft synchronizer 862 is placed solely in engagement with the spider engagement end 859, the spider shaft 857 is non-driven, causing the pinion gears 822 and the second axle side gear 886 to be placed in a non-driven state as well. Because the locking collar 842 of the shaft clutch 836 is placed in the first position, the first axle driving gear 831, the first pinion shaft 826, the second drop gear 825, and the first drop gear 823 are drivingly disengaged from the axle half shafts 835, allowing the first axle driving gear 831, the first pinion shaft 826, the second drop gear 825, and the first drop gear 823 to remain in a non-moving state when the drive axle system 800 is placed in the first mode of operation. The drive axle system 800 placed in the first mode of operation is employed where a single axle drive and a high speed and low torque manner of operation is desired.

The output shaft synchronizer 890 and the spider shaft synchronizer 862 facilitate placing the drive axle system 800 in the second mode of operation without stopping a vehicle the drive axle system 800 is incorporated in. Prior to placing the drive axle system 800 in the second mode of operation, the spider shaft synchronizer 862 or the output shaft synchronizer 890 may be variably engaged to "spool up" the first axle driving gear 831, the first pinion shaft 826, the second drop gear 825, and the first drop gear 823 to permit the shaft clutch 836 to be engaged without stopping the vehicle the drive axle system 800 is incorporated in.

To place the drive axle system 800 in the second mode of operation, the output shaft synchronizer 890 is placed in driving engagement with the side gear teeth formed on the second axle side gear 886 and the output shaft 847 and the spider shaft synchronizer 862 is placed in engagement with the first engagement portion 813 and the spider engagement end 859 of the spider shaft 857. Further, the locking collar 842 of the shaft clutch 836 is placed in the second position. When the output shaft synchronizer 890 is placed in driving engagement with the second axle side gear 886 and the output shaft 847, and the spider shaft synchronizer 862 is placed in engagement with the first engagement portion 813 and the spider engagement end 859 of the spider shaft 857, the pinion gears 822 on the pinion end 858 drivingly engage the second axle side gear 886 and the first drop gear 823. Because the locking collar 842 of the shaft clutch 836 is placed in the second position, the first axle driving gear 831 drivingly engages the axle half shafts 835 and thus the wheel ends 837. The drive axle system 800 placed in the second mode of operation is employed where a multi-axle drive and a low speed and high torque manner of operation is desired.

The first axle assembly 802 may be selectively engaged when additional tractive effort is required. By selectively disengaging and idling the first axle assembly 802 using the output shaft synchronizer 890 and the spider shaft synchronizer 862, an efficiency over a full time driven first and second axle assembly 802, 804 is achieved by minimizing axle windage and parasitic drag losses.

The first axle assembly 802 may be selectively and automatically engaged by an automated system that comprises wheel speed sensors and a control algorithm that eliminates the need for driver control. In such a situation, the first axle assembly 802 can be automatically engaged at vehicle start up to proportion the drive torque between the first and second axle assemblies 802, 804. This has the effect of lowering the maximum torque on either the first and second axle assemblies 802, 804.

Figure 9:
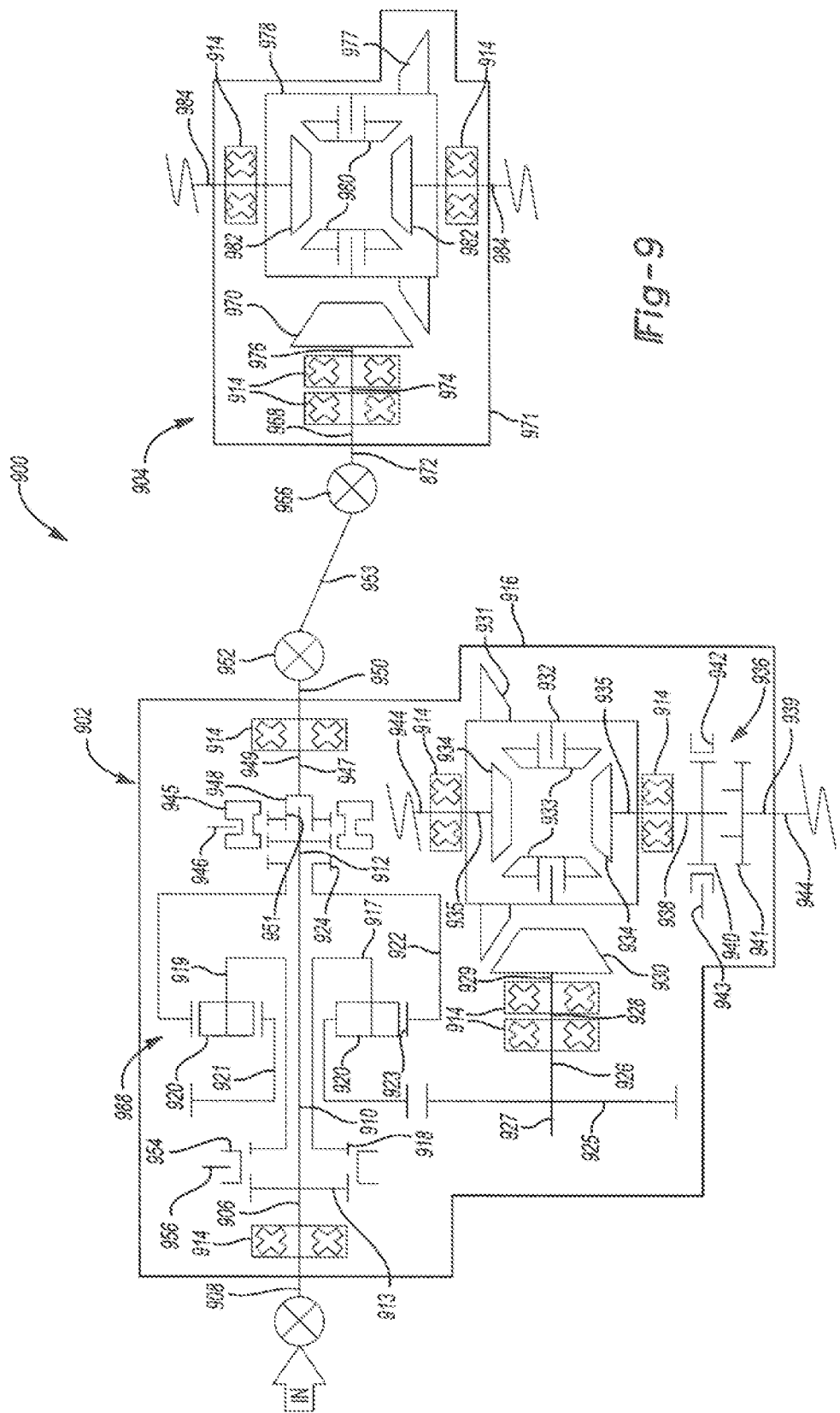
FIG. 9 is a schematic view of a drive axle system according to another embodiment of the present invention.

FIG. 9 depicts yet another embodiment of the present invention. FIG. 9 depicts a drive axle system 900 comprised of a first axle assembly 902 and a second axle assembly 904.

The first axle assembly 902 includes a first axle input shaft 906 with a first end portion 908, a middle portion 910 and a second end portion 912. The first end portion 908 is connected to a source of rotational power, such as a transmission or an engine. A first engagement portion 913 including a first set of clutch teeth extends radially from the first axle input shaft 906 adjacent the first end portion 908. Preferably, the first set of clutch teeth is unitary with the first axle input shaft. However, it is permissible for them to be located on a collar that is splined to the input shaft 906. One or more bearings 914 and their associated races may be located about the first end portion 908 to facilitate rotation of the first axle input shaft 906 within a first axle assembly housing 916.

A second set of teeth are also provided on the second end portion 912 of the first axle input shaft 906. It is also preferred that these teeth are unitary with the first axle input shaft 906, but they may also be located on a splined collar. The middle portion 910 between the first set of teeth and the second set of teeth may have a substantially constant diameter.

A carrier 917 is located radially outward from and concentric with the middle portion 910 of the first axle input shaft 906. The carrier 917 comprises a first end portion, a middle portion and a second end portion. Preferably, all of the portions are unitary with one another.

The first end portion of the carrier 917 is adjacent the first set of teeth on the first axle input shaft 906. The first end portion of the carrier 917 also has a set of clutch teeth 918 located thereon. Preferably, the clutch teeth 918 are unitary with the first end portion of the carrier 917 and extend primarily radially outward.

The middle portion of the carrier 917 is substantially constant in its diameter and may extend along a portion of the first axle input shaft 906. The second end portion of the carrier 917 is comprised of a radially extending portion and at least one planet gear pinion mount 919. The at least one planet gear pinion mount 919 extends transversely to the radially extending portion of the carrier 917 in the outboard direction so as to be parallel to the middle portion of the carrier 917 as well as middle portion of the first axle input shaft 906. A plurality of planet gear pinions 920 are rotatably mounted on each of the planet gear pinion mounts 919. A gap exists between the middle portion of the carrier 917 and each of the planet gear pinions 920.

A sun gear 921 is located radially outward and concentric with the middle portion of the carrier 917. The sun gear 921 has a set of outboard teeth and a set of inboard teeth. The set of outboard teeth and the set of inboard teeth are primarily oriented radially outward. As shown in FIG. 9, the set of outboard teeth are located adjacent the first end portion of the carrier 917.

The set of inboard teeth of the sun gear 921 are located adjacent the gap between the middle portion of the carrier 917 and each of the planet gear pinions 920. More particularly, the set of inboard teeth of the sun gear 921 are located radially inward from the planet gear pinions 920 and are in driving engagement with the planet gear pinions 920.

The planet gear pinions 920 are engaged with an outer ring 922. More particularly, the planet gear pinions 920 are engaged with a set of inner teeth 923 located in an inner surface of the outer ring 922.

The outer ring 922 extends axially over the radially extending portion of the carrier 917 to a set of outer teeth 924 located on an outer surface of the outer ring 922. The set of outer teeth 924 on the outer ring 922 is located adjacent the second end portion 912 of the first axle input shaft 906.

The set of outboard teeth of the sun gear 921 are meshed with a set of teeth of a drop gear 925. The drop gear 925 is concentric with a first pinion shaft 926 located below the first axle input shaft 906. The second drop gear 925 may have a splined inner surface that engages with a splined outer surface of the first pinion shaft 926. The second drop gear 925 is located on a first end portion 927 of the first pinion shaft 926.

The first pinion shaft 926 also has a middle portion 928 and a second end portion 929. The middle portion 928 may be supported for rotation within the first axle assembly housing 916 by one or more bearings 914 and their associated races. The second end portion 929 includes a first pinion gear 930 disposed thereon.

The first pinion gear 930 is located in driving engagement with a first axle driving gear 931, such as in a hypoid orientation. Other orientations of the first axle driving gear 931 and the first pinion gear 930 are also permissible.

The first axle driving gear 931 is mounted on, or connected, to a first wheel differential case 932. At least two pinion gears 933 and at least two side gears 934 are located within the first wheel differential case 932. As known by those skilled in the art, the pinion gears 933 and the side gears 934 are connected to one another. The side gears 934 are also connected to axle half shafts 935.

A shaft clutch 936 is mounted to one of the axle half shafts 935 and divides the axle half shaft 935 into a first portion 938 and a second portion 939. The shaft clutch 936 may be a splined dog type clutch. The shaft clutch 936 comprises a first toothed portion 940 formed on the first portion 938 and a second toothed portion 941 formed on the second portion 939. The first toothed portion 940 and the second toothed portion 941 may be directed formed on the first portion 938 and the second portion 939 or they may be formed on a sleeve located about the first portion 938 and the second portion 939. The first toothed portion 940 and the second toothed portion 941 respectively rotate with the first portion 938 and the second portion 939 of one of the axle half shafts 935.

The shaft clutch 936 further comprises a locking collar 942 disposed about one of the axle half shafts 935 and drivingly engaged with at least one of the first toothed portion 940 and the second toothed portion 941. The locking collar 942 is axially moveable along the first toothed portion 940 and the second toothed portion 941 and includes a plurality of teeth formed on an inner surface thereof. The locking collar 942 has a first position and a second position. As shown in FIG. 9, the locking collar 942 is in the first position and is drivingly engaged with the first toothed portion 940. In the second position, the locking collar 942 is drivingly engaged with the first toothed portion 940 and the second toothed portion 941, causing the first portion 938 to be drivingly engaged with the second portion 939.

The locking collar 942 may be selectively moved along the first toothed portion 940 and the second toothed portion 941 so as to couple the first portion 938 and the second portion 939. The locking collar 942 may be moved by an actuator 943 such as a pneumatic actuator, an electromechanical actuator, or a hydraulic actuator. The actuator 943 may be connected to the anti-lock braking system of the vehicle, as described below.

The axle half shafts 935 are connected to wheel ends 944. Each wheel end 944 supports wheels and tires (not shown).

The shaft clutch 936 permits the second portion 939 to be selectively disengaged from the side gear 934, the first axle driving gear 931, the first pinion shaft 926, the second drop gear 925, and thus the first drop gear 923. As a result, the first axle driving gear 931 and the first pinion shaft 926 can idle during vehicle operation.

The first axle input shaft 906 is provided with the second set of teeth formed on the second end portion 912 for engaging an output shaft clutch collar 945. The second set of teeth formed on the second end portion 912 are located axially adjacent the outer teeth 924 formed on the outer ring 922.

The output shaft clutch collar 945 is located radially outward from and concentric with at least a portion of the first axle input shaft 906. The output shaft clutch collar 945 may be connected to an actuator 946, such as a shift fork, for selectively moving the output shaft clutch collar 945 in an axial direction. The output shaft clutch collar 945 may have a circumferential groove located in an outer surface thereof. The shift fork may engage with all or a portion of the circumferential groove to move the output shaft clutch collar 945 in the axial direction.

The output shaft clutch collar 945 has an inner surface with a first set of teeth and a second set of teeth formed thereon. The first set of teeth may be located on a front portion of the inner surface of the output shaft clutch collar 945 while the second set of teeth are located on an rear side of the inner surface of the output shaft clutch collar 945.

The first set of teeth formed on the inner surface of the output shaft clutch collar 945 may selectively engage with either the set of teeth formed on the second end portion 912 of the first axle input shaft 906 or the outer teeth 924 formed on the outer ring 922. The second set of teeth formed on the inner surface of the output shaft clutch collar 945 is always engaged with a set of teeth on an outer surface of an output shaft 947. The set of teeth on the outer surface of the output shaft 947 have a predetermined axial length. The length of teeth formed on the output shaft 947 is sufficient to permit the second set of teeth formed on the output shaft clutch collar 945 to always be engaged therewith regardless of the axial position of the output shaft clutch collar 945.

The output shaft 947 comprises a first end portion 948, a middle portion 949, and a second end portion 950. The set of teeth on the outer surface of the output shaft 947 are formed on the first end portion 948. The first end portion 948 may also define an inner axial cavity 951 designed to receive at least a portion of the second end portion 912 of the first axle input shaft 906 therein.

The middle portion 949 of the output shaft 947 may be supported by one or more bearings 914 and their associated races. The bearings 914 facilitate rotation of the output shaft 947 within the first axle assembly housing 916.

The second end portion 950 comprises a yoke (not shown) for connecting with a first universal joint 952. The first universal joint 952 is connected to a propeller shaft 953. The propeller shaft 953 extends between the first axle assembly 902 and the second axle assembly 904.

The set of clutch teeth formed on the first engagement portion 913 of the first axle input shaft 906 engage a carrier clutch collar 954. Preferably, set of clutch teeth formed on the first engagement portion 913 are unitary with the first axle input shaft 906. However, it is permissible for the teeth to be located on a collar that is splined to the first axle input shaft 906. The set of clutch teeth formed on the first engagement portion 913 are located axially adjacent the set of clutch teeth 918 formed on the first end portion of the carrier 917.

The carrier clutch collar 954 is located radially outward from and concentric with at least a portion of the first axle input shaft 906. The carrier clutch collar 954 may be connected to the actuator 956, such as a shift fork, for selectively moving the carrier clutch collar 954 in an axial direction. The carrier clutch collar 954 may have a circumferential groove located in an outer surface thereof. The shift fork may engage with all or a portion of the circumferential groove to move the carrier clutch collar 954 in the axial direction.

The carrier clutch collar 954 has an inner surface with a set of teeth formed thereon. The set of teeth formed on the inner surface of the carrier clutch collar 954 is always engaged with the set of clutch teeth formed on the first engagement portion 913. The set of clutch teeth formed on the first engagement portion 913 have a predetermined axial length. The length of the set of clutch teeth formed on the first engagement portion 913 is sufficient to permit the set of teeth formed on the carrier clutch collar 954 to always be engaged therewith regardless of the axial position of the carrier clutch collar 954. The set of teeth formed on the inner surface of the carrier clutch collar 954 may selectively engage the set of clutch teeth 918 formed on the first end portion of the carrier 917 when the actuator 956 moves the carrier clutch collar 954 in an axial direction.

A second universal joint 966 is connected to a second pinion shaft 968. A second pinion gear 970 is connected to the second pinion shaft 968. The second pinion shaft 968, and thus the second pinion gear 970, is mounted for rotation within a second wheel differential housing 971. The second pinion gear 970 may be such as a spiral bevel, or it may be a hypoid.

The second pinion shaft 968 is connected to a yoke (not shown) at a first end portion 972. The yoke is connected to the propeller shaft 953, such as through the second universal joint 966.

The second pinion shaft 968 also has a middle portion 974 and a second end portion 976. The middle portion 974 may be supported by one or more bearings 914 to facilitate the rotation of the second pinion shaft 968 within the second wheel differential housing 971. The second pinion gear 970 is drivingly engaged with a second axle driving gear 977. The second pinion gear 970 may be engaged with the second axle driving gear 977 in a hypoid type arrangement, but other embodiments are permissible as well. The second pinion shaft 968 is drivingly engaged with the second axle driving gear 977 of the second axle assembly 904 through a single gear mesh.

The second axle driving gear 977 is mounted on, or connected, to a second wheel differential case 978. At least two pinion gears 980 and at least two side gears 982 are located within the second wheel differential case 978. As known by those skilled in the art, the pinion gears 980 and the side gears 982 are connected to one another. The side gears 982 are also connected to axle half shafts 984.

The second axle driving gear 977 may have the same or a greater diameter than the first axle driving gear 931. By way of example only, the first axle driving gear 931 may have a diameter of approximately 14 inches, while the second axle driving gear 977 may have a diameter of approximately 18 inches.

The drive axle system 900 may be placed in a first mode of operation and a second mode of operation. In the first mode of operation, the first axle assembly 902 is disengaged and the second axle assembly 904 is engaged. In the second mode of operation, the first axle assembly 902 and the second axle assembly 904 is engaged and driven through a planetary inter-axle differential 988 comprised of the carrier 917, the planet gear pinions 920, and the outer ring 922. It is understood that when the drive axle system 900 is placed in the second mode of operation, the planetary inter-axle differential 988 may be configured to divide torque in an unequal manner between the first axle driving gear 931 and the second axle driving gear 977 in a predetermined manner. Further, it is understood that the first axle assembly 902 and the second axle assembly 904 may be configured with different axle ratios. When the first axle assembly 902 and the second axle assembly are configured with different axle ratios, the planetary inter-axle differential 988 permits the different axle ratios to be blended when the drive axle system 900 is placed in the second mode of operation.

To place the drive axle system 900 in the first mode of operation, the output shaft clutch collar 945 is placed in driving engagement with the first axle input shaft 906 and the output shaft 947. Further, the locking collar 942 of the shaft clutch 936 is placed in the first position and the carrier clutch collar 954 is placed solely in engagement with the first engagement portion 913. When the carrier clutch collar 954 is placed solely in engagement with the first engagement portion 913, the carrier 917 is non-driven, causing the planet gear pinions 620, the sun gear 920, and the outer ring 922 to be placed in a non-driven state as well. Because the locking collar 942 of the shaft clutch 936 is placed in the first position, the first axle driving gear 931, the first pinion shaft 926, and the drop gear 925 are drivingly disengaged from the axle half shafts 935, allowing the first axle driving gear 931, the first pinion shaft 926, and the drop gear 925 to remain in a non-moving state when the drive axle system 900 is placed in the first mode of operation. The drive axle system 900 placed in the first mode of operation is employed where a single axle drive and a high speed and low torque manner of operation is desired.

To place the drive axle system 900 in the second mode of operation, the output shaft clutch collar 945 is placed in driving engagement with the outer teeth 924 formed on the outer ring 922 and the output shaft 947. Further, the locking collar 942 of the shaft clutch 936 is placed in the second position and the carrier clutch collar 954 is placed in engagement with the first engagement portion 913 and the clutch teeth 918 of the carrier 917. When the output shaft clutch collar 945 is placed in driving engagement with the outer teeth 924 formed on the outer ring 922 and the output shaft 947, and the carrier clutch collar 954 is placed in engagement with the first engagement portion 913 and the clutch teeth 918 of the carrier 917, the planet gear pinions 920 on the planet gear pinion mounts 919 drivingly engage the inner teeth 923 of the outer ring 922 and the set of inboard teeth of the sun gear 921. Because the locking collar 942 of the shaft clutch 936 is placed in the second position, the first axle driving gear 931 drivingly engages the axle half shafts 935 and thus the wheel ends 937. The drive axle system 900 placed in the second mode of operation is employed where a multi-axle drive and a low speed and high torque manner of operation is desired.

The first axle assembly 902 may be selectively engaged when additional tractive effort is required. By selectively disengaging and idling the first axle assembly 902 using the output shaft clutch collar 945 and the carrier clutch collar 954, an efficiency over a full time driven first and second axle assembly 902, 904 is achieved by minimizing axle windage and parasitic drag losses.

The first axle assembly 902 may be selectively and automatically engaged by an automated system that comprises wheel speed sensors and a control algorithm that eliminates the need for driver control. In such a situation, the first axle assembly 902 can be automatically engaged at vehicle start up or when the vehicle is in a substantially non-moving state to proportion the drive torque between the first and second axle assemblies 902, 904. This has the effect of lowering the maximum torque on either the first and second axle assemblies 902, 904.

Figure 10:
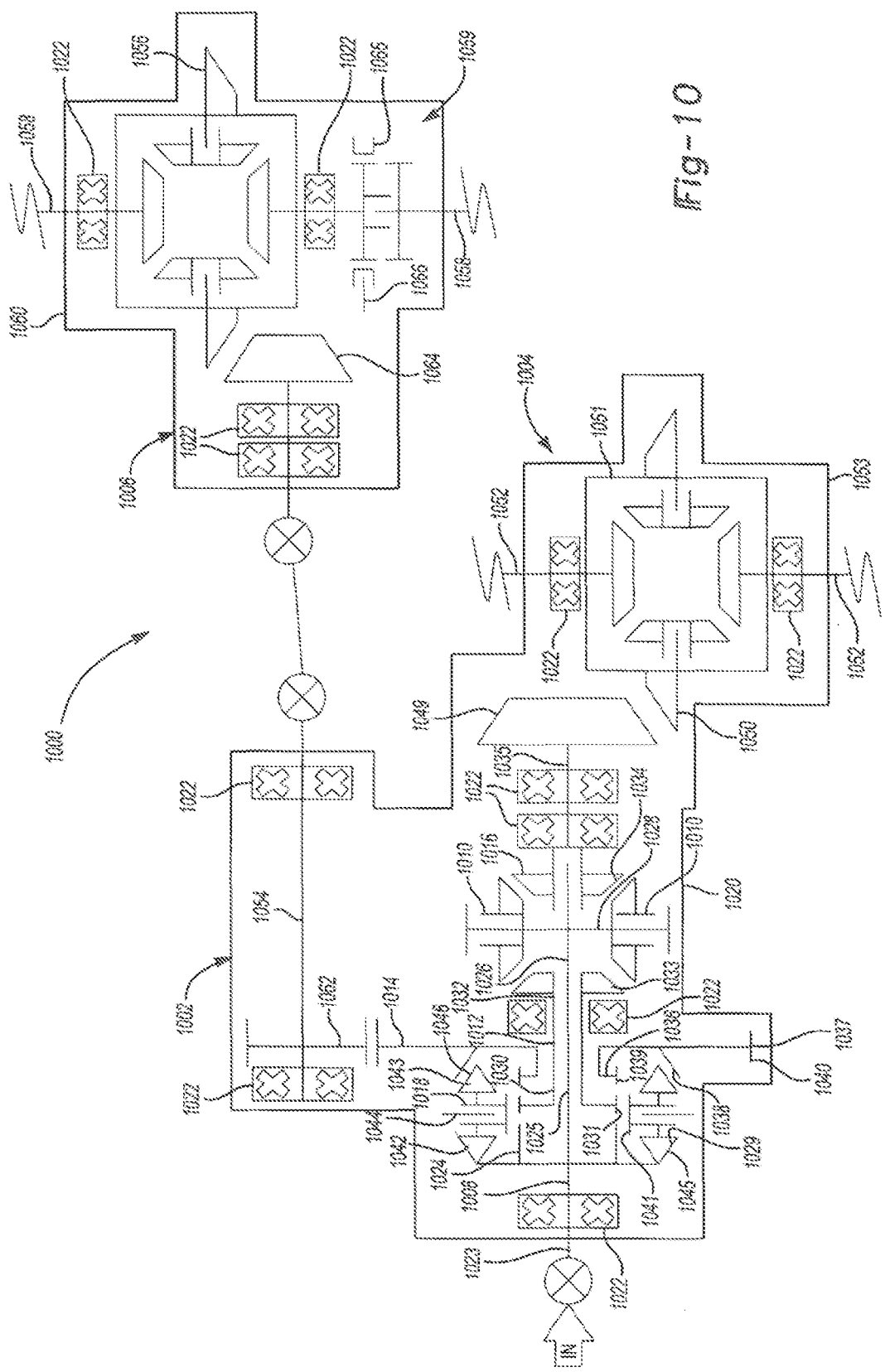
FIG. 10 is a schematic view of a drive axle system according to another embodiment of the present invention.

FIG. 10 illustrates a drive axle system 1000 for a vehicle incorporating an inter-axle differential assembly 1002. The drive axle system 1000 preferably includes the inter-axle differential assembly 1002, a first axle assembly 1004, and a second axle assembly 1006. As shown, the drive axle system 1000 includes the three assemblies 1002, 1004, and 1006, but it is understood the drive axle system 1000 may include fewer or more assemblies or components.

The inter-axle differential assembly 1002 includes an input shaft 1008, a plurality of driving pinions 1010, a transfer shaft 1012, a second output gear 1014, a first output gear 1016, and a shift collar 1018. Preferably, the components 1008, 1010, 1012, 1014, 1016, 1018 are formed from a hardened steel, however the components 1008, 1010, 1012, 1014, 1016, 1018 may be formed from any other rigid material. As shown, the drive axle system 1000 includes the six components 1008, 1010, 1012, 1014, 1016, 1018 disposed in a housing 1020 but it is understood the inter-axle differential assembly 1002 may include fewer or more components The input shaft 1008 is at least partially disposed in the housing 1020. Preferably, the input shaft 1008 is an elongate cylindrical member, however the input shaft 1008 may be any other shape. Bearings 1022 disposed between the input shaft 1008 and the housing 1020 and the input shaft 1008 and the transfer shaft 1012 permit the input shaft 1008 to rotate about an axis of the input shaft 1008. The input shaft 1008 has a first end portion 1023, having a first set of clutch gear teeth 1024 formed thereon, a middle portion 1025, and a second end portion 1026, having a pinion carrier 1028 disposed thereon.

The first end portion 1023 has a diameter greater than a diameter of the middle portion 1025. The first end portion 1023 is a substantially disc shaped body drivingly coupled to the input shaft 1008. Alternately, the first end portion 1023 may be integrally formed with the input shaft 1008. The first end portion 1023 includes an engagement portion 1029 formed therein adjacent an outer peripheral edge thereof. As shown, the engagement portion 1029 is a conical surface oblique to the input shaft 1008, however, the engagement portion 1029 may have any other shape. The first set of clutch gear teeth 1024 are formed on the first end portion 1023 intermediate the input shaft 1008 and the engagement portion 1029.

The pinion carrier 1028 is a substantially disc shaped body having a plurality of pinion supports protruding therefrom radially outwardly from a peripheral edge of the pinion carrier 1028. Each of the plurality of pinion supports is formed perpendicular to the axis of the input shaft 1008. Alternately, the pinion carrier 1028 may comprise a plurality of cylindrical members protruding radially outwardly from the input shaft 1008 or a disc shaped body having a plurality of pinion shaft apertures formed therein about a peripheral edge thereof.

The plurality of driving pinions 1010 are rotatably coupled to the plurality of pinion supports of the pinion carrier 1028. Each of the driving pinions 1010 have gear teeth formed on an outer surface thereof. As is known in the art, each of the driving pinions 1010 is known as a spider gear. Preferably, the driving pinions 1010 are directly mounted on the pinion supports, however, bearings may be disposed between each of the driving pinions 1010 and the pinion supports.

The transfer shaft 1012 is a hollow shaft concentrically disposed about the input shaft 1008. Preferably, the transfer shaft 1012 is a hollow elongate cylindrical member, however the transfer shaft 1012 may be any other shape. Bearings 1022 disposed between the transfer shaft 1012 and the housing 1020 and the input shaft 1008 and the transfer shaft 1012 permit the transfer shaft 1012 to rotate about an axis of the transfer shaft 1012. The axis of the transfer shaft 1012 is concurrent with the axis of the input shaft 1008. The transfer shaft 1012 has a first end portion 1030, having a first set of clutch gear teeth 1031 formed on an outer surface thereof, and a second end portion 1032, having a set of side gear teeth 1033 formed in an outer surface thereof.

The first end portion 1030 and the second end portion 1032 are substantially disc shaped bodies having an outer diameter greater than a diameter of the transfer shaft 1012. The first end portion 1030 and the second end portion 1032 are drivingly coupled to the transfer shaft 1012. Alternately, the first end portion 1030 and the second end portion 1032 may be integrally formed with the transfer shaft 1012 and may have a diameter substantially equal to the transfer shaft 1012. Similarly, the first set of clutch gear teeth 1031 and the set of side gear teeth 1033 may be formed directly in the transfer shaft 1012. As is known in the art, the second end portion 1032 having the set of side gear teeth 1033 is known as a side gear. The set of side gear teeth 1033 are beveled gear teeth and are engaged with the plurality of driving pinions 1010. The first set of clutch gear teeth 1031 are disposed adjacent the first set of clutch gear teeth 1024 of the input shaft 1008.

The first output gear 1016 is a gear concentrically journaled about the input shaft 1008 adjacent the pinion carrier 1028. The first output gear 1016 has a set of side gear teeth 1034 formed in an outer surface thereof. As is known in the art, the first output gear 1016 having the set of side gear teeth 1034 is known as a side gear. The set of side gear teeth 1034 are beveled gear teeth and are engaged with the plurality of driving pinions 1010.

The first output gear 1016 includes an output shaft 1035 drivingly coupled thereto. Alternately, the first output gear 1016 may be integrally formed with the output shaft 1035. The output shaft 1035 is collinear with the input shaft 1008. Bearings 1022 disposed between the output shaft 1035 and the housing 1020 support the first output gear 1016 and permit the output shaft 1035 to rotate about an axis of the output shaft 1035.

The second output gear 1014 is a gear concentrically disposed about the input shaft 1008 and the transfer shaft 1012. The second output gear 1014 has a central perforation having a diameter greater than a diameter of the transfer shaft 1012. The second output gear 1014 is a substantially disc shaped body having a first end portion 1036, a second end portion 1037 defining an outer diameter of the second output gear 1014, and an engagement portion 1038. Bearings (not shown) disposed between the transfer shaft 1012 and the second output gear 1014 permit the second output gear 1014 to rotate about an axis of the second output gear 1014. The axis of the second output gear 1014 is concurrent with the axis of the input shaft 1008. A first set of clutch gear teeth 1039 are formed on the first end portion 1036 adjacent the first set of clutch gear teeth 1031 of the transfer shaft 1012. A second set of gear teeth 1040 are formed on the second end portion 1037.

The engagement portion 1038 is formed in the second output gear 1014 intermediate the first end portion 1036 and the second end portion 1037. As shown, the engagement portion 1038 is a conical surface oblique to the input shaft 1008; however, the engagement portion 1038 may have any other shape.

The shift collar 1018 is concentrically disposed about the input shaft 1008 and the transfer shaft 1012. The shift collar 1018 includes a set of inner clutch collar teeth 1041 formed on an inner surface thereof, a first synchronizer ring 1042, and a second synchronizer ring 1043. The set of inner clutch collar teeth 1041 are engaged with the first set of clutch gear teeth 1031 of the transfer shaft 1012. The shift collar 1018 can be slidably moved along the axis of the input shaft 1008 as directed manually by an operator of the vehicle or automatically by an electronic control unit (not shown) while maintaining engagement of the inner clutch collar teeth 1041 and the first set of clutch gear teeth 1031. A shift fork 1044 disposed in an annular recess formed in the shift collar 1018 moves the shift collar 1018 along the axis of the input shaft 1008 into a first position, a second position, or a neutral position. A shift mechanism (not shown), which is drivingly engaged with the shift fork 1044, is actuated to position the shift fork 1044 as directed manually by an operator of the vehicle or automatically by the electronic control unit. Consequently, the shift fork 1044 positions the shift collar 1018 into the first position, the second position, or the neutral position. In the first position, the shift collar 1018 is drivingly engaged with the first set of clutch gear teeth 1031 of the transfer shaft 1012 and the first set of clutch gear teeth 1024 of the input shaft 1008. In the second position, the shift collar 1018 is drivingly engaged with the first set of clutch gear teeth 1031 of the transfer shaft 1012 and the first set of clutch gear teeth 1039 of the second output gear 1014. In the neutral position, the inner clutch collar teeth 1041 of the shift collar 1018 are only drivingly engaged with the first set of clutch gear teeth 1031 of the transfer shaft 1012. It is understood the shift collar 1018, the clutch gear teeth 1024, 1031, 1039, 1041, the synchronizer rings 1042, 1043, and the engagement portions 1029, 1038 may be substituted with any clutching device that permits selective engagement of a driving and a driven part.

The first synchronizer ring 1042 is an annular body coupled to the shift collar 1018 adjacent the first end portion 1023 of the input shaft 1008. The first synchronizer ring 1042 has a first conical engagement surface 1045. Alternately, the first synchronizer ring 1042 may have an engagement surface having any other shape. A biasing member (not shown) is disposed between the shift collar 1018 and the first synchronizer ring 1042 to urge the first synchronizer ring 1042 away from the shift collar 1018. When the shift collar 1018 is moved from the second position into the first position, the first conical engagement surface 1045 contacts the engagement portion 1029 of the first end portion 1023 of the input shaft 1008. As the shift collar 1018 moves towards the first set of clutch gear teeth 1024 of the input shaft 1008, the biasing member is compressed while the shift collar 1018 engages the first set of clutch gear teeth 1031 of the transfer shaft 1012 and before the shift collar 1018 engages the first set of clutch gear teeth 1024 of the input shaft 1008.

The second synchronizer ring 1043 is an annular body coupled to the shift collar 1018 adjacent the first end portion 1036 of the second output gear 1014. The second synchronizer ring 1043 has a second conical engagement surface 1046. Alternately, the second synchronizer ring 1043 may have an engagement surface having any other shape. A biasing member (not shown) is disposed between the shift collar 1018 and the second synchronizer ring 1043 to urge the second synchronizer ring 1043 away from the shift collar 1018. When the shift collar 1018 is moved from the first position into the second position, the second conical engagement surface 1046 contacts the engagement portion 1038 of the first end portion 1036 of the second output gear 1014. As the shift collar 1018 moves towards the first set of clutch gear teeth 1039 of the second output gear 1014, the biasing member is compressed while the shift collar 1018 engages the first set of clutch gear teeth 1031 of the transfer shaft 1012 and before the shift collar 1018 engages the first set of clutch gear teeth 1039 of the second output gear 1014.

A bevel gear pinion 1049 is drivingly coupled to the output shaft 1035 opposite the first output gear 1016. Alternately, the bevel gear pinion 1049 may be integrally formed with the output shaft 1035. As is known in the art, the bevel gear pinion 1049 has gear teeth formed on an outer surface thereof. The bevel gear pinion 1049 may be one of a hypoid gear, a spiral bevel gear, a straight bevel gear, or any other gear known to those skilled in the art.

The first axle assembly 1004 includes the bevel gear pinion 1049, a first driving gear 1050, a first wheel differential 1051, and a first pair of output axles 1052. Preferably, the components 1049, 1050, 1051, 1052 are formed from a hardened steel, however the components 1049, 1050, 1051, 1052 may be formed from any other rigid material. As shown, the first axle assembly 1004 includes the four components 1049, 1050, 1051, 1052 disposed in a first axle housing 1053 but it is understood the first axle assembly 1004 may include fewer or more components.

The first driving gear 1050 is coupled to a housing of the first wheel differential 1051 by a plurality of fasteners or a weld and is rotatable about an axis of the first pair of output axles 1052 within the first axle housing 1053. Alternately, the first driving gear 1050 may be integrally formed with the first wheel differential 1051. As is known in the art, the first driving gear 1050 has gear teeth formed on an outer surface thereof. The first driving gear 1050 may be one of a hypoid gear, a spiral bevel gear, a straight bevel gear, or any other gear known to those skilled in the art. The first driving gear 1050 is drivingly engaged with the bevel gear pinion 1049 and has a first gear ratio. As a non-limiting example, the first gear ratio may be a 2.42:1 ratio, but it is understood that other ratios may be used. The output shaft 1035 is drivingly engaged with the first driving gear 1050 of the first axle assembly 1004 through a single gear mesh.

The first wheel differential 1051 is a bevel gear style differential as is known in the art having a plurality of driving pinions and a pair of side gears drivingly engaged with the first pair of output axles 1052. The first wheel differential 1051 is rotatably disposed within the first axle housing 1053 about the axis of the first pair of output axles 1052. Alternately, other styles of differentials may be used in place of the first wheel differential 1051.

The first pair of output axles 1052 are elongate cylindrical members having a common axis rotatably mounted within the first axle housing 1053. Bearings 1022 disposed between the first pair of output axles 1052 and the first axle housing 1053 permit the first pair of output axles 1052 to rotate therein. The side gears of the first wheel differential 1051 are disposed on first ends of each of the first output axles 1052 and wheels (not shown) are disposed on second ends of each of the first output axles 1052.

The second axle assembly 1006 includes an inter-axle shaft 1054, a second driving gear 1056, a second wheel differential 1057, a pair of second output axles 1058, and an axle clutch 1059. Preferably, the components 1054, 1056, 1057, 1058, 1059 are formed from a hardened steel, however the components 1054, 1056, 1057, 1058, 1059 may be formed from any other rigid material. As shown, the second axle assembly 1006 includes the five components 1054, 1056, 1057, 1058, 1059 disposed in a second axle housing 1060 but it is understood the second axle assembly 1006 may include fewer or more components.

The inter-axle shaft 1054 comprises at least one elongate cylindrical member drivingly engaged with the second output gear 1014 through a driven gear 1062 coupled to the inter-axle shaft 1054. As illustrated, the inter-axle shaft 1054 comprises a plurality of elongate cylindrical members connected by joints. Bearings 1022 disposed between the inter-axle shaft 1054 and the housing 1020 permit the inter-axle shaft 1054 to rotate therein.

A bevel gear pinion 1064 is drivingly coupled to the inter-axle shaft 1054 opposite the driven gear 1062. As is known in the art, the bevel gear pinion 1064 has gear teeth formed on an outer surface thereof. The bevel gear pinion 1064 may be one of a hypoid gear, a spiral bevel gear, a straight bevel gear, or any other gear known to those skilled in the art.

The second driving gear 1056 is a ring style bevel gear as is known in the art having a set of gear teeth engaged with the gear teeth formed on the bevel gear pinion 1064. The second driving gear 1056 is coupled to a housing of the second wheel differential 1057 by a plurality of fasteners or a weld and is rotatable about an axis of the pair of second output axles 1058 within the second axle housing 1060. Alternately, the second driving gear 1056 may be integrally formed with the second wheel differential 1057. The second driving gear 1056 is drivingly engaged with the bevel gear pinion 1064 and has a second gear ratio.

The second wheel differential 1057 is a bevel gear style differential as is known in the art having a plurality of driving pinions and a pair of side gears drivingly engaged with the pair of second output axles 1058. The second wheel differential 1057 is rotatably disposed within the second axle housing 1060 about the axis of the pair of second output axles 1058. Alternately, other styles of differentials may be used in place of the second wheel differential 1057.

The pair of second output axles 1058 are elongate cylindrical members having a common axis rotatably mounted within the second axle housing 1060. Bearings 1022 disposed between the pair of second output axles 1058 and the second axle housing 1060 permit the first pair of second output axles 1058 to rotate therein. The side gears of the second wheel differential 1057 are disposed on first ends of each of the second output axles 1058 and wheels (not shown) are disposed on second ends of each of the second output axles 1058.

The axle clutch 1059 is a dog style clutch that divides one of the second output axles 1058 into first and second portions. Alternately, the axle clutch 1059 may be a component of the second wheel differential 1057 which engages a side gear of the second wheel differential 1057 and one of the second output axles 1058. The axle clutch 1059 may also be a plate style clutch or any other style clutch. A shift collar 1065 slidingly disposed on a first component of the axle clutch 1059 selectively engages a plurality of teeth formed thereon with corresponding teeth formed on a first component and a second component of the axle clutch 1059. The shift collar 1065 is urged into an engaged position or a disengaged position by a shift fork 1066. When the axle clutch 1059 is in the engaged position, the first portion of one of the second output axles 1058 is drivingly engaged with the second portion of one of the second output axles 1058.

In use, the drive axle system 1000 facilitates a low speed and high torque multi-axle manner of operation and a high speed and low torque single axle manner of operation. The manner of operation of the drive axle system 1000 is determined by a position of the shift collar 1018. The drive axle system 1000 balances a rotational difference between the first output gear 1016 and the second output gear 1014 caused by a difference between the first gear ratio and the second gear ratio with the inter-axle differential, wherein the balancing of the rotational difference between the first output gear 1016 and the second output gear 1014 provides a cumulative gear ratio for the first axle assembly 1004 and the second axle assembly 1006. The cumulative gear ratio is intermediate the first gear ratio and the second gear ratio.

Upon having recognized the circumstances that the high speed and low torque single axle manner of operation of the drive axle system 1000 is advantageous in, the operator of the vehicle the drive axle system 1000 is incorporated in shifts the drive axle system 1000 into the first position. As a non-limiting example, circumstances in which the operator may recognize as being advantageous for the high speed and low torque single axle manner of operation are operation of the vehicle not burdened by a load and operation of the vehicle at highway speeds. When the shift collar 1018 is moved into the first position, the shift collar 1018 is drivingly engaged with the first set of clutch gear teeth 1031 of the transfer shaft 1012 and the first set of clutch gear teeth 1024 of the first end portion 1023 of the input shaft 1008.

Upon having recognized one of the aforementioned conditions, the operator of the vehicle moves or directs the vehicle to move the shift collar 1018 into the first position. Typically, the operator operates a switching mechanism that causes an actuator to electronically or pneumatically move the shift fork 1066 and the associated shift collar 1018 into the first position. Alternately, the operator may engage a linkage component directly coupled to the shift fork 1066 to move the shift collar 1018 into the first position. Further, the vehicle the drive axle system 1000 is incorporated in may be configured to automatically recognize conditions suitable for the low speed and high torque multi-axle manner of operation and automatically move the shift collar 1018 into the first position using the electronic control unit without assistance of the operator.

Prior to engagement of the first set of clutch gear teeth 1031 of the transfer shaft 1012 and the first set of clutch gear teeth 1024 of the input shaft 1008 with the shift collar 1018, but after the shift collar 1018 has begun to move towards the first position, the first conical engagement surface 1045 of the first synchronizer ring 1042 contacts the engagement portion 1029 of the first end portion 1023 of the input shaft 1008. Contact of the first conical engagement surface 1045 with the engagement portion 1029 causes the shift collar 1018 to accelerate to approximately the same speed of the input shaft 1008 and the biasing member disposed between the shift collar 1018 and the first synchronizer ring 1042 to compress. Once the shift collar 1018 has been accelerated to approximately the same speed of the input shaft 1008, movement of the shift collar 1018 into the first position is completed, and the shift collar 1018 is simultaneously engaged with the first set of clutch gear teeth 1031 of the transfer shaft 1012 and the first set of clutch gear teeth 1024 of the input shaft 1008.

After engagement of the first set of clutch gear teeth 1031 of the transfer shaft 1012 and the first set of clutch gear teeth 1024 of the input shaft 1008 with the shift collar 1018, the input shaft 1008 and the transfer shaft 1012 rotate concurrently. Similarly, the pinion carrier 1028 and the second end portion 1032 of the transfer shaft 1012 rotate concurrently. As a result of the concurrent rotation, the set of side gear teeth 1033 and the plurality of driving pinions 1010 are locked with respect to one another, and the set of side gear teeth 1034 of the first output gear 1016 are driven by the plurality of driving pinions 1010 at the same speed the input shaft 1008 rotates at. Placing the shift collar 1018 into the first position "locks out" the differentiating arrangement comprising the set of side gear teeth 1033, the plurality of driving pinions 1010, and the set of side gear teeth 1034.

Meanwhile, the second output gear 1014 sits idle as the shift collar 1018 is not engaged with the first set of clutch gear teeth 1039. Further, the axle clutch 1059 is disengaged, allowing the plurality of driving pinions and the pair of side gears of the second wheel differential 1057 to spin freely without need for the inter-axle shaft 1054 to spin. In this manner, torque delivered through the input shaft 1008 is transferred only to the first output axles 1052 while reducing parasitic windage losses that may be caused by needless rotation of the inter-axle shaft 1054 and the second output gear 1014.

Upon having recognized the circumstances that the low speed and high torque multi-axle manner of operation of the drive axle system 1000 is advantageous in, the operator of the vehicle the drive axle system 1000 is incorporated in shifts the drive axle system 1000 into the second position. As a non-limiting example, circumstances in which the operator may recognize as being advantageous for the low speed and high torque multi-axle manner of operation are starting movement of the vehicle from a stopped position, operation of the vehicle along a surface having a positive gradient, and operation of the vehicle along a surface having a reduced coefficient of friction. When the shift collar 1018 is moved into the second position, the shift collar 1018 is drivingly engaged with the first set of clutch gear teeth 1031 of the transfer shaft 1012 and the first set of clutch gear teeth 1039 of the second output gear 1014.

Upon having recognized one of the aforementioned conditions, the operator of the vehicle moves or directs the vehicle to move the shift collar 1018 into the second position. Typically, the operator operates a switching mechanism that causes an actuator to electronically or pneumatically move the shift fork 1066 and the associated shift collar 1018 into the second position. Alternately, the operator may engage a linkage component directly coupled to the shift fork 1066 to move the shift collar 1018 into the second position. Simultaneously, the axle clutch 1059 is engaged to not allow each of the second output axles 1058' to rotate with respect to one another without rotation of the inter-axle shaft 1054. Further, the vehicle the drive axle system 1000 is incorporated in may be configured to automatically recognize conditions suitable for the low speed and high torque multi-axle manner of operation and automatically move the shift collar 1018 into the second position using the electronic control unit without assistance of the operator.

Prior to engagement of the first set of clutch gear teeth 1031 of the transfer shaft 1012 and the first set of clutch gear teeth 1039 of the second output gear 1014 with the shift collar 1018, but after the shift collar 1018 has begun to move towards the second position, the second conical engagement surface 1046 of the second synchronizer ring 1043 contacts the engagement portion 1038 of the second end portion 1037 of the second output gear 1014. Contact of the second conical engagement surface 1046 with the engagement portion 1038 causes the shift collar 1018 to accelerate to approximately the same speed of the second output gear 1014 and the biasing member disposed between the shift collar 1018 and the second synchronizer ring 1043 to compress. Once the second output gear 1014 has been accelerated to approximately the same speed of the input shaft 1008, movement of the shift collar 1018 into the second position is completed, and the shift collar 1018 is simultaneously engaged with the first set of clutch gear teeth 1031 of the transfer shaft 1012 and the first set of clutch gear teeth 1039 of the second output gear 1014.

After engagement of the first set of clutch gear teeth 1031 of the transfer shaft 1012 and the first set of clutch gear teeth 1039 of the second output gear 1014 with the shift collar 1018, the second output gear 1014 and the transfer shaft 1012 rotate concurrently. Torque delivered to the input shaft 1008 is transferred through the plurality of driving pinions 1010 to rotate the second end portion 1032 of the transfer shaft 1012 and the first output gear 1016. Subsequently, torque is transferred to the inter-axle shaft 1054 through the second output gear 1014 and the driven gear 1062 and torque is transferred to the output shaft 1035. Through the bevel gear pinions 1049, 1064, driving gears 1050, 1056, and wheel differentials 1051, 1057, torque delivered through the input shaft 1008 is simultaneously transferred to the first output axles 1052 and the second output axles 1058.

To permit the drive axle system 1000 to operate in the low speed and high torque multi-axle manner of operation, gearing ratios of the driven gear 1062 with respect to the second output gear 1014 and the second driving gear 1056 with respect to the bevel gear pinion 1064 are higher than a gearing ratio of the first driving gear 1050 with respect to the bevel gear pinion 1049. Resulting speed differences of the first output axles 1052 and the second output axles 1058 are accommodated by the differentiating arrangement comprising the set of side gear teeth 1033, the plurality of driving pinions 1010, and the set of side gear teeth 1034, which permits operating speed differences between the first output axles 1052 and the second output axles 1058 to be remedied by allowing the second end portion 1032 and the first output gear 1016 to rotate with respect to one another through the plurality of driving pinions 1010.

The drive axle system 1000 may also be used with specific shifting procedures for shifting the drive axle system 1000 from the first position into the second position.

A first specific shifting procedure may be used to accelerate the inter-axle shaft 1054 prior to completing the shift of the drive axle system 1000 from the first position into the second position. The first specific shifting procedure includes disengagement of the shift collar 1065 and partial engagement of the shift collar 1018 into the second position. The partial engagement accelerates the inter-axle shaft 1054 to an operating speed without a rotational force being applied to the second output axles 1058 from the inter-axle shaft 1054. Upon the inter-axle shaft 1054 being accelerated to the operating speed, the shift collar 1018 is engaged and the rotational force is applied to the second output axles 1058 through the inter-axle shaft 1054. Such acceleration of the inter-axle shaft 1054 facilitates a smoother shifting of the drive axle system 1000 from the first position to the second position.

Figure 11:
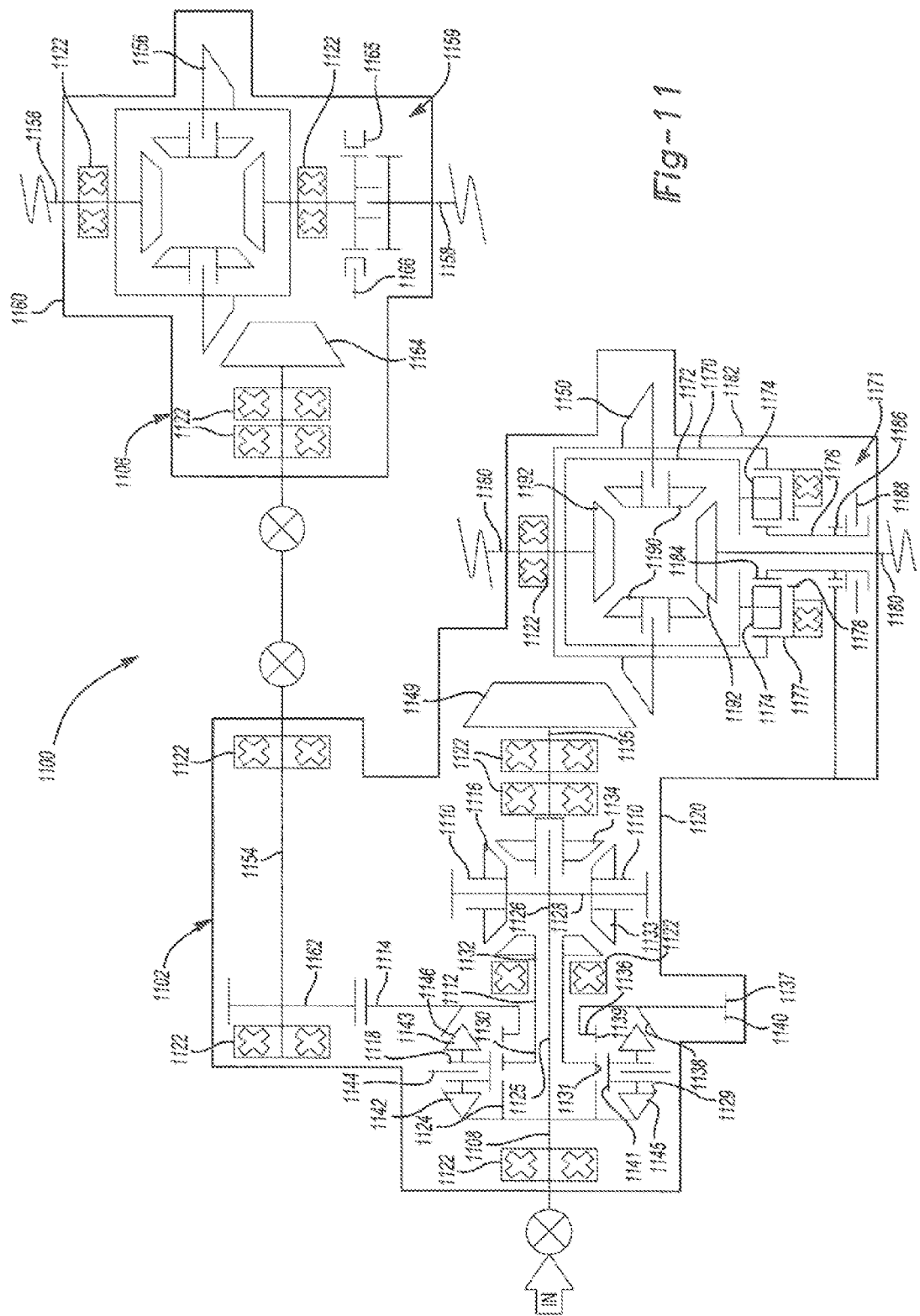
FIG. 11 is a schematic view of a drive axle system according to another embodiment of the present invention.

FIG. 11 depicts yet another embodiment of the present invention. The embodiment shown in FIG. 11 is similar to the embodiment shown in FIG. 10. Similar features of the embodiment shown in FIG. 11 are numbered similarly in series, with the exception of the features described below.

The first driving gear 1150 is mounted on, or connected, to an outer case portion 1170 of an axle ratio selection device 1171. The axle ratio selection device 1171 includes an inner case portion 1172, the outer case portion 1170, a plurality of case pinions 1174, and a ratio selector 1176. As is known in the art, the axle ratio selection device 1171 comprises a planetary gear set; however, it is understood that the axle ratio selection device 1171 may be any other type of multi speed selection device. The outer case portion 1170 has a toothed case end 1177. The inner case portion 1172 is rotatably and concentrically mounted within the outer case portion 1170. The plurality of case pinions 1174 are rotatably mounted to an end of the inner case portion 1172 and engage a case ring gear 1178 formed on an inner surface of the outer case portion 1170.

The ratio selector 1176 is a hollow member disposed about one of a pair of axle half shafts 1180. One or more bearings (not shown) and their associated races may be located about a portion of the ratio selector 1176 to facilitate rotation of the ratio selector 1176 within the first axle assembly housing 1182.

The ratio selector 1176 has a first toothed end 1184 and a second toothed end 1186 and may be placed in a first position or a second position along the case pinions 1174. In the first position, the first toothed end 1184 of the ratio selector 1176 engages the toothed case end 1177 and the case pinions 1174, "locking out" the planetary gear set of the axle ratio selection device 1171. When the ratio selector 1176 is placed in the first position, the case ring gear 1178, the ratio selector 1176, and the case pinions 1174 (and thus the inner case portion 1172), are driven at a same angular velocity.

In the second position, the first toothed end 1184 of the ratio selector 1176 engages the case pinions 1174 and the second toothed end 1186 of the ratio selector 1176 engages a toothed portion of the first axle assembly housing 1182, fixing the first toothed end 1184 with respect to the first axle assembly housing 1182. When the ratio selector 1176 is placed in the second position, the case ring gear 1178 drives the case pinions 1174, and thus the inner case portion 1172, about the first toothed end 1184 at a reduced ratio when compared to the ratio selector 1176 placed in the first position.

The ratio selector 1176 may be moved by an actuator 1188 such as a pneumatic actuator, an electromechanical actuator, or a hydraulic actuator. The actuator 1188 may be connected to the anti-lock braking system of the vehicle, as described below.

The first axle assembly 1104 may be utilized for the majority of the vehicle duty cycle requirements. The ratio selector 1176 of the axle ratio selection device 1171 in the first position results in a gear ratio of the first axle assembly 1104 selected for a high speed and low torque manner of operation. The gear ratio of the first axle assembly 1104 having the axle ratio selection device 1171 in the first position preferably is employed during a single axle mode of operation, where the high speed and low torque manner of operation is desired. The ratio selector 1176 of the axle ratio selection device 1171 in the second position results in a gear ratio of the first axle assembly 1104 selected for a low speed and high torque manner of operation. The gear ratio of the first axle assembly 1104 having the axle ratio selection device 1171 in the second position preferably corresponds to a gear ratio of the second axle assembly 1106 and is employed during a multi-axle mode of operation, where the low speed and high torque manner of operation is desired.

The second axle assembly 1106 may be selectively engaged when additional tractive effort is required. By selectively disengaging and idling the second axle assembly 1106 using the inter-axle clutch 1118, an efficiency over a full time driven first and second axle assembly 1104, 1106 is achieved by minimizing axle windage and parasitic drag losses.

The second axle assembly 1106 may be selectively and automatically engaged by an automated system that comprises wheel speed sensors and a control algorithm that eliminates the need for driver control. In such a situation, the second axle assembly 1106 can be automatically engaged at vehicle start up to proportion the drive torque between the first and second axle assemblies 1104, 1106. This has the effect of lowering the maximum torque on either the first and second axle assemblies 1104, 1106. Further, because the shift collar 1118 may variably engage the second axle assembly 1106, a clutch torque capacity of the shift collar 1118 can be used to limit the torque to the second axle assembly 1106, thus permitting it to be downsized compared to the first axle assembly 1104.

Figure 12:
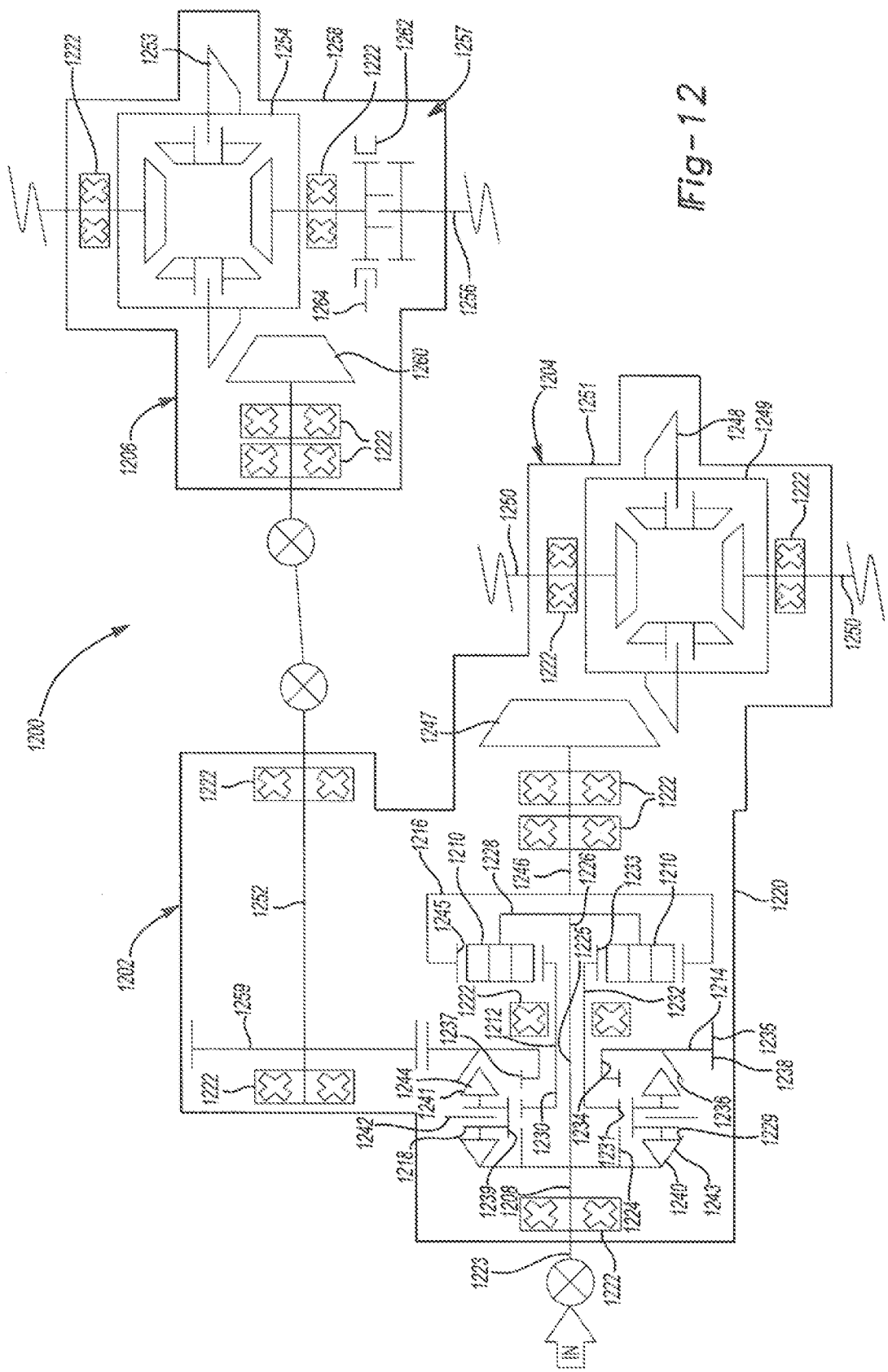
FIG. 12 is a schematic view of a drive axle system according to another embodiment of the present invention.

FIG. 12 illustrates a drive axle system 1200 for a vehicle incorporating an inter-axle differential assembly 1202. The drive axle system 1200 preferably includes the inter-axle differential assembly 1202, a first axle assembly 1204, and a second axle assembly 1206. As shown, the drive axle system 1200 includes the three assemblies 1202, 1204, and 1206, but it is understood the drive axle system 1200 may include fewer or more assemblies or components.

The inter-axle differential assembly 1202 includes an input shaft 1208, a plurality of driving pinions 1210, a transfer shaft 1212, a second output gear 1214, a first output gear 1216, and a shift collar 1218. Preferably, the components 1208, 1210, 1212, 1214, 1216, 1218 are formed from a hardened steel, however the components 1208, 1210, 1212, 1214, 1216, 1218 may be formed from any other rigid material. As shown, the drive axle system 1200 includes the six components 1208, 1210, 1212, 1214, 1216, 1218 disposed in a housing 1220 but it is understood the inter-axle differential assembly 1202 may include fewer or more components The input shaft 1208 is at least partially disposed in the housing 1220. Preferably, the input shaft 1208 is an elongate cylindrical member, however the input shaft 1208 may be any other shape. Bearings 1222 disposed between the input shaft 1208 and the housing 1220 and the input shaft 1208 and the transfer shaft 1212 permit the input shaft 1208 to rotate about an axis of the input shaft 1208. The input shaft 1208 has a first end portion 1223, having a first set of clutch gear teeth 1224 formed thereon, a middle portion 1225, and a second end portion 1226, having a pinion carrier 1228 disposed thereon.

The first end portion 1223 has a diameter greater than a diameter of the middle portion 1225. The first end portion 1223 is a substantially disc shaped body drivingly coupled to the input shaft 1208. Alternately, the first end portion 1223 may be integrally formed with the input shaft 1208. The first end portion 1223 includes an engagement portion 1229 formed therein adjacent an outer peripheral edge thereof. As shown, the engagement portion 1229 is a conical surface oblique to the input shaft 1208, however, the engagement portion 1229 may have any other shape. The first set of clutch gear teeth 1224 are formed on the first end portion 1223 intermediate the input shaft 1208 and the engagement portion 1229.

The pinion carrier 1228 is a substantially disc shaped body having a plurality of pinion supports (not shown) protruding therefrom adjacent a peripheral edge of the pinion carrier 1228, however, the pinion carrier 1228 may be any other rounded shape and may have a plurality of recesses or perforations formed therein. As is known in the art, the pinion carrier 1228 is also known as a planet carrier.

The plurality of driving pinions 1210 are rotatably coupled to the pinion supports. Each of the driving pinions 1210 have gear teeth formed on an outer surface thereof. As is known in the art, each of the driving pinions 1210 is also known as a planet gear. Preferably, bearings are disposed between each of the driving pinions 1210 and the pinion supports, however, the driving pinions 1210 may be directly mounted on the pinion supports.

The transfer shaft 1212 is a hollow shaft concentrically disposed about the input shaft 1208. Preferably, the transfer shaft 1212 is a hollow elongate cylindrical member, however the transfer shaft 1212 may be any other shape. Bearings 1222 disposed between the transfer shaft 1212 and the housing 1220 and the input shaft 1208 and the transfer shaft 1212 permit the transfer shaft 1212 to rotate about an axis of the transfer shaft 1212. The axis of the transfer shaft 1212 is concurrent with the axis of the input shaft 1208. The transfer shaft 1212 has a first end portion 1230, having a first set of clutch gear teeth 1231 formed on an outer surface thereof, and a second end portion 1232, having a second set of gear teeth 1233 formed on an outer surface thereof.

The first end portion 1230 and the second end portion 1232 are substantially disc shaped bodies having an outer diameter greater than a diameter of the transfer shaft 1212. The first end portion 1230 and the second end portion 1232 are drivingly coupled to the transfer shaft 1212. Alternately, the first end portion 1230 and the second end portion 1232 may be integrally formed with the transfer shaft 1212 and may have a diameter substantially equal to the transfer shaft 1212. Similarly, the first set of clutch gear teeth 1231 and the second set of gear teeth 1233 may be formed directly in the transfer shaft 1212. As is known in the art, the second end portion 1232 having the gear teeth 1233 is known as a sun gear. The second set of gear teeth 1233 are engaged with the plurality of driving pinions 1210 and the first set of clutch gear teeth 1231 are disposed adjacent the first set of clutch gear teeth 1231 of the input shaft 1208.

The second output gear 1214 is a gear concentrically disposed about the input shaft 1208 and the transfer shaft 1212. The second output gear 1214 has a central perforation having a diameter greater than a diameter of the transfer shaft 1212. The second output gear 1214 is a substantially disc shaped body having a first end portion 1234, a second end portion 1235 defining an outer diameter of the second output gear 1214, and an engagement portion 1236. Bearings (not shown) disposed between the transfer shaft 1212 and the second output gear 1214 permit the second output gear 1214 to rotate about an axis of the second output gear 1214. The axis of the second output gear 1214 is concurrent with the axis of the input shaft 1208. A first set of clutch gear teeth 1237 are formed on the first end portion 1234 adjacent the first set of clutch gear teeth 1231 of the transfer shaft 1212. A second set of gear teeth 1238 are formed on the second end portion 1235.

The engagement portion 1236 is formed in the second output gear 1214 intermediate the first end portion 1234 and the second end portion 1235. As shown, the engagement portion 1236 is a conical surface oblique to the input shaft 1208; however, the engagement portion 1236 may have any other shape.

The shift collar 1218 is concentrically disposed about the input shaft 1208 and the transfer shaft 1212. The shift collar 1218 includes a set of inner clutch collar teeth 1239 formed on an inner surface thereof, a first synchronizer ring 1240, and a second synchronizer ring 1241. The set of inner clutch collar teeth 1239 are engaged with the first set of clutch gear teeth 1231 of the transfer shaft 1212. The shift collar 1218 can be slidably moved along the axis of the input shaft 1208 as directed manually by an operator of the vehicle or automatically by an electronic control unit (not shown) while maintaining engagement of the inner clutch collar teeth 1239 and the first set of clutch gear teeth 1231. A shift fork 1242 disposed in an annular recess formed in the shift collar 1218 moves the shift collar 1218 along the axis of the input shaft 1208 into a first position, a second position, or a neutral position. A shift mechanism (not shown), which is drivingly engaged with the shift fork 1242, is actuated to position the shift fork 1242 as directed manually by an operator of the vehicle or automatically by the electronic control unit. Consequently, the shift fork 1242 positions the shift collar 1218 into the first position, the second position, or the neutral position. In the first position, the shift collar 1218 is drivingly engaged with the first set of clutch gear teeth 1231 of the transfer shaft 1212 and the first set of clutch gear teeth 1224 of the input shaft 1208. In the second position, the shift collar 1218 is drivingly engaged with the first set of clutch gear teeth 1231 of the transfer shaft 1212 and the first set of clutch gear teeth 1237 of the second output gear 1214. In the neutral position, the inner clutch collar teeth 1239 of the shift collar 1218 are only drivingly engaged with the first set of clutch gear teeth 1231 of the transfer shaft 1212. It is understood the shift collar 1218, the clutch gear teeth 1224, 1231, 1237, 1239, the synchronizer rings 1240, 1241, and the engagement portions 1229, 1236 may be substituted with any clutching device that permits selective engagement of a driving and a driven part.

The first synchronizer ring 1240 is an annular body coupled to the shift collar 1218 adjacent the first end portion 1223 of the input shaft 1208. The first synchronizer ring 1240 has a first conical engagement surface 1243. Alternately, the first synchronizer ring 1240 may have an engagement surface having any other shape. A biasing member (not shown) is disposed between the shift collar 1218 and the first synchronizer ring 1240 to urge the first synchronizer ring 1240 away from the shift collar 1218. When the shift collar 1218 is moved from the second position into the first position, the first conical engagement surface 1243 contacts the engagement portion 1229 of the first end portion 1223 of the input shaft 1208. As the shift collar 1218 moves towards the first set of clutch gear teeth 1224 of the input shaft 1208, the biasing member is compressed while the shift collar 1218 engages the first set of clutch gear teeth 1231 of the transfer shaft 1212 and before the shift collar 1218 engages the first set of clutch gear teeth 1224 of the input shaft 1208.

The second synchronizer ring 1241 is an annular body coupled to the shift collar 1218 adjacent the first end portion 1234 of the second output gear 1214. The second synchronizer ring 1241 has a second conical engagement surface 1244. Alternately, the second synchronizer ring 1241 may have an engagement surface having any other shape. A biasing member (not shown) is disposed between the shift collar 1218 and the second synchronizer ring 1241 to urge the second synchronizer ring 1241 away from the shift collar 1218. When the shift collar 1218 is moved from the first position into the second position, the second conical engagement surface 1244 contacts the engagement portion 1236 of the first end portion 1234 of the second output gear 1214. As the shift collar 1218 moves towards the first set of clutch gear teeth 1237 of the second output gear 1214, the biasing member is compressed while the shift collar 1218 engages the first set of clutch gear teeth 1231 of the transfer shaft 1212 and before the shift collar 1218 engages the first set of clutch gear teeth 1237 of the second output gear 1214.

The first output gear 1216 is a gear concentrically disposed about the input shaft 1208 and the pinion carrier 1228. The first output gear 1216 has a central recess having a diameter greater than an outer diameter of the pinion carrier 1228. The first output gear 1216 is a substantially cup shaped body having an inner surface having gear teeth 1245 formed on. As is known in the art, the first output gear 1216 is known as a ring gear. The gear teeth 1245 are engaged with the gear teeth formed on the outer surface of each of the driving pinions 1210.

The first output gear 1216 includes an output shaft 1246 drivingly coupled thereto. Alternately, the first output gear 1216 may be integrally formed with the output shaft 1246. The output shaft 1246 is collinear with the input shaft 1208. Bearings 1222 disposed between the output shaft 1246 and the housing 1220 support the first output gear 1216 and permit the output shaft 1246 to rotate about an axis of the output shaft 1246.

A bevel gear pinion 1247 is drivingly coupled to the output shaft 1246 opposite the first output gear 1216. Alternately, the bevel gear pinion 1247 may be integrally formed with the output shaft 1246. As is known in the art, the bevel gear pinion 1247 has gear teeth formed on an outer surface thereof. The bevel gear pinion 1247 may be one of a hypoid gear, a spiral bevel gear, a straight bevel gear, or any other gear known to those skilled in the art.

The first axle assembly 1204 includes the bevel gear pinion 1247, a first driving gear 1248, a first wheel differential 1249, and a first pair of output axles 1250. Preferably, the components 1247, 1248, 1249, 1250 are formed from a hardened steel, however the components 1247, 1248, 1249, 1250 may be formed from any other rigid material. As shown, the first axle assembly 1204 includes the four components 1247, 1248, 1249, 1250 disposed in a first axle housing 1251 but it is understood the first axle assembly 1204 may include fewer or more components.

The first driving gear 1248 is coupled to a housing of the first wheel differential 1249 by a plurality of fasteners or a weld and is rotatable about an axis of the first pair of output axles 1250 within the first axle housing 1251. Alternately, the first driving gear 1248 may be integrally formed with the first wheel differential 1249. As is known in the art, the first driving gear 1248 has gear teeth formed on an outer surface thereof. The first driving gear 1248 may be one of a hypoid gear, a spiral bevel gear, a straight bevel gear, or any other gear known to those skilled in the art. The first driving gear 1248 is drivingly engaged with the bevel gear pinion 1247 and has a first gear ratio. As a non-limiting example, the first gear ratio may be a 2.42:1 ratio, but it is understood that other ratios may be used. The output shaft 1246 is drivingly engaged with the first driving gear 1248 of the first axle assembly 1204 through a single gear mesh.

The first wheel differential 1249 is a bevel gear style differential as is known in the art having a plurality of driving pinions and a pair of side gears drivingly engaged with the first pair of output axles 1250. The first wheel differential 1249 is rotatably disposed within the first axle housing 1251 about the axis of the first pair of output axles 1250. Alternately, other styles of differentials may be used in place of the first wheel differential 1249.

The first pair of output axles 1250 are elongate cylindrical members having a common axis rotatably mounted within the first axle housing 1251. Bearings 1222 disposed between the first pair of output axles 1250 and the first axle housing 1251 permit the first pair of output axles 1250 to rotate therein. The side gears of the first wheel differential 1249 are disposed on first ends of each of the first output axles 1250 and wheels (not shown) are disposed on second ends of each of the first output axles 1250.

The second axle assembly 1206 includes an inter-axle shaft 1252, a second driving gear 1253, a second wheel differential 1254, a pair of second output axles 1256, and an axle clutch 1257. Preferably, the components 1252, 1253, 1254, 1256, 1257 are formed from a hardened steel, however the components 1252, 1253, 1254, 1256, 1257 may be formed from any other rigid material. As shown, the second axle assembly 1206 includes the five components 1252, 1253, 1254, 1256, 1257 disposed in a second axle housing 1258 but it is understood the second axle assembly 1206 may include fewer or more components.

The inter-axle shaft 1252 comprises at least one elongate cylindrical member drivingly engaged with the second output gear 1214 through a driven gear 1259 coupled to the inter-axle shaft 1252. As illustrated, the inter-axle shaft 1252 comprises a plurality of elongate cylindrical members connected by joints. Bearings 1222 disposed between the inter-axle shaft 1252 and the housing 1220 permit the inter-axle shaft 1252 to rotate therein.

A bevel gear pinion 1260 is drivingly coupled to the inter-axle shaft 1252 opposite the driven gear 1259. As is known in the art, the bevel gear pinion 1259 has gear teeth formed on an outer surface thereof. The bevel gear pinion 1260 may be one of a hypoid gear, a spiral bevel gear, a straight bevel gear, or any other gear known to those skilled in the art.

The second driving gear 1253 is a ring style bevel gear as is known in the art having a set of gear teeth engaged with the gear teeth formed on the bevel gear pinion 1260. The second driving gear 1253 is coupled to a housing of the second wheel differential 1254 by a plurality of fasteners or a weld and is rotatable about an axis of the pair of second output axles 1256 within the second axle housing 1258. Alternately, the second driving gear 1253 may be integrally formed with the second wheel differential 1254. The second driving gear 1253 is drivingly engaged with the bevel gear pinion 1260 and has a second gear ratio. As a non-limiting example, the second gear ratio may be a 3.55:1 ratio, but it is understood that other ratios may be used. The second gear ratio is a lower gear ratio than the first gear ratio.

The second wheel differential 1254 is a bevel gear style differential as is known in the art having a plurality of driving pinions and a pair of side gears drivingly engaged with the pair of second output axles 1256. The second wheel differential 1254 is rotatably disposed within the second axle housing 1258 about the axis of the pair of second output axles 1256. Alternately, other styles of differentials may be used in place of the second wheel differential 1254.

The pair of second output axles 1256 are elongate cylindrical members having a common axis rotatably mounted within the second axle housing 1258. Bearings 1222 disposed between the pair of second output axles 1256 and the second axle housing 1258 permit the first pair of second output axles 1256 to rotate therein. The side gears of the second wheel differential 1254 are disposed on first ends of each of the second output axles 1256 and wheels (not shown) are disposed on second ends of each of the second output axles 1256.

The axle clutch 1257 is a dog style clutch that divides one of the second output axles 1256 into first and second portions. Alternately, the axle clutch 1257 may be a component of the second wheel differential 1254 which engages a side gear of the second wheel differential 1254 and one of the second output axles 1256. The axle clutch 1257 may also be a plate style clutch or any other style clutch. A shift collar 1262 slidingly disposed on a first component of the axle clutch 1257 selectively engages a plurality of teeth formed thereon with corresponding teeth formed on a first component and a second component of the axle clutch 1257. The shift collar 1262 is urged into an engaged position or a disengaged position by a shift fork 1264. When the axle clutch 1257 is in the engaged position, the first portion of one of the second output axles 1256 is drivingly engaged with the second portion of one of the second output axles 1256.

In use, the drive axle system 1200 facilitates a low speed and high torque multi-axle manner of operation and a high speed and low torque single axle manner of operation. The manner of operation of the drive axle system 1200 is determined by a position of the shift collar 1218. The drive axle system 1200 balances a rotational difference between the first output gear 1216 and the second output gear 1214 caused by a difference between the first gear ratio and the second gear ratio with the inter-axle differential assembly 1202, wherein the balancing of the rotational difference between the first output gear 1216 and the second output gear 1214 provides a cumulative gear ratio for the first axle assembly 1204 and the second axle assembly 1206. The cumulative gear ratio is intermediate the first gear ratio and the second gear ratio.

Upon having recognized the circumstances that the high speed and low torque single axle manner of operation of the drive axle system 1200 is advantageous in, the operator of the vehicle the drive axle system 1200 is incorporated in shifts the drive axle system 1200 into the first position. As a non-limiting example, circumstances in which the operator may recognize as being advantageous for the high speed and low torque single axle manner of operation are operation of the vehicle not burdened by a load and operation of the vehicle at highway speeds. When the shift collar 1218 is moved into the first position, the shift collar 1218 is drivingly engaged with the first set of clutch gear teeth 1231 of the transfer shaft 1212 and the first set of clutch gear teeth 1224 of the first end portion 1223 of the input shaft 1208.

Upon having recognized one of the aforementioned conditions, the operator of the vehicle moves or directs the vehicle to move the shift collar 1218 into the first position. Typically, the operator operates a switching mechanism that causes an actuator to electronically or pneumatically move the shift fork 1242 and the associated shift collar 1218 into the first position. Alternately, the operator may engage a linkage component directly coupled to the shift fork 1242 to move the shift collar 1218 into the first position. Further, the vehicle the drive axle system 1200 is incorporated in may be configured to automatically recognize conditions suitable for the low speed and high torque multi-axle manner of operation and automatically move the shift collar 1218 into the first position using the electronic control unit without assistance of the operator.

Prior to engagement of the first set of clutch gear teeth 1231 of the transfer shaft 1212 and the first set of clutch gear teeth 1224 of the input shaft 1208 with the shift collar 1218, but after the shift collar 1218 has begun to move towards the first position, the first conical engagement surface 1243 of the first synchronizer ring 1240 contacts the engagement portion 1229 of the first end portion 1223 of the input shaft 1208. Contact of the first conical engagement surface 1243 with the engagement portion 1229 causes the shift collar 1218 to accelerate to approximately the same speed of the input shaft 1208 and the biasing member disposed between the shift collar 1218 and the first synchronizer ring 1240 to compress. Once the shift collar 1218 has been accelerated to approximately the same speed of the input shaft 1208, movement of the shift collar 1218 into the first position is completed, and the shift collar 1218 is simultaneously engaged with the first set of clutch gear teeth 1231 of the transfer shaft 1212 and the first set of clutch gear teeth 1224 of the input shaft 1208.

After engagement of the first set of clutch gear teeth 1231 of the transfer shaft 1212 and the first set of clutch gear teeth 1224 of the input shaft 1208 with the shift collar 1218, the input shaft 1208 and the transfer shaft 1212 rotate concurrently. Similarly, the pinion carrier 1228 and the second end portion 1232 of the transfer shaft 1212 rotate concurrently. As a result of the concurrent rotation, the gear teeth 1233 and the driving pinions 1210 are locked with respect to one another, and the first output gear 1216 is driven by the driving pinions 1210 at the same speed the input shaft 1208 rotates at. Placing the shift collar 1218 into the first position "locks out" the planetary arrangement comprising the gear teeth 1233, the driving pinions 1210, and the first output gear 1216.

Meanwhile, the second output gear 1214 sits idle as the shift collar 1218 is not engaged with the first set of clutch gear teeth 1237. Further, the axle clutch 1257 is disengaged, allowing the plurality of driving pinions and the pair of side gears of the second wheel differential 1254 to spin freely without need for the inter-axle shaft 1252 to spin. In this manner, torque delivered through the input shaft 1208 is transferred only to the first output axles 1250 while reducing parasitic windage losses that may be caused by needless rotation of the inter-axle shaft 1252 and the second output gear 1214.

Upon having recognized the circumstances that the low speed and high torque multi-axle manner of operation of the drive axle system 1200 is advantageous in, the operator of the vehicle the drive axle system 1200 is incorporated in shifts the drive axle system 1200 into the second position. As a non-limiting example, circumstances in which the operator may recognize as being advantageous for the low speed and high torque multi-axle manner of operation are starting movement of the vehicle from a stopped position, operation of the vehicle along a surface having a positive gradient, and operation of the vehicle along a surface having a reduced coefficient of friction. When the shift collar 1218 is moved into the second position, the shift collar 1218 is drivingly engaged with the first set of clutch gear teeth 1231 of the transfer shaft 1212 and the first set of clutch gear teeth 1237 of the second output gear 1214.

Upon having recognized one of the aforementioned conditions, the operator of the vehicle moves or directs the vehicle to move the shift collar 1218 into the second position. Typically, the operator operates a switching mechanism that causes an actuator to electronically or pneumatically move the shift fork 1242 and the associated shift collar 1218 into the second position. Alternately, the operator may engage a linkage component directly coupled to the shift fork 1242 to move the shift collar 1218 into the second position. Simultaneously, the axle clutch 1257 is engaged to not allow each of the second output axles 1256 to rotate with respect to one another without rotation of the inter-axle shaft 1252. Further, the vehicle the drive axle system 1200 is incorporated in may be configured to automatically recognize conditions suitable for the low speed and high torque multi-axle manner of operation and automatically move the shift collar 1218 into the second position using the electronic control unit without assistance of the operator.

Prior to engagement of the first set of clutch gear teeth 1231 of the transfer shaft 1212 and the first set of clutch gear teeth 1237 of the second output gear 1214 with the shift collar 1218, but after the shift collar 1218 has begun to move towards the second position, the second conical engagement surface 1244 of the second synchronizer ring 1241 contacts the engagement portion 1236 of the second end portion 1235 of the second output gear 1214. Contact of the second conical engagement surface 1244 with the engagement portion 1244 causes the shift collar 1218 to accelerate to approximately the same speed of the second output gear 1214 and the biasing member disposed between the shift collar 1218 and the second synchronizer ring 1241 to compress. Once the second output gear 1214 has been accelerated to approximately the same speed of the input shaft 1208, movement of the shift collar 1218 into the second position is completed, and the shift collar 1218 is simultaneously engaged with the first set of clutch gear teeth 1231 of the transfer shaft 1212 and the first set of clutch gear teeth 1237 of the second output gear 1214.

After engagement of the first set of clutch gear teeth 1231 of the transfer shaft 1212 and the first set of clutch gear teeth 1237 of the second output gear 1214 with the shift collar 1218, the second output gear 1214 and the transfer shaft 1212 rotate concurrently. Torque delivered to the input shaft 1208 is transferred through the plurality of driving pinions 1210 to rotate the second end portion 1232 of the transfer shaft 1212 and the first output gear 1216. Subsequently, torque is transferred to the inter-axle shaft 1252 through the second output gear 1214 and the driven gear 1259 and torque is transferred to the output shaft 1246. Through the bevel gear pinions 1247, 1260, driving gears 1248, 1259, and wheel differentials 1249, 1254, torque delivered through the input shaft 1208 is simultaneously transferred to the first output axles 1250 and the second output axles 1256.

The planetary arrangement comprising the gear teeth 1233, the driving pinions 1210, and the first output gear 1216 results in an unequal distribution of torque between the first output axles 1250 and the second output axles 1256. As a non-limiting example, the planetary arrangement may result in about 70% of the torque exerted on the input shaft 1208 being transferred to the first output axles 1250 and about 30% of the torque exerted on the input shaft 1208 being transferred to the second output axles 1256. To remedy the unequal distribution of torque, gearing ratios of the driven gear 1259 with respect to the second output gear 1214 and the second driving gear 1253 with respect to the bevel gear pinion 1260 are configured to compensate for the unequal distribution of torque between the first output axles 1250 and the second output axles 1256. Resulting speed differences of the first output axles 1250 and the second output axles 1256 are accommodated by the planetary arrangement, which permits operating speed differences between the first output axles 1250 and the second output axles 1256 to be remedied by allowing the second end portion 1232 and the first output gear 1216 to rotate with respect to one another through the plurality of driving pinions 1210. The gearing ratios of the driven gear 1259 with respect to the second output gear 1214 may be of an equal ratio, an overdrive ratio, or an underdrive ratio. As a non-limiting example, a ratio of the second output gear 1214 to the driven gear 1259 may be 1.6:1, but it is understood that other ratios may be used.

The drive axle system 1200 may also be used with specific shifting procedures for shifting the drive axle system 1200 from the first position into the second position.

A first specific shifting procedure may be used to accelerate the inter-axle shaft 1252 prior to completing the shift of the drive axle system 1200 from the first position into the second position. The first specific shifting procedure includes disengagement of the shift collar 1262 and partial engagement of the shift collar 1218 into the second position. The partial engagement accelerates the inter-axle shaft 1252 to an operating speed without a rotational force being applied to the second output axles 1256 from the inter-axle shaft 1252. Upon the inter-axle shaft 1252 being accelerated to the operating speed, the shift collar 1262 is engaged and the rotational force is applied to the second output axles 1256 through the inter-axle shaft 1252. Such acceleration of the inter-axle shaft 1252 facilitates a smoother shifting of the drive axle system 1200 from the first position to the second position.

Figure 13:
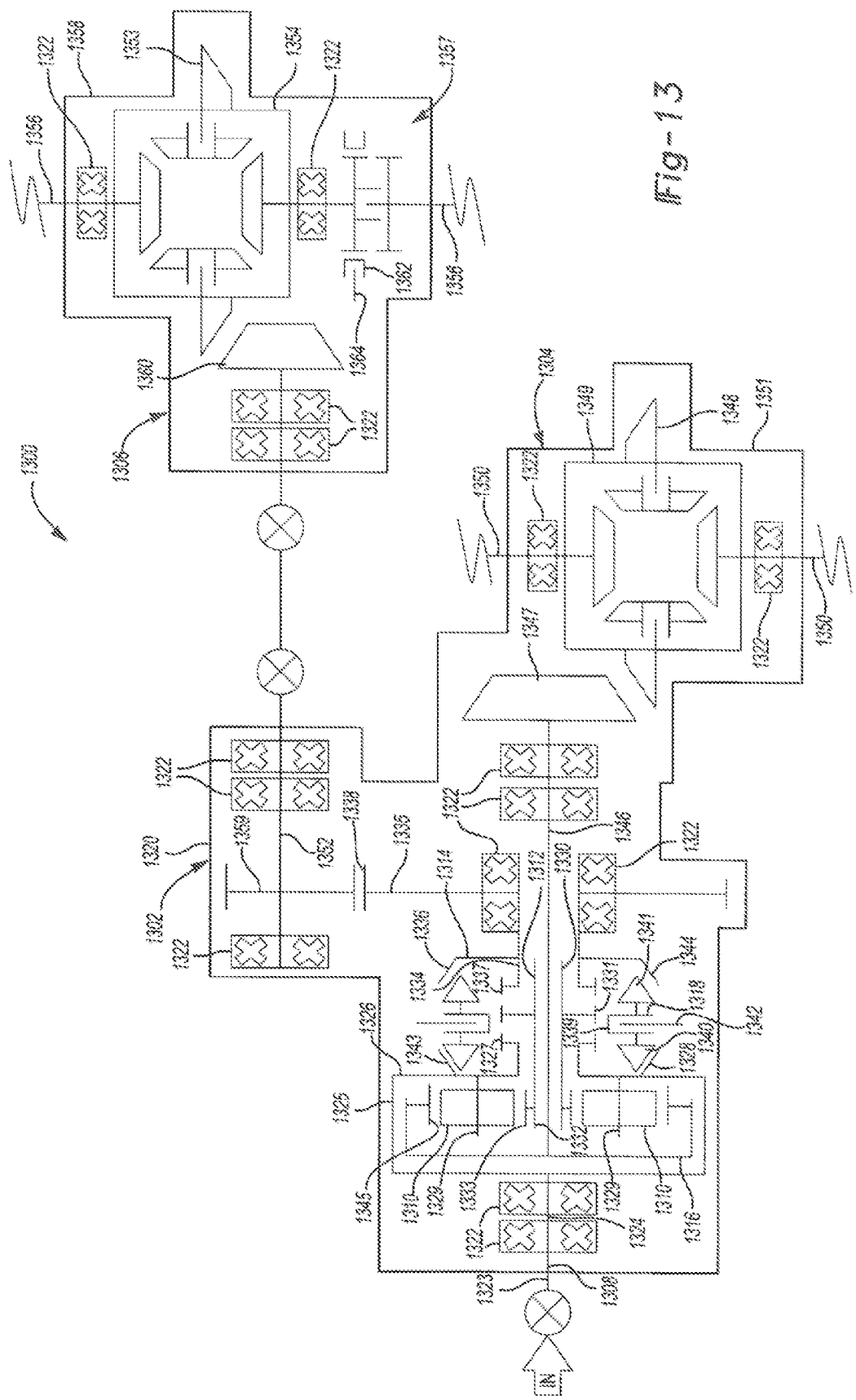
FIG. 13 is a schematic view of a drive axle system according to another embodiment of the present invention.

FIG. 13 depicts yet another embodiment of the present invention. The embodiment shown in FIG. 13 is similar to the embodiment shown in FIG. 12. Similar features of the embodiment shown in FIG. 12 are numbered similarly in series, with the exception of the features described below.

FIG. 13 illustrates a drive axle system 1300 for a vehicle incorporating an inter-axle differential assembly 1202. The drive axle system 1300 preferably includes the inter-axle differential assembly 1302, a first axle assembly 1304, and a second axle assembly 1306. As shown, the drive axle system 1300 includes the three assemblies 1302, 1304, and 1306, but it is understood the drive axle system 1300 may include fewer or more assemblies or components.

The inter-axle differential assembly 1302 includes an input shaft 1308, a plurality of driving pinions 1310, a transfer shaft 1312, a second output gear 1314, a first output gear 1316, and a shift collar 1318. Preferably, the components 1308, 1310, 1312, 1314, 1316, 1318 are formed from a hardened steel, however the components 1308, 1310, 1312, 1314, 1316, 1318 may be formed from any other rigid material. As shown, the drive axle system 1300 includes the six components 1308, 1310, 1312, 1314, 1316, 1318 disposed in a housing 1320 but it is understood the inter-axle differential assembly 1302 may include fewer or more components The input shaft 1308 is at least partially disposed in the housing 1320. Preferably, the input shaft 1308 is an elongate member, however the input shaft 1308 may be any other shape. Bearings 1322 disposed between the input shaft 1308 and the housing 1320 permit the input shaft 1308 to rotate about an axis of the input shaft 1308. The input shaft 1308 has a first end portion 1323, a middle portion 1324, and a second end portion 1325, having a pinion carrier 1326, a first set of clutch gear teeth 1327, and an engagement portion 1328 formed thereon.

The second end portion 1325 is a substantially hollow body having a diameter greater than a diameter of the first end portion 1323 and the middle portion 1324. The second end portion 1325 is drivingly coupled to the input shaft 1308. Alternately, the second end portion 1325 may be integrally formed with the input shaft 1308.

The pinion carrier 1326 is a substantially disc shaped body drivingly coupled to the second end portion 1325 of the input shaft 1308. The pinion carrier 1326 includes a plurality of pinion supports 1329 protruding from a first side of the pinion carrier 1326 into the second end portion 1325 of the input shaft 1308. The engagement portion 1328 is formed on a second side of the pinion carrier 1326. As is known in the art, the pinion carrier 1226 is also known as a planet carrier.

The engagement portion 1328 is a conical surface oblique to the input shaft 1308, however, the engagement portion 1328 may have any other shape. The first set of clutch gear teeth 1227 are formed on the pinion carrier 1326 radially inward from the engagement portion 1328.

The plurality of driving pinions 1310 are rotatably coupled to the pinion supports 1330. Each of the driving pinions 1310 have gear teeth formed on an outer surface thereof. As is known in the art, each of the driving pinions 1310 is also known as a planet gear. Preferably, bearings are disposed between each of the driving pinions 1310 and the pinion supports 1329, however, the driving pinions 1310 may be directly mounted on the pinion supports.

The transfer shaft 1312 is a hollow shaft rotatably disposed in the housing 1320 and having an axis of rotation concurrent with the axis of rotation of the input shaft 1308. Preferably, the transfer shaft 1312 is a hollow elongate cylindrical member, however the transfer shaft 1312 may be any other shape. Bearings (not shown) disposed between the transfer shaft 1312 and pinion carrier 1326 permit the transfer shaft 1312 to rotate about an axis of the transfer shaft 1312. The transfer shaft 1312 has a first end portion 1330, having a first set of clutch gear teeth 1331 formed on an outer surface thereof, and a second end portion 1332, having a second set of gear teeth 1333 formed on an outer surface thereof.

The first end portion 1330 and the second end portion 1332 are substantially disc shaped bodies having an outer diameter greater than a diameter of the transfer shaft 1312. The first end portion 1330 and the second end portion 1332 are drivingly coupled to the transfer shaft 1312. Alternately, the first end portion 1330 and the second end portion 1332 may be integrally formed with the transfer shaft 1312 and may have a diameter substantially equal to the transfer shaft 1312. Similarly, the first set of clutch gear teeth 1331 and the second set of gear teeth 1333 may be formed directly in the transfer shaft 1312. As is known in the art, the second end portion 1332 having the gear teeth 1333 is known as a sun gear. The second set of gear teeth 1333 are engaged with the plurality of driving pinions 1310 and the first set of clutch gear teeth 1331 are disposed adjacent the first set of clutch gear teeth 1327 of the pinion carrier 1326.

The second output gear 1314 is a gear concentrically disposed about a portion of the transfer shaft 1312. The second output gear 1314 has a central perforation having a diameter greater than a diameter of the transfer shaft 1312. The second output gear 1314 is a substantially disc shaped body having a first end portion 1334, a second end portion 1335 defining an outer diameter of the second output gear 1314, and an engagement portion 1336. Bearings 1322 disposed between the second output gear 1314 and the housing 1320 permit the second output gear 1314 to rotate about an axis of the second output gear 1314. The axis of the second output gear 1314 is concurrent with the axis of the input shaft 1308. A first set of clutch gear teeth 1337 are formed on the first end portion 1334 adjacent the first set of clutch gear teeth 1331 of the transfer shaft 1312. A second set of gear teeth 1338 are formed on the second end portion 1335.

The engagement portion 1336 is formed in the second output gear 1314 intermediate the first end portion 1334 and the second end portion 1335. As shown, the engagement portion 1336 is a conical surface oblique to the input shaft 1308; however, the engagement portion 1336 may have any other shape.

The shift collar 1318 is concentrically disposed about the transfer shaft 1312. The shift collar 1318 includes a set of inner clutch collar teeth 1339 formed on an inner surface thereof, a first synchronizer ring 1340, and a second synchronizer ring 1341. The set of inner clutch collar teeth 1339 are engaged with the first set of clutch gear teeth 1331 of the transfer shaft 1312. The shift collar 1318 can be slidably moved along the axis of the input shaft 1308 as directed manually by an operator of the vehicle or automatically by an electronic control unit (not shown) while maintaining engagement of the inner clutch collar teeth 1339 and the first set of clutch gear teeth 1331. A shift fork 1342 disposed in an annular recess formed in the shift collar 1318 moves the shift collar 1318 along the axis of the input shaft 1308 into a first position, a second position, or a neutral position. A shift mechanism (not shown), which is drivingly engaged with the shift fork 1342, is actuated to position the shift fork 1342 as directed manually by an operator of the vehicle or automatically by the electronic control unit. Consequently, the shift fork 1342 positions the shift collar 1318 into the first position, the second position, or the neutral position. In the first position, the shift collar 1318 is drivingly engaged with the first set of clutch gear teeth 1331 of the transfer shaft 1312 and the first set of clutch gear teeth 1327 of the pinion carrier 1326. In the second position, the shift collar 1318 is drivingly engaged with the first set of clutch gear teeth 1331 of the transfer shaft 1312 and the first set of clutch gear teeth 1337 of the second output gear 1314. In the neutral position, the inner clutch collar teeth 1339 of the shift collar 1318 are only drivingly engaged with the first set of clutch gear teeth 1331 of the transfer shaft 1312. It is understood the shift collar 1318, the clutch gear teeth 1327, 1331, 1337, 1339, the synchronizer rings 1340, 1341, and the engagement portions 1328, 1336 may be substituted with any clutching device that permits selective engagement of a driving and a driven part.

The first synchronizer ring 1340 is an annular body coupled to the shift collar 1318 adjacent the engagement portion 1328 of the pinion carrier 1326. The first synchronizer ring 1340 has a first conical engagement surface 1343. Alternately, the first synchronizer ring 1340 may have an engagement surface having any other shape. A biasing member (not shown) is disposed between the shift collar 1318 and the first synchronizer ring 1340 to urge the first synchronizer ring 1340 away from the shift collar 1318. When the shift collar 1318 is moved from the second position into the first position, the first conical engagement surface 1343 contacts the engagement portion 1328 of the pinion carrier 1326. As the shift collar 1318 moves towards the first set of clutch gear teeth 1327 of the input shaft 1308, the biasing member is compressed while the shift collar 1318 engages the first set of clutch gear teeth 1331 of the transfer shaft 1312 and before the shift collar 1318 engages the first set of clutch gear teeth 1327 of the pinion carrier 1326.

The second synchronizer ring 1341 is an annular body coupled to the shift collar 1318 adjacent the first end portion 1334 of the second output gear 1314. The second synchronizer ring 1341 has a second conical engagement surface 1344. Alternately, the second synchronizer ring 1341 may have an engagement surface having any other shape. A biasing member (not shown) is disposed between the shift collar 1318 and the second synchronizer ring 1341 to urge the second synchronizer ring 1341 away from the shift collar 1318. When the shift collar 1318 is moved from the first position into the second position, the second conical engagement surface 1344 contacts the engagement portion 1336 of the second output gear 1314. As the shift collar 1318 moves towards the first set of clutch gear teeth 1337 of the second output gear 1314, the biasing member is compressed while the shift collar 1318 engages the first set of clutch gear teeth 1331 of the transfer shaft 1312 and before the shift collar 1318 engages the first set of clutch gear teeth 1337 of the second output gear 1314.

The first output gear 1316 is a gear concentrically disposed within the second end portion 1325 of the input shaft 1308. The first output gear 1316 is a substantially cup shaped body having an inner surface having gear teeth 1345 formed on. As is known in the art, the first output gear 1316 is known as a ring gear. The gear teeth 1345 are engaged with the gear teeth formed on the outer surface of each of the driving pinions 1310.

The first output gear 1316 includes an output shaft 1346 drivingly coupled thereto. Alternately, the first output gear 1316 may be integrally formed with the output shaft 1346. The output shaft 1346 is collinear with the input shaft 1308. Bearings 1322 disposed between the output shaft 1346 and the housing 1320 support the output shaft 1346 and permit the output shaft 1346 to rotate about an axis of the output shaft 1346.

In use, the drive axle system 1300 facilitates a low speed and high torque multi-axle manner of operation and a high speed and low torque single axle manner of operation. The manner of operation of the drive axle system 1300 is determined by a position of the shift collar 1318. The drive axle system 1300 balances a rotational difference between the first output gear 1316 and the second output gear 1314 caused by a difference between the first gear ratio and the second gear ratio with the inter-axle differential assembly 1302, wherein the balancing of the rotational difference between the first output gear 1316 and the second output gear 1314 provides a cumulative gear ratio for the first axle assembly 1304 and the second axle assembly 1306. The cumulative gear ratio is intermediate the first gear ratio and the second gear ratio.

Upon having recognized the circumstances that the high speed and low torque single axle manner of operation of the drive axle system 1300 is advantageous in, the operator of the vehicle the drive axle system 1300 is incorporated in shifts the drive axle system 1300 into the first position. As a non-limiting example, circumstances in which the operator may recognize as being advantageous for the high speed and low torque single axle manner of operation are operation of the vehicle not burdened by a load and operation of the vehicle at highway speeds. When the shift collar 1318 is moved into the first position, the shift collar 1318 is drivingly engaged with the first set of clutch gear teeth 1331 of the transfer shaft 1312 and the first set of clutch gear teeth 1327 of the pinion carrier 1326.

Upon having recognized one of the aforementioned conditions, the operator of the vehicle moves or directs the vehicle to move the shift collar 1318 into the first position. Typically, the operator operates a switching mechanism that causes an actuator to electronically or pneumatically move the shift fork 1342 and the associated shift collar 1318 into the first position. Alternately, the operator may engage a linkage component directly coupled to the shift fork 1342 to move the shift collar 1318 into the first position. Further, the vehicle the drive axle system 1300 is incorporated in may be configured to automatically recognize conditions suitable for the low speed and high torque multi-axle manner of operation and automatically move the shift collar 1318 into the first position using the electronic control unit without assistance of the operator.

Prior to engagement of the first set of clutch gear teeth 1331 of the transfer shaft 1312 and the first set of clutch gear teeth 1327 of the input shaft 1308 with the shift collar 1318, but after the shift collar 1318 has begun to move towards the first position, the first conical engagement surface 1343 of the first synchronizer ring 1340 contacts the engagement portion 1328 of the pinion carrier 1326. Contact of the first conical engagement surface 1343 with the engagement portion 1328 causes the shift collar 1318 to accelerate to approximately the same speed of the input shaft 1308 and the biasing member disposed between the shift collar 1318 and the first synchronizer ring 1340 to compress. Once the shift collar 1318 has been accelerated to approximately the same speed of the input shaft 1308, movement of the shift collar 1318 into the first position is completed, and the shift collar 1318 is simultaneously engaged with the first set of clutch gear teeth 1331 of the transfer shaft 1312 and the first set of clutch gear teeth 1327 of the pinion carrier 1326.

After engagement of the first set of clutch gear teeth 1331 of the transfer shaft 1312 and the first set of clutch gear teeth 1327 of the pinion carrier 1326 with the shift collar 1318, the input shaft 1308 and the transfer shaft 1312 rotate concurrently. Similarly, the pinion carrier 1326 and the second end portion 1332 of the transfer shaft 1312 rotate concurrently. As a result of the concurrent rotation, the gear teeth 1333 and the driving pinions 1310 are locked with respect to one another, and the first output gear 1316 is driven by the driving pinions 1310 at the same speed the input shaft 1308 rotates at. Placing the shift collar 1318 into the first position "locks out" the planetary arrangement comprising the gear teeth 1333, the driving pinions 1310, and the first output gear 1316.

Meanwhile, the second output gear 1314 sits idle as the shift collar 1318 is not engaged with the first set of clutch gear teeth 1337. Further, the axle clutch 1357 is disengaged, allowing the plurality of driving pinions and the pair of side gears of the second wheel differential 1354 to spin freely without need for the inter-axle shaft 1352 to spin. In this manner, torque delivered through the input shaft 1308 is transferred only to the first output axles 1350 while reducing parasitic windage losses that may be caused by needless rotation of the inter-axle shaft 1352 and the second output gear 1314.

Upon having recognized the circumstances that the low speed and high torque multi-axle manner of operation of the drive axle system 1300 is advantageous in, the operator of the vehicle the drive axle system 1300 is incorporated in shifts the drive axle system 1300 into the second position. As a non-limiting example, circumstances in which the operator may recognize as being advantageous for the low speed and high torque multi-axle manner of operation are starting movement of the vehicle from a stopped position, operation of the vehicle along a surface having a positive gradient, and operation of the vehicle along a surface having a reduced coefficient of friction. When the shift collar 1318 is moved into the second position, the shift collar 1318 is drivingly engaged with the first set of clutch gear teeth 1331 of the transfer shaft 1312 and the first set of clutch gear teeth 1337 of the second output gear 1314.

Upon having recognized one of the aforementioned conditions, the operator of the vehicle moves or directs the vehicle to move the shift collar 1318 into the second position. Typically, the operator operates a switching mechanism that causes an actuator to electronically or pneumatically move the shift fork 1342 and the associated shift collar 1318 into the second position. Alternately, the operator may engage a linkage component directly coupled to the shift fork 1342 to move the shift collar 1318 into the second position. Simultaneously, the axle clutch 1357 is engaged to not allow each of the second output axles 1356 to rotate with respect to one another without rotation of the inter-axle shaft 1352. Further, the vehicle the drive axle system 1300 is incorporated in may be configured to automatically recognize conditions suitable for the low speed and high torque multi-axle manner of operation and automatically move the shift collar 1318 into the second position using the electronic control unit without assistance of the operator.

Prior to engagement of the first set of clutch gear teeth 1331 of the transfer shaft 1312 and the first set of clutch gear teeth 1337 of the second output gear 1314 with the shift collar 1318, but after the shift collar 1318 has begun to move towards the second position, the second conical engagement surface 1344 of the second synchronizer ring 1341 contacts the engagement portion 1336 of the second end portion 1335 of the second output gear 1314. Contact of the second conical engagement surface 1344 with the engagement portion 1344 causes the shift collar 1318 to accelerate to approximately the same speed of the second output gear 1314 and the biasing member disposed between the shift collar 1318 and the second synchronizer ring 1341 to compress. Once the second output gear 1314 has been accelerated to approximately the same speed of the input shaft 1308, movement of the shift collar 1318 into the second position is completed, and the shift collar 1318 is simultaneously engaged with the first set of clutch gear teeth 1331 of the transfer shaft 1312 and the first set of clutch gear teeth 1337 of the second output gear 1314.

After engagement of the first set of clutch gear teeth 1331 of the transfer shaft 1312 and the first set of clutch gear teeth 1337 of the second output gear 1314 with the shift collar 1318, the second output gear 1314 and the transfer shaft 1312 rotate concurrently. Torque delivered to the input shaft 1308 is transferred through the plurality of driving pinions 1310 to rotate the second end portion 1332 of the transfer shaft 1312 and the first output gear 1316. Subsequently, torque is transferred to the inter-axle shaft 1352 through the second output gear 1314 and the driven gear 1359 and torque is transferred to the output shaft 1346. Through the bevel gear pinions 1347, 1360, driving gears 1348, 1359, and wheel differentials 1349, 1354, torque delivered through the input shaft 1308 is simultaneously transferred to the first output axles 1350 and the second output axles 1356.

The planetary arrangement comprising the gear teeth 1333, the driving pinions 1310, and the first output gear 1316 results in an unequal distribution of torque between the first output axles 1350 and the second output axles 1356. As a non-limiting example, the planetary arrangement may result in about 70% of the torque exerted on the input shaft 1308 being transferred to the first output axles 1350 and about 30% of the torque exerted on the input shaft 1308 being transferred to the second output axles 1356. To remedy the unequal distribution of torque, gearing ratios of the driven gear 1359 with respect to the second output gear 1314 and the second driving gear 1353 with respect to the bevel gear pinion 1360 are configured to compensate for the unequal distribution of torque between the first output axles 1350 and the second output axles 1356. Resulting speed differences of the first output axles 1350 and the second output axles 1356 are accommodated by the planetary arrangement, which permits operating speed differences between the first output axles 1350 and the second output axles 1356 to be remedied by allowing the second end portion 1332 and the first output gear 1316 to rotate with respect to one another through the plurality of driving pinions 1310. The gearing ratios of the driven gear 1359 with respect to the second output gear 1314 may be of an equal ratio, an overdrive ratio, or an underdrive ratio. As a non-limiting example, a ratio of the second output gear 1314 to the driven gear 1359 may be 1.6:1, but it is understood that other ratios may be used.

As is known in the art and as used herein with respect to each of the embodiments disclosed, the first pinion shaft 106, the first axle input shaft 206, 406, 506, 606, 706, 806, 906, the first axle shaft 306, and the input shaft 1008, 1108, 1208, 1308 may comprise a plurality of shaft sections. Further, it is understood that the first pinion shaft 106, the first axle input shaft 206, 406, 506, 606, 706, 806, 906, the first axle shaft 306, and the input shaft 1008, 1108, 1208, 1308 may include a plurality of joints disposed thereon. As a first non-limiting example, it is understood that the plurality of shaft sections of the first pinion shaft 106, the first axle input shaft 206, 406, 506, 606, 706, 806, 906, the first axle shaft 306, and the input shaft 1008, 1108, 1208, 1308 may be joined by a clutching device such as a plate clutch, a shift collar, or any other clutching device. As further non-limiting examples, it is understood the plurality of shaft sections of the first pinion shaft 106, the first axle input shaft 206, 406, 506, 606, 706, 806, 906, the first axle shaft 306, and the input shaft 1008, 1108, 1208, 1308 may be joined through a locked differential, may pass through a differential, and may enclose a differential.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A drive axle system, comprising:
   a first shaft comprising at least one shaft section;
   a planetary inter-axle differential comprising a sun gear, a carrier, and a ring gear, the carrier drivingly engaged with the first shaft;
   a first axle assembly comprising a first wheel differential, a first driving gear coupled to the first wheel differential and drivingly engaged with the ring gear of the planetary inter-axle differential, and a first pair of output axles drivingly engaged with the first wheel differential;
   a second axle assembly comprising a second wheel differential, a second driving gear coupled to the second wheel differential, a second pair of output axles drivingly engaged with the second wheel differential, and a first clutching device disposed on and dividing one of the second pair of output axles into first and second portions; and a second clutching device having at least a first position and a second position, wherein the second clutching device in the first position drivingly engages the second driving gear with the sun gear of the planetary inter-axle differential and the second clutching device in the second position drivingly engages one of the sun gear and the ring gear of the planetary inter-axle differential with the carrier of the planetary inter-axle differential.

2. The drive axle system according to claim 1, wherein the first axle assembly further comprises an axle ratio selection device.

3. The drive axle system according to claim 2, wherein the first axle assembly has at least two first axle ratios and the second axle assembly has a second axle ratio, one of the at least two first axle ratios different from the second axle ratio.

4. The drive axle system according to claim 1, wherein the first axle assembly has a first axle ratio and the second axle assembly has a second axle ratio, the first axle ratio different from the second axle ratio.

5. The drive axle system according to claim 1, wherein the second clutching device comprises a shift collar concentrically disposed about the first shaft, a first synchronizer, and a second synchronizer, the first synchronizer engaging an output gear and an inter-axle shaft with the second driving gear of the second axle assembly when the shift collar is in the first position and the second synchronizer engaging the first shaft when the shift collar is in the second position.

6. The drive axle system according to claim 5, wherein the first shaft includes a first engagement portion for engaging with the first synchronizer and the output gear includes a second engagement portion for engaging with the second synchronizer.

7. The drive axle system according to claim 1, wherein the first clutching device comprises a second shift collar concentrically disposed about one of the second pair of output axles, the first clutching device having a first position and a second position, the first clutching device in the first position drivingly engaging the first portion with the second portion of one of the second pair of output axles and the first clutching device in the second position disengaging the first portion from the second portion of one of the second pair of output axles.

8. The drive axle system according to claim 1, wherein the second clutching device comprises a shift collar, a first synchronizer, and a second synchronizer, the shift collar concentrically disposed about a second shaft collinear with the first shaft, the ring gear drivingly engaged with the first driving gear, the first synchronizer engaging an output gear and an inter-axle shaft with the second driving gear of the second axle assembly when the shift collar is in the first position and the second synchronizer engaging the carrier when the shift collar is in the second position.

9. The drive axle system according to claim 8, wherein the output gear includes a first engagement portion for engaging with the first synchronizer and the first shaft includes a second engagement portion for engaging with the second synchronizer.

10. The drive axle system according to claim 1, wherein the first shaft is drivingly engaged with the first driving gear of the first axle assembly through a single gear mesh.

11. The drive axle system according to claim 1, wherein the second clutching device in the first position drivingly disengages the second driving gear from the sun gear of the planetary inter-axle differential and the first clutching device in a disengaged position drivingly disengages the second driving gear from the second pair of output axles.

12. A drive axle system, comprising:
a first shaft comprising an engagement portion and an end portion;
a planetary inter-axle differential comprising a sun gear, a carrier, and a ring gear;
a carrier clutch concentric with the first shaft, the carrier clutch selectively engaging the engagement portion of the first shaft with the carrier of the planetary inter-axle differential;
an output shaft comprising a first end portion and a second end portion;
a first axle assembly comprising a first wheel differential, a first driving gear coupled to the first wheel differential and drivingly engaged with the second end portion of the output shaft, and a first pair of output axles drivingly engaged with the first wheel differential;
a second axle assembly comprising a second wheel differential, a second driving gear coupled to the second wheel differential and drivingly engaged with the sun gear of the planetary inter-axle differential, a second pair of output axles drivingly engaged with the second wheel differential, and a first clutching device disposed on and dividing one of the second pair of output axles into first and second portions; and
a second clutching device having at least a first position and a second position, wherein the second clutching device in the first position drivingly engages the first end portion of the output shaft with the end portion of the first shaft and the second clutching device in the second position drivingly engages the ring gear of the planetary inter-axle differential with the first end portion of the output shaft.

13. The drive axle system according to claim 12, wherein the first axle assembly has a first axle ratio and the second axle assembly has a second axle ratio, the first axle ratio different from the second axle ratio.

14. The drive axle system according to claim 12, wherein the first shaft is drivingly engaged with the first driving gear of the first axle assembly through a single gear mesh.

15. A drive axle system, comprising:
a first shaft comprising at least one shaft section and a first engagement portion;
a planetary inter-axle differential comprising a sun gear, a carrier, and a ring gear, the carrier drivingly engaged with the first shaft;
a first axle assembly comprising a first wheel differential, a first driving gear coupled to the first wheel differential and drivingly engaged with the ring gear of the planetary inter-axle differential, and a first pair of output axles drivingly engaged with the first wheel differential;
a second axle assembly comprising a second wheel differential, a second driving gear coupled to the second wheel differential, a second pair of output axles drivingly engaged with the second wheel differential, and a first clutching device disposed on and dividing one of the second pair of output axles into first and second portions;
a second clutching device comprising a shift collar concentrically disposed about the first shaft, a first synchronizer, and a second synchronizer, the second clutching device having at least a first position and a second position; and
an output gear including a second engagement portion disposed about the first shaft drivingly engaged with the second driving gear through an inter-axle shaft, wherein the second clutching device in the first position drivingly engages the second driving gear with the sun gear of the planetary inter-axle differential through the output gear and the inter-axle shaft when the shift collar is in the first position and the second synchronizer engages the second engagement portion of the output gear when the shift collar is in the first position, and the second clutching device in the second position drivingly engages one of the sun gear and the ring gear of the planetary inter-axle differential with the carrier of the planetary inter-axle differential when the shift collar is in the second position and the first synchronizer engages the first engagement portion of the first shaft when the shift collar is in the second position.

16. The drive axle system according to claim 15, wherein the first axle assembly has a first axle ratio and the second axle assembly has a second axle ratio, the first axle ratio different from the second axle ratio.

17. The drive axle system according to claim 15, wherein the first shaft is drivingly engaged with the first driving gear of the first axle assembly through a single gear mesh.

* * * * *